(12) United States Patent
Ando et al.

(10) Patent No.: US 7,167,635 B1
(45) Date of Patent: Jan. 23, 2007

(54) SYSTEM FOR RECORDING AUDIO INFORMATION WITH IMAGE

(75) Inventors: Hideo Ando, Hino (JP); Masafumi Tamura, Chofu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1017 days.

(21) Appl. No.: 09/659,583

(22) Filed: Sep. 11, 2000

(30) Foreign Application Priority Data

Nov. 24, 1999 (JP) ................................ 11-333389

(51) Int. Cl.
H04N 7/04 (2006.01)
H04N 5/91 (2006.01)

(52) U.S. Cl. ........................................ 386/96; 386/105

(58) Field of Classification Search ................. 386/86, 386/104, 105, 106, 124, 125, 126, 109, 111, 386/112, 27, 33, 39, 40, 45, 46
See application file for complete search history.

(56) References Cited

U.S. PATENT DOCUMENTS

| 5,825,876 | A | | 10/1998 | Peterson, Jr. |
| 6,005,940 | A | | 12/1999 | Kulinets |
| 6,104,684 | A | * | 8/2000 | Moriyama et al. ............ 386/96 |
| 6,181,870 | B1 | | 1/2001 | Okada et al. |
| 6,289,102 | B1 | | 9/2001 | Ueda et al. |
| 6,353,702 | B1 | | 3/2002 | Ando et al. |
| 6,389,222 | B1 | | 5/2002 | Ando et al. |
| 6,404,980 | B1 | | 6/2002 | Yagi et al. |
| 2002/0015580 | A1 | * | 2/2002 | Ando et al. ................... 386/95 |
| 2002/0081099 | A1 | * | 6/2002 | Tsumagari et al. ............ 386/95 |
| 2003/0152370 | A1 | * | 8/2003 | Otomo et al. ................. 386/98 |
| 2004/0197084 | A1 | * | 10/2004 | Tagawa et al. ............... 386/95 |

FOREIGN PATENT DOCUMENTS

| JP | 51-21726 | 2/1976 |
| JP | 62-234474 | 10/1987 |
| WO | WO 00/62295 | 10/2000 |

OTHER PUBLICATIONS

Hideo Ando et al., U.S. Appl. No. 09/662,217, filed Sep. 14, 2000.

* cited by examiner

*Primary Examiner*—Robert Chevalier
(74) *Attorney, Agent, or Firm*—Finnegan, Henderson, Farabow, Garrett & Dunner, L.L.P.

(57) ABSTRACT

An information storage medium has a first playback unit (music number or tune) for playing back the audio information and a second playback unit (AOB) being more fine than the first playback unit (music number), and one or more pieces of management information (AOBI) each pertaining to the second playback unit (AOB) are recorded in a line (arrangement sequence of AOBI# in music #). Display mode information indicating the display method (display order/display sequence, display timing) of image information (IMG_xx.IOB) is described in management information (AOBI# in music #) recorded at the head position in the first playback unit (music number) of this management information (AOBI).

7 Claims, 28 Drawing Sheets

FIG. 5

(a) AUDIO CARD (MEMORY CARD) 100 WITH COPY PROTECT FUNCTION

| CARD INTERNAL CONTROL CPU/MPU 101 | ROM 102 FOR RECORDING CONTROL PROGRAMS RELATED TO AUTHENTICATION/KEY EXCHANGE & I/O PROCESSING | CARD SPECIFIC ID & KEY INFORMATION RECORDING REGION (RAM) 103 | APPLICATION DATA RECORDING REGION (RAM) 104 |
|---|---|---|---|

(b)

| BOOT INFORMATION REGION 110 | FILE ALLOCATION TABLE (FAT) RECORDING REGION 111 | ROOT DIRECTORY INTERNAL INFORMATION RECORDING REGION 112 | DATA REGION 113 |
|---|---|---|---|

(c)

| GENERAL COMPUTER INFORMATION RECORDING REGION 120 | AUDIO RELATED INFORMATION RECORDING REGION 121 | GENERAL COMPUTER INFORMATION RECORDING REGION 120 |
|---|---|---|

(d)

| MANAGEMENT INFORMATION RECORDING REGION 130 | AUDIO OBJECT (AOB) RECORDING REGION 131 | IMAGE OBJECT (IOB) RECORDING REGION 132 | TEXT OBJECT (TOB) RECORDING REGION 133 |
|---|---|---|---|

(e)

| PGC SET INFORMATION (PGCSI) RECORDING REGION 140 | AOB SET INFORMATION (AOBSI) RECORDING REGION 141 | IOB SET INFORMATION (IOBSI) RECORDING REGION 142 | TOB SET INFORMATION (TOBSI) RECORDING REGION 143 |
|---|---|---|---|

PGC=PROGRAM CHAIN (f)

| ORIGINAL PGC (ORG_PGC) INFORMATION RECORDING REGION 150 | USER DEFINED PGC (UD_PGC) #A RECORDING REGION 151 | UD_PGC #B RECORDING REGION 152 | ---------- |
|---|---|---|---|

(g)

| REGION 160 FOR RECORDING INFORMATION OF TOTAL NUMBER OF CELLS EXISTING IN PGC | CELL INFORMATION (CI) #1 RECODING REGION 161 | CI#2 RECORDING REGION 162 | ---------- |
|---|---|---|---|

(a) IMAGE POINTER INFO. (IPI) 40 IN AOBI (TKI) AT HEAD OF MUSIC NUMBER (b)

| DISPLAY MODE INFO. 43 ON STILL IMAGE IN UNITS OF MUSIC NUMBERS, PGCs, OR PLAY LISTS | DISPLAY MODE INFO. 47 ON STILL IMAGE IN UNITS OF MUSIC NUMBERS, PGCs, OR PLAY LISTS |
|---|---|

(c)

| DISPLAY MODE INFO. (51,52) | | NUMBER OF STILL IMAGES DISPLAYED IN UNITS OF MUSIC NUMBERS, PGCs, OR PLAY LISTS 60 | INFO. ON 1ST DISPLAYED STILL IMAGE (TEXT SUCH AS WORDS OF MUSIC MAY BE CONTAINED) 61 | ---- | INFO. ON M-TH DISPLAYED STILL IMAGE (TEXT SUCH AS WORDS OF MUSIC MAY BE CONTAINED) 69 |
|---|---|---|---|---|---|
| STILL IMAGE DISPLAY SEQUENCE SET MODE INFO. 51 | STILL IMAGE DISPLAY TIMING SET MODE INFO. 52 | | | | |
| DESIGNATION OF DISPLAY METHOD (SEQUENTIAL, RANDOM, SHUFFLE, BROWSE, ETC.) | SETTING OF DISPLAY TIMING SYNCHRONIZED WITH BOUNDARIES OF AUDIO FRAMES OF AOB MANAGED BY AOBI (TKI) | | | | |

*M DENOTES A POSITIVE FIXED NUMBER (d)

| FLAG 71 FOR DESIGNATING REPRESENTATIVE IMAGE, JACKET IMAGE, ETC., IN UNITS OF MUSIC NUMBERS, PGCs, OR PLAY LISTS | STILL IMAGE FILE NUMBER OF M-TH DISPLAYED STILL IMAGE IN MUSIC NUMBER, IN PGC, OR IN PLAY LISTS 72 |
|---|---|

FIG. 20

SYSTEM FOR RECORDING AUDIO INFORMATION WITH IMAGE

CROSS-REFERENCE TO RELATED APPLICATIONS

This application is based upon and claims the benefit of priority from the prior Japanese Patent Application No. 11-333389, Nov. 24, 1999, the entire contents of which are incorporated herein by reference.

BACKGROUND OF THE INVENTION

The present invention relates to an improvement in a recordable/reproducible information storage medium such as a memory card or the like.

More particularly, the present invention relates to an improvement in a removable, portable information storage medium suitable for recording/playing back digital still image information in combination with digital audio information.

The present invention also relates to a processing method of information (still image information, text information, or the like, which is associated with audio information) recorded on the information storage medium.

Removable, portable information storage media that record digital audio information include:

(A) a CD-DA (compact disc that records digital audio in the form of pits);

(B) a CD-I (CD interactive) or video CD;

(C) a DVD (digital versatile disc) video or DVD audio disc (phase change recording);

(D) an MD (a disc using magnetooptical recording); and (E) solid audio (a semiconductor memory card such as a flash memory or the like, etc.

As the shape of the information storage medium itself, media (A) to (D) have a disc shape. In these information storage media, a recording layer on each medium is irradiated with convergent light of a laser beam while rotating the medium, and a change in light reflected by the recording layer is detected as a playback signal.

By contrast, medium (E) roughly has a card shape although various sizes and shapes are available. In medium (E), digital audio information is recorded in a semiconductor memory (mainly, a flash memory) built in a card-shaped body, and a recording/playback process of audio information is done via electrode terminals provided to a predetermined portion of the card surface. A memory card that belongs to medium (E) is used in, e.g., a digital camera.

In the conventional information storage media which has either a disc or card shape, upon editing (dividing, combining, etc. of a tune or music number) the recorded audio information (music piece or the like), a method of handling various kinds of information (still image information such as a jacket image or the like, text information such as words or lyric lines or the like) associated with the edited audio information (tune or music number) is not automated, resulting in troublesome handling for the user.

BRIEF SUMMARY OF THE INVENTION

The present invention has been made in consideration of the above situation and has as its object to provide an information storage medium having information (attribute information such as a display order mode/display timing mode and the like, a flag indicating the presence/absence of still image information, and the like) that pertains to handling of various kinds of information (still image information such as a jacket image or the like, text information such as words or the like) associated with audio information (tune or music number).

It is another object of the present invention to provide an information playback method using information (attribute information such as a display order mode/display timing mode and the like, a flag indicating the presence/absence of still image information, and the like) that pertains to handling of various kinds of information (still image information such as a jacket image or the like, text information such as words or the like) associated with audio information (tune or music number).

In order to achieve the above object, an information storage medium according to the present invention has a recording region (121) of audio information (data of AOB: ATS_xx.AOB) and image information (data of IOB: IMG_xx.IOB), and has a first playback unit (tune or music number) for playing back the audio information (ATS_xx.AOB) and a second playback unit (AOB/TK) having a fineness being equal to or more fine than a fineness of the first playback unit (tune or music number). In other words, the second playback unit (AOB/TK) has a size equal to or smaller than the first playback unit (tune or music number). The first playback unit (tune or music number) is made up of one or more second playback units (AOB/TK). One or more pieces of management information (AOBI/TKI) each pertaining to the second playback unit (AOB/TK) are recorded in a line (e.g., in music #β in (a) of FIG. 10, a sequence of AOBI#2, AOBI#3, and AOBI#4).

Note that display mode information (51, 52) indicating a display method (display order, display timing) of the image information (IMG_xx.IOB) is described in management information (e.g., AOBI#2 in music #β in FIG. 10) recorded at the head position in the first playback unit (tune or music number) of those recorded in a line in the second playback unit (AOB/TK).

In order to achieve the above object, an information playback method according to the present invention plays back information from a medium (100, 170) that records audio information (data of AOB: ATS_xx.AOB) and image information (data of IOB: IMG_xx.IOB) in a first playback unit (tune or music number) for playing back the audio information (ATS_xx.AOB) and a second playback unit (AOB/TK) having a size equal to or smaller than the first playback unit (tune or music number).

When pieces of management information (AOBI/TKI) each pertaining to the second playback unit (AOB/TK) are recorded in a line (e.g., in music #β in FIG. 10, AOBI#2 to AOBI#4) in the medium in which the first playback unit (tune or music number) is made up of one or more second playback units (AOB/TK) (NO in step ST1002 in FIG. 25), the contents (e.g., IPI of AOBI#2 in music #β in FIG. 10) of the management information recorded at the head position in the first playback unit (tune or music number) are used as valid information (step ST1006). The image information (IMG_xx.IOB) is played back (step ST1018) by accessing the image information (IMG_xx.IOB) on the basis of the contents (IPI of AOBI#2 in music #β) of the valid management information (step ST1016).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows views for explaining the data structure (recording format) of a memory card as an information storage medium according to an embodiment of the present invention.

FIG. 20 shows views for explaining the data structure of image pointer information (IPI) shown in FIGS. 1 to 4, FIGS. 10 to 12, etc.

Figure 23:
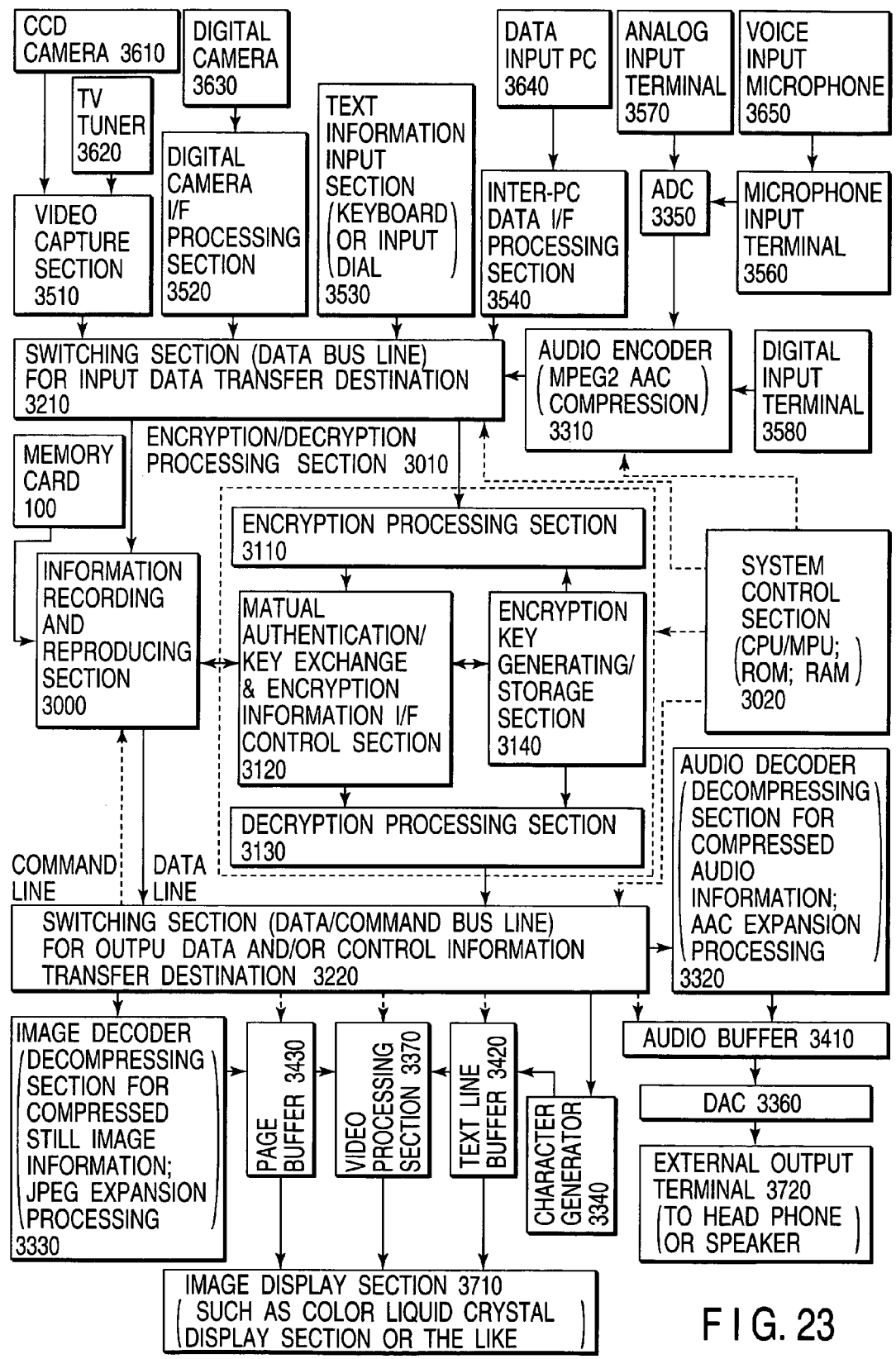
FIG. 23 shows a block diagram for explaining an example of the arrangement for recording information or playing back information on or from the audio card with the copy protection function shown in FIG. 5.

5 (or optical disc shown in FIG. 6), and the recording/playback apparatus shown in FIG. 23.

Figure 25:
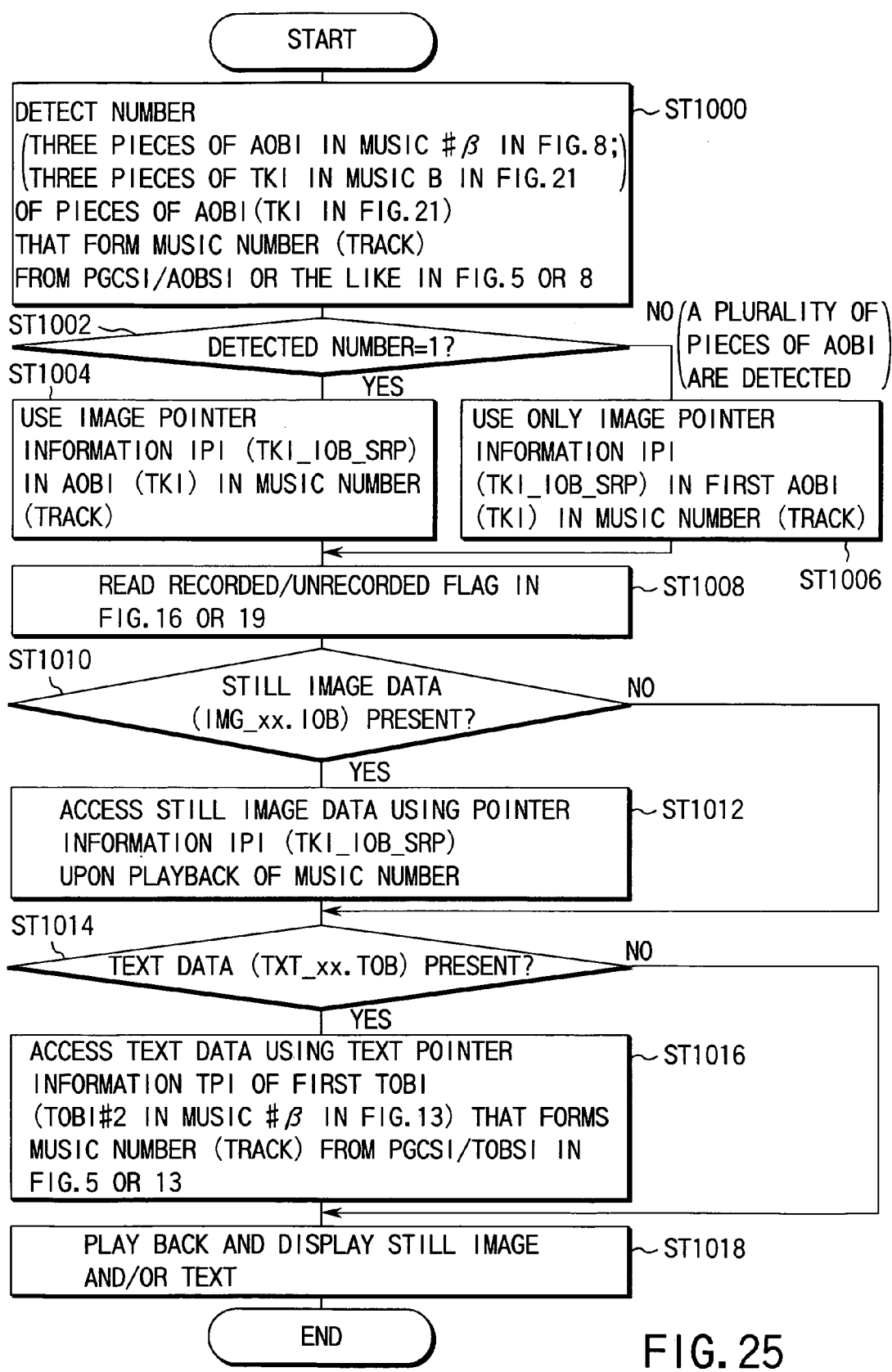

FIG. 25 shows a flow chart for explaining the method of making only an image pointer (IPI) of the first AOBI (TKI) in a music number or tune (track) valid as a pointer of a still image to be displayed when the music number or tune (track) is made up of a plurality of pieces of AOBI (TKI).

Figure 26:
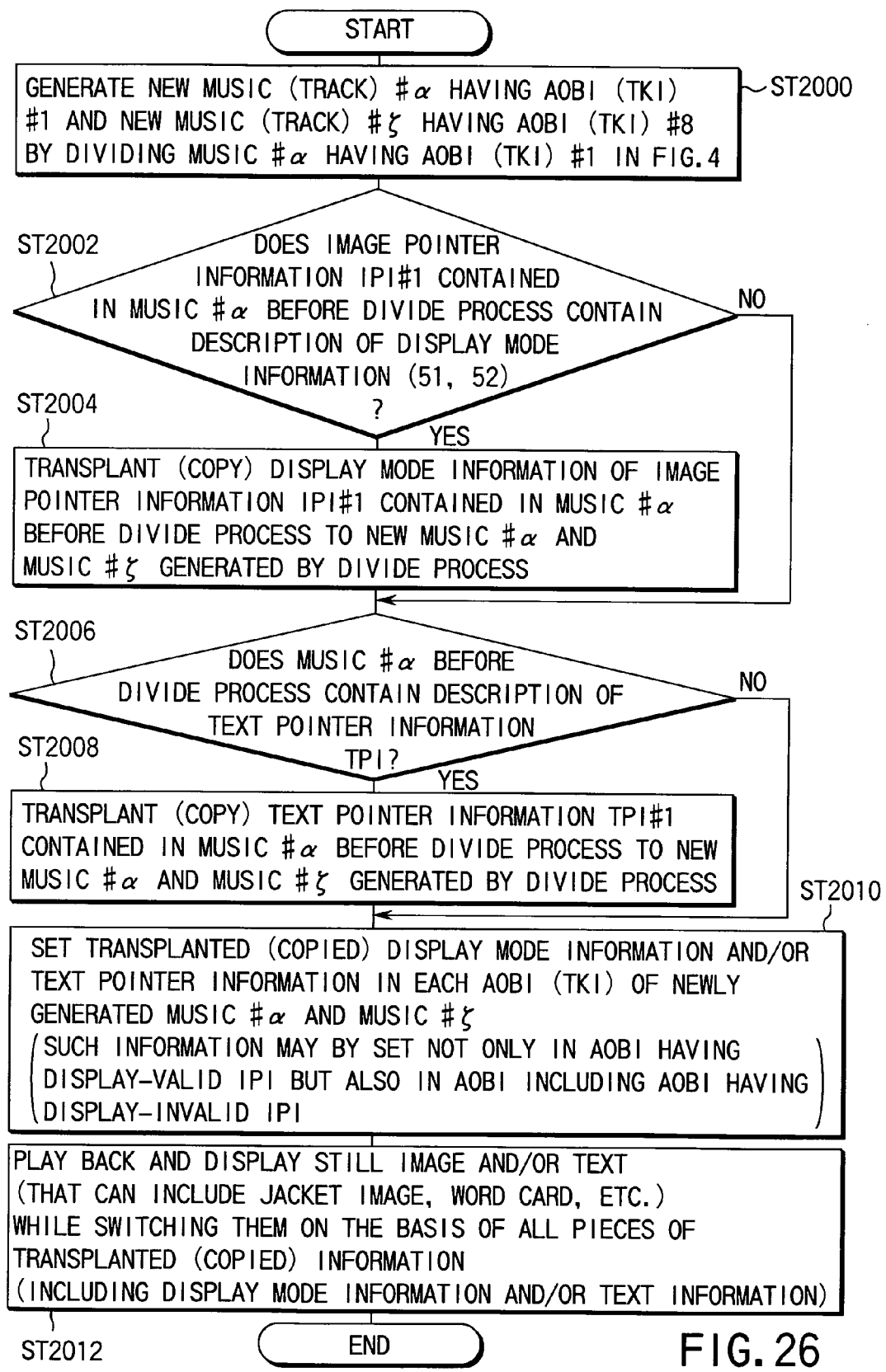

FIG. 26 shows a flow chart for explaining the method of matching the display order mode/still image display timing mode of divided music numbers (or divided tunes) with those before the dividing process, matching text information associated with the divided music numbers with that before the dividing process, and copying all kinds of still image information and text information in newly created AOBI (TKI) from the same kinds of information of AOBI (TKI) older than the new AOBI (TKI).

Figure 27:
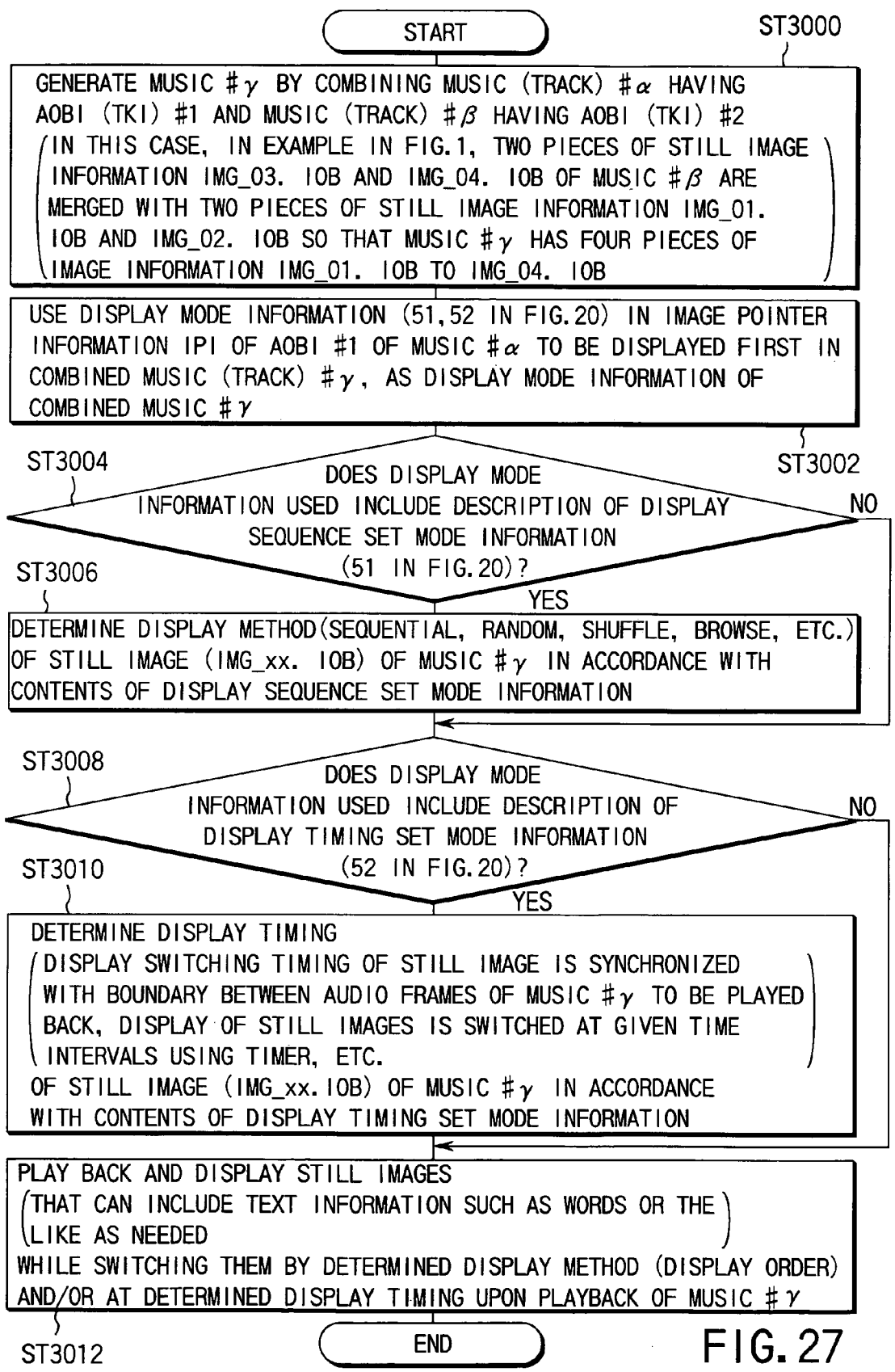

FIG. 27 shows a flow chart for explaining the method of matching the display order mode/still image display timing mode of the combined music number (or combined tune) with those to be played back first by merging still image information in a succeeding music number (or succeeding tune) with that in a preceding music number (or preceding tune) when two music numbers or two tunes (tracks) are combined to generate a new music number or new tune (track).

Figure 28:
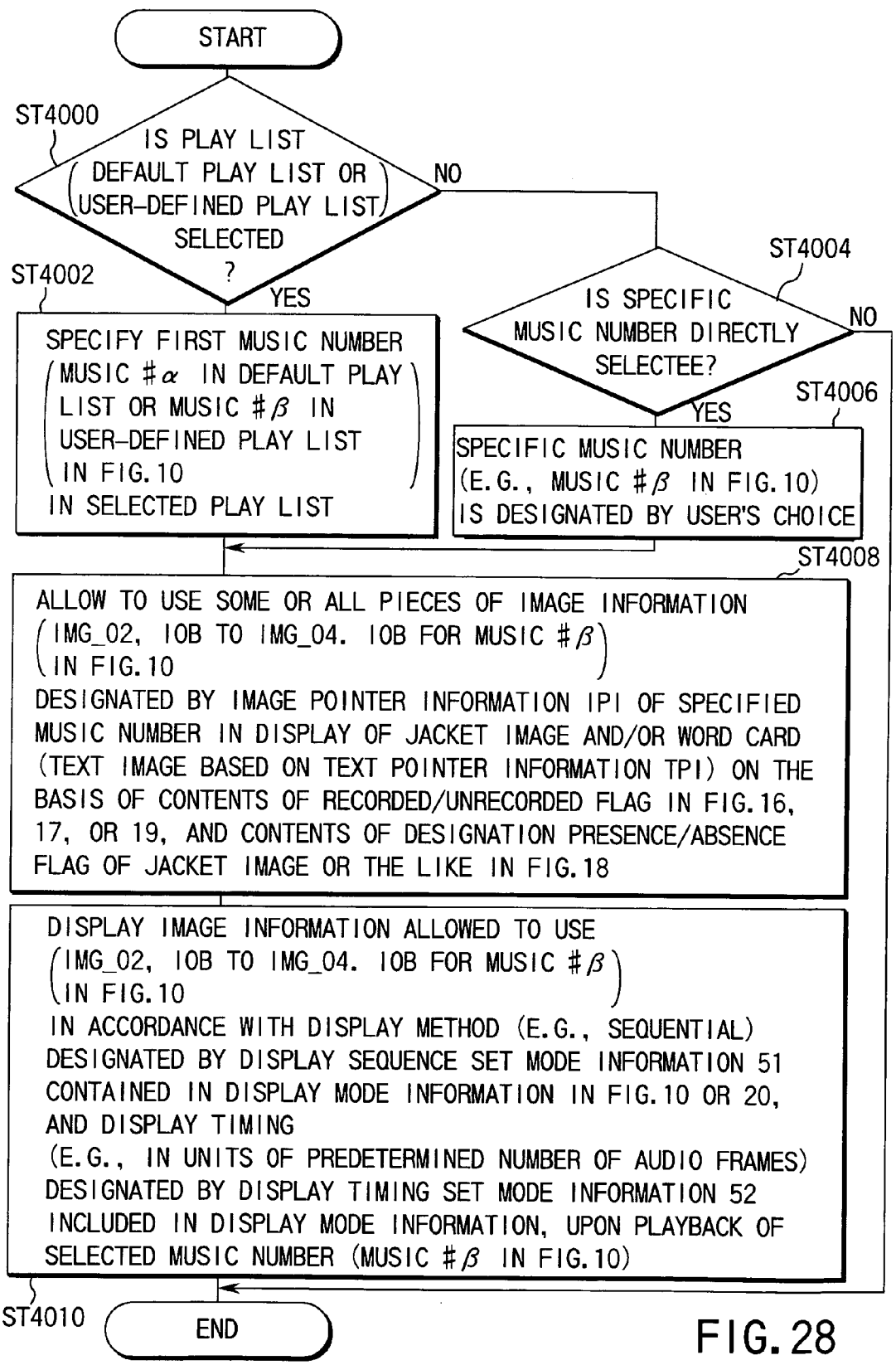

FIG. 28 shows a flow chart for explaining the method of displaying jacket images using still image information of a music number or tune (track) included in a selected play list or a selected music number/selected tune (track) when a play list or music number/tune (track) is selected.

DETAILED DESCRIPTION OF THE INVENTION

Various embodiments of the present invention will be described hereinafter with reference to the accompanying drawings.

Figure 1:
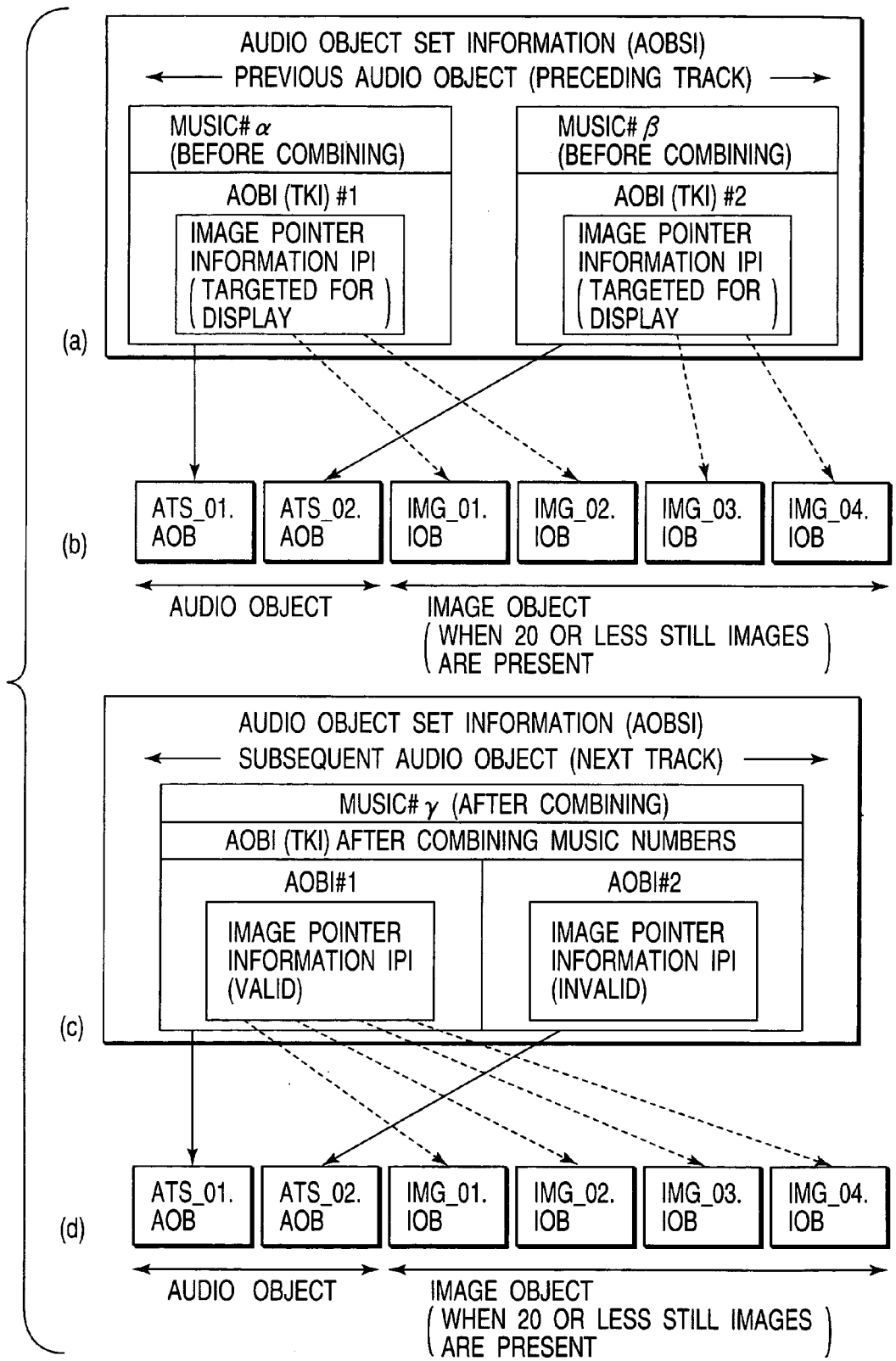
FIG. 1 shows views for explaining a case wherein a plurality of music numbers (tunes) with still images, the total of which is equal to or smaller than a predetermined value (20 images in this case), and which are recorded on an information storage medium (memory card or disc) according to an embodiment of the present invention, are combined by editing.

FIG. 1 shows views for explaining a case wherein a plurality of music numbers (tunes) with still images, the total of which is equal to or smaller than a predetermined value (20 images in this case), and which are recorded on an information storage medium (memory card or disc) according to an embodiment of the present invention, are combined by editing.

As shown in (a) of FIG. 1, music #α and music #β are managed by pieces of audio object information AOBI#1 (or track information TKI#1) and AOBI#2 (or track information TKI#2) as different music numbers or different tunes. These AOBI#1 (TKI#1) and AOBI#2 (TKI#2) respectively have image pointer information IPI, and are managed by audio object set information AOBSI.

As shown in (a) and (b) of FIG. 1, an audio information file (audio object ATS_01.AOB) including the contents of music #α is designated by AOBI#1, and still image files (image objects IMG_01.IOB and IMG_02.IOB) displayed upon playing back this music #α are designated by image pointer information IPI of AOBI#1 (TKI#1).

Also, as shown in (a) and (b) of FIG. 1, an audio information file (audio object ATS_02.AOB) including the contents of music #β is designated by AOBI#2 (TKI#2), and still image files (image objects IMG_03.IOB and IMG_04.IOB) displayed upon playing back this music #β are designated by image pointer information IPI of AOBI#2.

Since the capacity of the information storage medium (or the image buffer size of an apparatus that plays back the medium) which stores the audio object (ATS_xx.AOB) and image objects (IMG_yy.IOB) in (b) of FIG. 1 is limited, the number of still images that can be displayed per music number (or per tune) has an upper limit.

This upper limit is set to fall within the range from around 5 to 100 images in correspondence with the storage capacity of the medium (or the image buffer size of the playback apparatus).

A case will be examined below wherein the playback apparatus can display a maximum of 20 still images per music number (tune).

Furthermore, the example shown in FIG. 1 assumes a case wherein the total of the number of still images of music #α and that of music #β is 20 or less.

Assume a case wherein the user issues an instruction for combining music #α and music #β into a single music #γ (i.e., makes combining edit).

In this case, the two audio information files (ATS_01.AOB and ATS_02.AOB) remain unchanged, and only management information (AOBI/TKI#1 and AOBI/TKI#2) is rewritten.

That is, of information of a program chain (original PGC) indicating the original flow of audio programs, the contents of information corresponding to image pointer IPI of AOBI#1 (TKI#1) and AOBI#2 (TKI#2) are partially rewritten, and the rewritten information (IPI) is re-defined as a portion of music #γ.

The information (IPI) to be written corresponds to IPI# in AOBI# in (c) of FIG. 8 or IPI# in cell information CI# in (b) of FIG. 9 to be described later.

When music #α with still images and music #β with still images with the configuration shown in (a) and (b) of FIG. 1 (these music numbers will be referred to as previous objects in preceding tracks) are combined, single music #γ with still images (this music number will be referred to as a succeeding object located in the next track) is obtained, as shown in (c) of FIG. 1.

In this case, as shown in (c) and (d) of FIG. 1, ATS_01.AOB is designated by AOBI#1 (TKI#1) included in combined music #γ, and ATS_02.AOB is designated by AOBI#2 (TKI#2) included in combined music #γ. Furthermore, all image objects (IMG_01.IOB to IMG_04.IOB) are designated by only image pointer IPI of AOBI#1 (TKI#1) included in music #γ.

More specifically, when "music numbers or tunes are combined", the designation contents of image pointer information IPI in AOBI#1 (TKI#1) before combining and those of image pointer information IPI in AOBI#2 (TKI#2) before combining are recorded together in image pointer information IPI of management information (AOBI/AKI #1) corresponding to an audio information file (ATS_01.AOB) which is played back first in music #γ.

In other words, the management information (AOBI/TKI) of music #γ is obtained by merging the management information (AOBI/TKI#1) of music #α and the management information (AOBI/TKI#2) of music #β.

AS for pointer information IPI that designates still images of music #γ, only pointer information that belongs to the first management information (AOBI/TKI#1) of those (AOBI/AKI) of music #γ is made valid.

That is, image pointer information IPI of AOBI#2 included in music #γ is made invalid in this case, and is not used to designate image objects (IMG_01.IOB to IMG_04.IOB).

In other words, image pointer information IPI of AOBI#1 corresponding to a portion (ATS_01.AOB) which is played back first upon playing back combined music #γ can designate all image objects (IMG_01.IOB to IMG_04.IOB). This is a significant feature of the embodiment shown in FIG. 1.

As a result, upon playing back combined music #γ, the management information (IPI) of AOBI#2 shown in (c) of FIG. 1 need not be temporarily saved in a memory (RAM) in system controller 3020 of an apparatus shown in FIG. 23 (to be described later).

A memory save can be attained in this way, while when only management information AOBI#1 in (c) of FIG. 1 is temporarily saved in the memory (RAM) of system controller 3020, all still image file names that can be displayed upon playing back music #γ can be detected from that information, and the switching timing of each still image file (the position of an audio frame at which a still image is switched when it is played back) can also be detected.

As a result, the required memory size of the RAM in system controller 3020 in FIG. 23 can be reduced, and the manufacturing cost of the apparatus can also be reduced accordingly.

Figure 2:
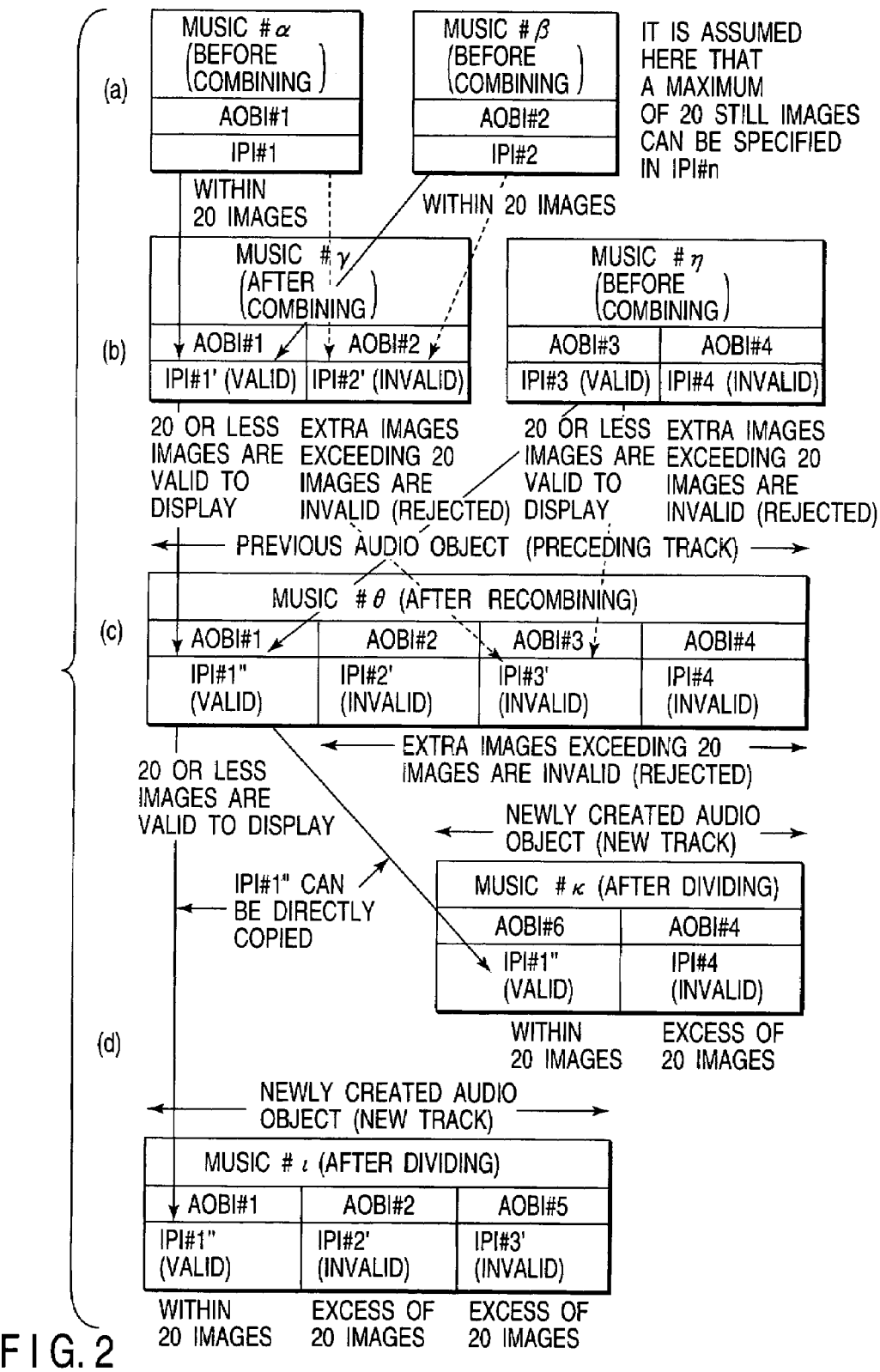
FIG. 2 shows views for explaining a case wherein a plurality of music numbers (tunes) with still images, the total of which exceeds a predetermined value (20 images in this case), and which are recorded on an information storage medium (memory card or disc) according to an embodiment of the present invention, are combined by editing, and a case wherein the combined music number (or combined tune) is divided.

FIG. 2 shows views for explaining a case wherein a plurality of music numbers (tunes) with still images, the total of which exceeds a predetermined value (20 images in this case), and which are recorded on an information storage medium (memory card or disc) according to an embodiment of the present invention, are combined by editing, and a case wherein the combined music number is divided.

Note that FIG. 2 does not illustrate TKI corresponding to AOBI. However, since AOBI corresponds to TKI as in FIG. 1, TKI will be inserted as needed in parentheses in the following description.

When 11 to 20 still image files are set by each of AOBI#1 (TKI#1) and AOBI#2 (TKI#2) in (a) of FIG. 1, the total number of still images after "combining music numbers/combining tunes" exceeds the upper limit (20 images) per music number (per tune). A processing method in such case will be explained below with reference to FIG. 2.

After a plurality of music numbers (#α and #β in (a) of FIG. 2) are combined, when the total number of still images of the combined music (#γ in (b) of FIG. 2) exceeds the number (20 images) of displayable still image per music number (per tune), system controller 3020 in FIG. 23 to be described later appropriately shuffles information (image pointers after overlapping portions for identical still images are rejected) recorded in image pointer information IPI#1 and image pointer information IPI#2 in (a) of FIG. 2.

For example, system controller 3020 selects 20 image pointers of those of shuffled 20 or more still images in turn from the first one, thus choosing still images to the number of displayable images (20 images) per combined music number/combined tune (#γ).

As shown in (c) of FIG. 2, the chosen 20 still images are recorded in image pointer information IPI#1' of AOBI#1 (TKI#1) of combined music #γ, and non-selected still images (extra images exceeding 20 images) are recorded in image pointer IPI#2' of AOBI#2 (TKI#2) to be played back later in single music #γ.

Then, still images to be displayed upon playing back music #γ after music #α and music #β are combined are only (20) still images designated within image pointer IPI#1' present in management information (AOBI#1) that pertains to the audio information file which is played back first in music #γ.

When the user is dissatisfied with still images selected by system controller 3020 in FIG. 23 in a combining process of music #γ, he or she can exchange information between image pointer information IPI#1' and image pointer information IPI#2' using still image designation information (image pointer) recorded in image pointer information IPI#2' not selected (i.e., which is rejected and is tentatively invalid).

Information exchange between image pointer information IPI#1' and image pointer information IPI#2' can be done by an information recording/playback apparatus (multi-function editor) with advanced edit functions or a personal computer PC installed with required application programs.

Likewise, when music #γ with 20 or less display images (IPI#1') and rejected images (IPI#2') exceeding 20 images, and music #η with 20 or less display images (IPI#3) and rejected images (IPI#4) beyond 20 images are combined again, and the total number of still images to be displayed exceeds the predetermined value (20), display images (IPI#1") of re-combined music #θ are 20 images selected after information of image pointer information IPI#1' and information of image pointer information IPI#3 are shuffled.

Information (image pointers) indicating other rejected images is recorded in image pointer information IPI#2', image pointer information IPI#3', and image pointer information IPI#4 of AOBI#2, AOBI#3, and AOBI#4.

At this time information (image pointers) in each of image pointer information IPI#2' and image pointer information IPI#4 remains unchanged. This is because still images designated in image pointer information IPI#2' and image pointer information IPI#4 respectively have links to the contents of audio information files managed by AOBI#2 and AOBI#4.

As shown in (b) and (c) of FIG. 2, when music #θ is obtained by combining music #γ and music #η, if information (image pointers to rejected images) in image pointer information IPI#2' and IPI#4 remains unchanged, the user can choose still images that match divided audio information (the contents of divided music numbers or divided tunes) by re-editing using the multi-function editor or personal computer PC after music #θ is divided in future.

If no re-edit is done, rejected images designated by image pointer information IPI#2', image pointer information IPI#3', and image pointer information IPI#4 in (c) of FIG. 2 are displayed neither upon playback of music #θ nor upon playback of music numbers (#ι and #κ in (d) of FIG. 2) obtained by dividing music #θ.

A processing method upon dividing music #θ (which is assumed to be a previous object in a preceding track) into two music numbers will be explained below.

A case will be examined below wherein music #θ is divided into music #ι and music #κ (assumed to be new objects created on new tracks) in, e.g., the middle of AOBI#3 (TKI#3) in (c) of FIG. 2.

In this case, an audio information file corresponding to AOBI#3 (TKI#3) is divided into two files. From management information AOBI#3 before the dividing process, AOBI#5 (TKI#5) ((d) of FIG. 2) corresponding to an audio information file to be played back last in divided music #ι is created.

Still image information to be displayed during playback of divided music #ι is designated by image pointer information IPI#1"((d) of FIG. 2) in AOBI#1 (TKI#1) corresponding to an audio information file to be played back first in music #1.

At this time, AOBI#1 (TKI#1) in (d) of FIG. 2 has the same image pointer information IPI#1" as that of AOBI#1 (TKI#1) in (c) of FIG. 2. That is, information of image pointer information IPI#1" before the dividing process shown in (c) of FIG. 2 is directly copied to AOBI#1 (TKI#1) in (d) of FIG. 2.

Likewise, from management information AOBI#3 (TKI#3) before the dividing process, AOBI#6 (TKI#6) ((d) of FIG. 2) corresponding to an audio information file to be played back first in divided music #κ is created. Still picture information to be played back during playback of music #κ is designated by image pointer information IPI#1" ((d) of FIG. 2) in AOBI#6.

At this time, AOBI#6 (TKI#6) in (d) of FIG. 2 has the same image pointer information IPI#1" as that of AOBI#1 in (c) of FIG. 2. That is, information of image pointer information IPI#1" before the dividing process shown in (c) of FIG. 2 is directly copied to AOBI#6 (TKI#6) in (d) of FIG. 2.

Since the number of display images of music #θ before the dividing process has been limited to 20 in the previous process, if image pointer IPI#1" having information (image pointers) that point to these 20 images is directly copied to divided music #ι and music #κ, no problem is posed in terms of the number of still images to be displayed.

Note that image pointer information IPI#1" copied to display still images upon playing back music #κ may have contents which do not match AOBI#6 (TKI#6). In this case, the user can change the contents (image pointers) of image pointer information IPI#1" to those which match the contents (audio information designated by AOBI/TKI#6) of divided music #κ by re-editing them using the multi-function editor or personal computer PC.

The combining/dividing method for music number described with reference to FIGS. 1 and 2 is a processing method complying with the data structure shown in FIG. 8 to be described later. However, the present invention is not limited to such specific method, and the music number combining/dividing process of FIGS. 1 and 2 may be executed in accordance with the data structure shown in FIG. 9 to be described later.

Figure 9:
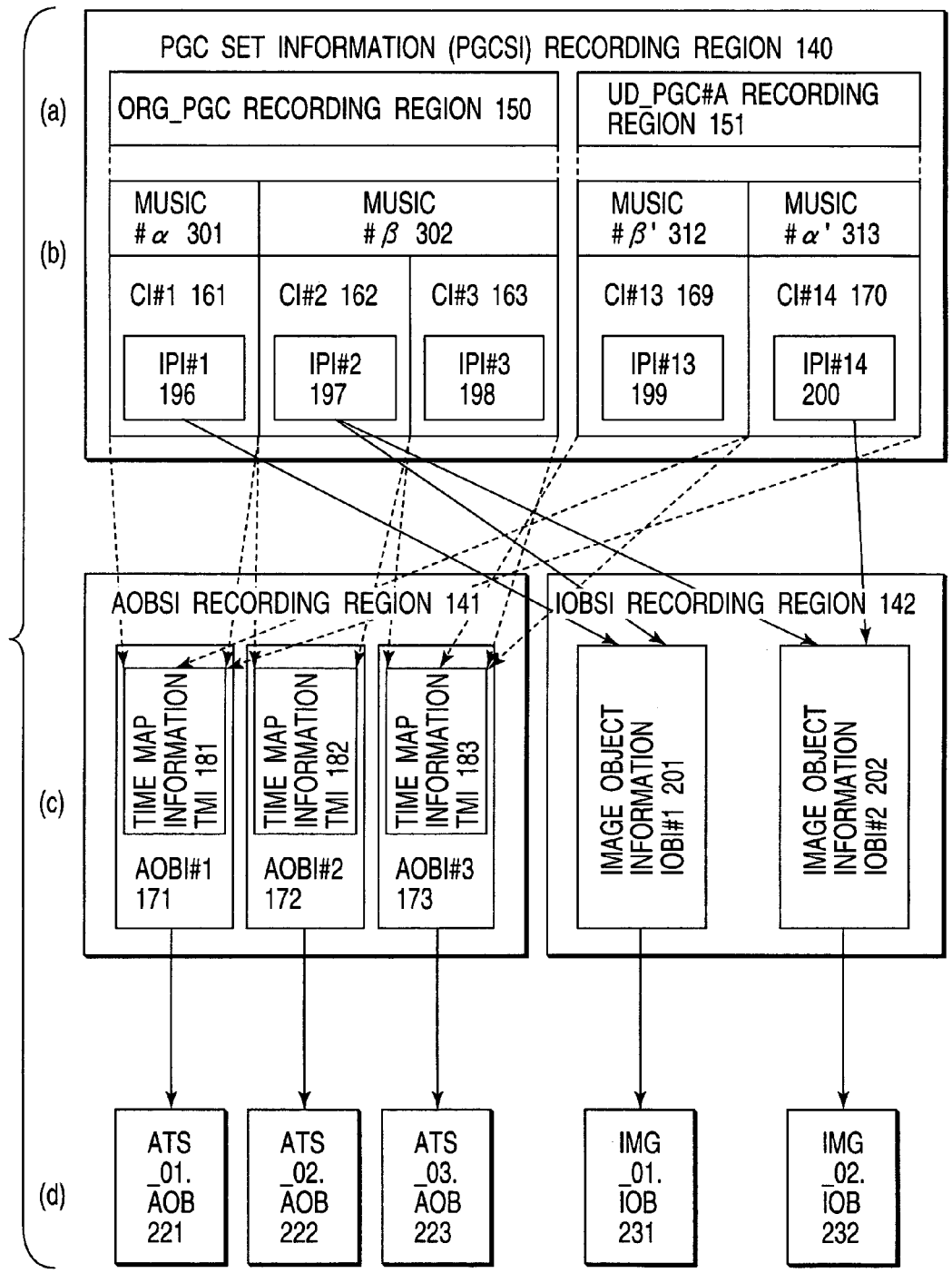
FIG. 9 shows views for explaining another example of the playback relationships (arrows in FIG. 9) between a plurality of music numbers (or tunes) and still images appended to these music numbers, which are stored in the information storage medium shown in FIG. 5 or FIG. 6.

Note that image pointer information IPI is recorded not in audio object information AOBI (TKI) but in cell information CI when the music number/tune combining/dividing process is executed in accordance with the data structure shown in FIG. 9.

Furthermore, the aforementioned image pointer information IPI forms a part of all kinds of information that pertain to still picture objects.

Figure 3:
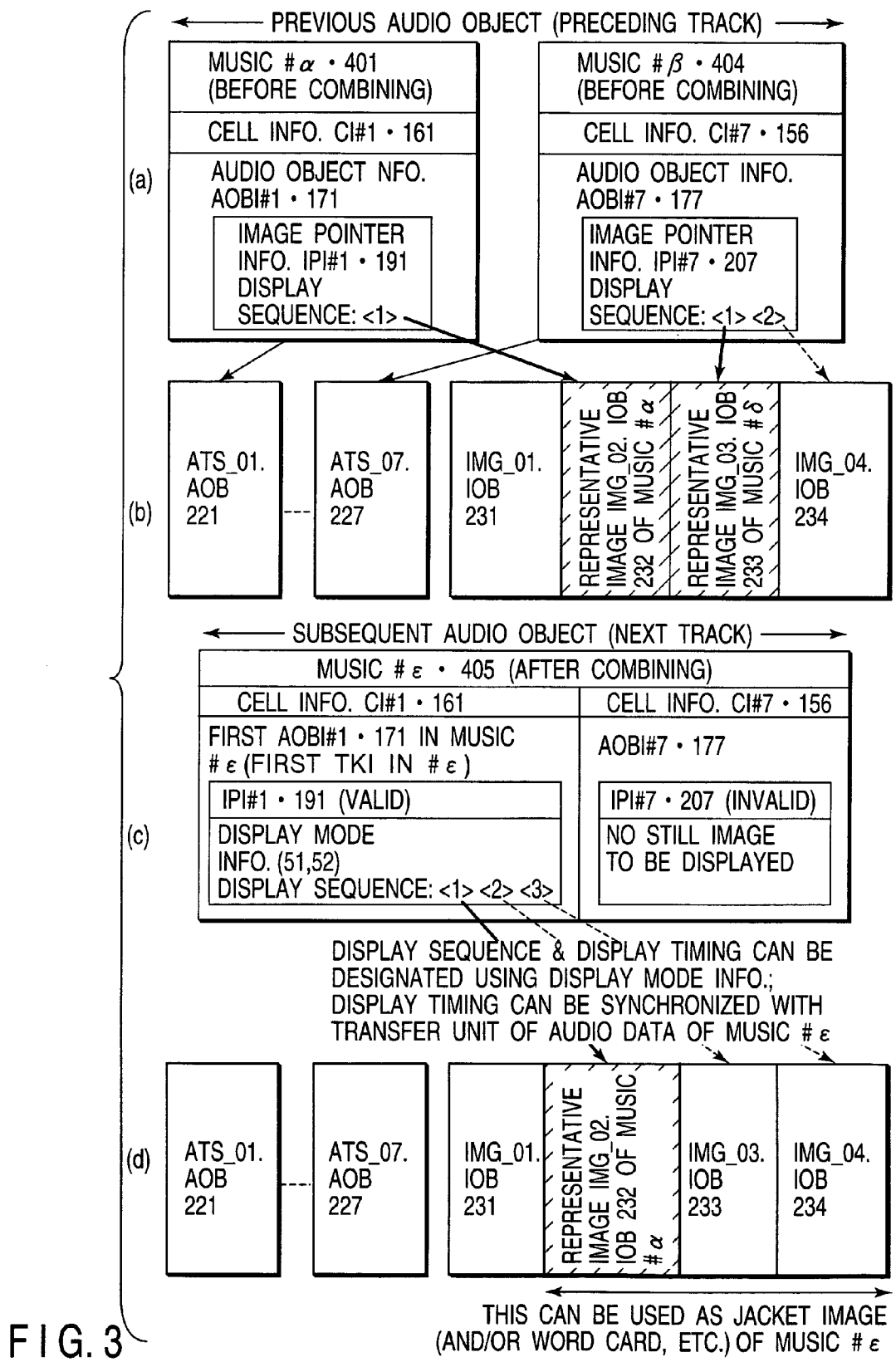
FIG. 3 shows views for explaining the way in which display mode information of the combined music number (or combined tune) is handled when a plurality of music numbers (or tunes) with still images recorded on the information storage medium (memory card or disc) are combined by editing.

FIG. 3 shows views for explaining the way in which display mode information of the combined music number is handled when a plurality of music numbers with still images recorded on the information storage medium (memory card or disc) are combined by editing.

Note that the subsequent figures do not describe TKI corresponding to AOBI, but TKI corresponds to AOBI as in FIG. 1 or FIG. 2.

A method of setting a jacket image in units of music numbers (in units of tunes) or setting a representative image of a given music number (given tune) upon a "music combine/tune combine" process will be explained below using FIG. 3.

A case will be examined below wherein a single still image (IMG_02.IOB) is displayed upon playing back music #α before the combining process, and two still images (IMG_03.IOB and IMG_04.IOB) are displayed upon playing back music #δ. (These music #α and music #δ are assumed to be previous objects located on preceding tracks. Also, combined music #ε is assumed to be a succeeding object located in the next track.)

Upon playing back music #α, IMG_02.IOB is displayed as a representative image of that music number. However, since IMG_03.IOB is displayed first upon playing back music #δ, IMG_03.IOB is set as a representative image of music #δ.

Representative images shown in (b) of FIG. 3 can be used as some (or all) of jacket images for music #α or music #δ, or can be used as some (or all) of jacket images for the entire medium (a card shown in FIG. 5 or a disc shown in FIG. 6) that records these music numbers.

After the combining process, as shown in (c) and (d) of FIG. 3, AOBI#1 and AOBI#7 themselves remain unchanged, and ATS_01.AOB and ATS_07.AOB as audio information files also remain unchanged. However, all pieces of information that pertain to still pictures are concentrated in IPI#1 in AOBI (TKI) #1 as management information for audio information file ATS_01.AOB to be played back first in music #ε together with display mode information indicating the display order/display timings of one or more still images and jacket image setting information or representative image setting information.

The display order is IMG_02.IOB, IMG_03.IOB, and IMG_04.IOB in correspondence with that before the combining process shown in (a) of FIG. 3. (This display order or display sequence can be specified by display mode information to be described later with reference to FIG. 10 or FIG. 20.)

As a representative image (or jacket image) for combined music #ε, IMG_02.IOB to be displayed first is automatically set.

In the configuration shown in FIG. 3, IMG_02.IOB to IMG_04.IOB including an image object set as the representative image can be used not only as a jacket image of music #ε, but also as word cards including images of words (text information) of that music number.

The display order and display timings of one or more jacket images or word cards can be determined by display mode information (51, 52) in FIG. 20.

Figure 22:
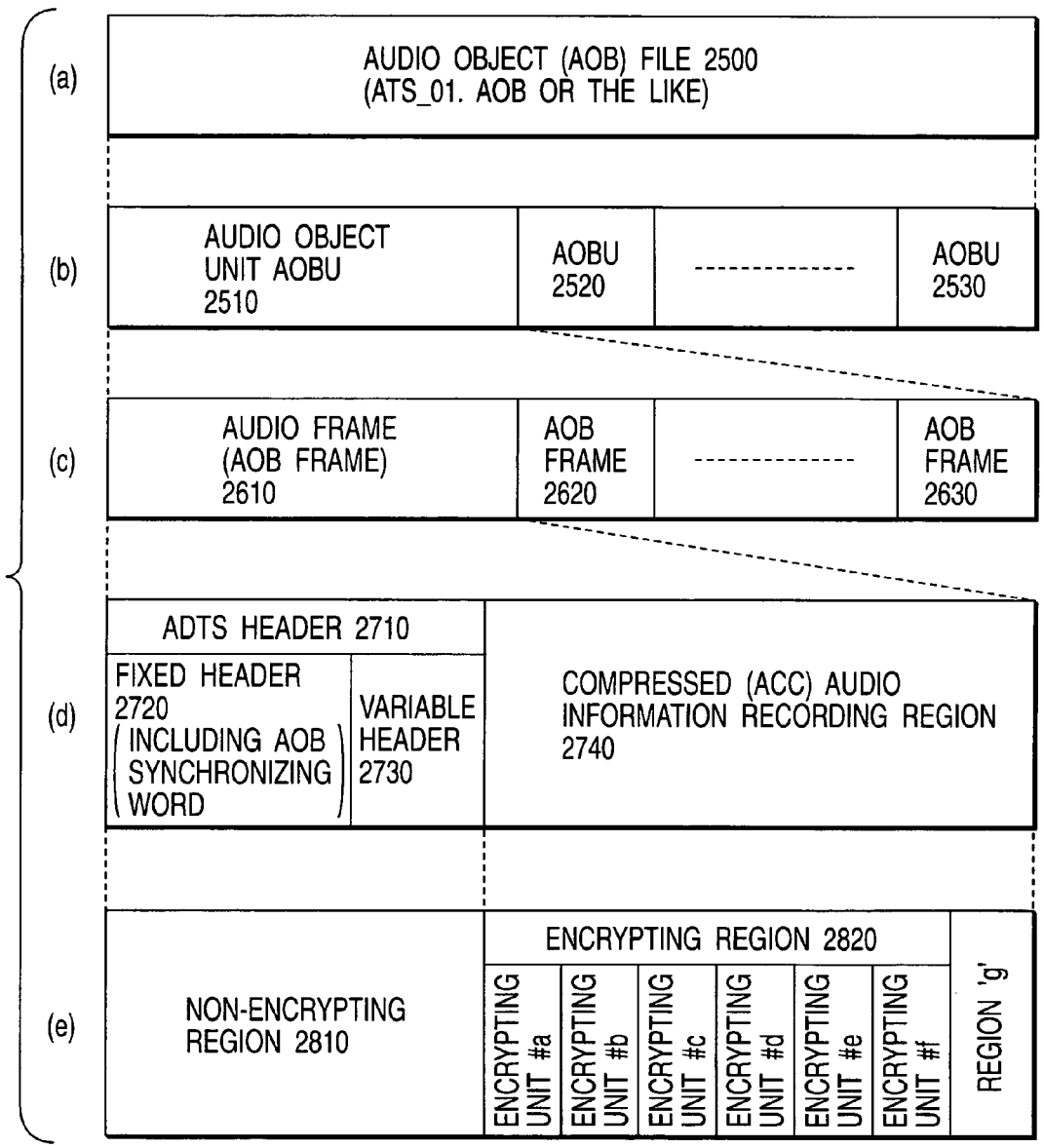
FIG. 22 shows views for explaining an example of the format (data structure) when encrypted audio information is recorded on the audio card with the copy protection function shown in FIG. 5.

Furthermore, the display timings of one or more jacket images or word cards can be determined in synchronism with audio frames (transfer units of audio data) in (c) of FIG. 22. In this way, words can be displayed while being switched along with the progress of song.

Note that display mode information (FIG. 10, FIG. 20) of still images (jacket image, word cards, and the like) of music #ε is recorded in the first AOBI (first TKI) of music #ε. In music #ε, only this first AOBI (first TKI) is valid (for still image display control).

Figure 4:
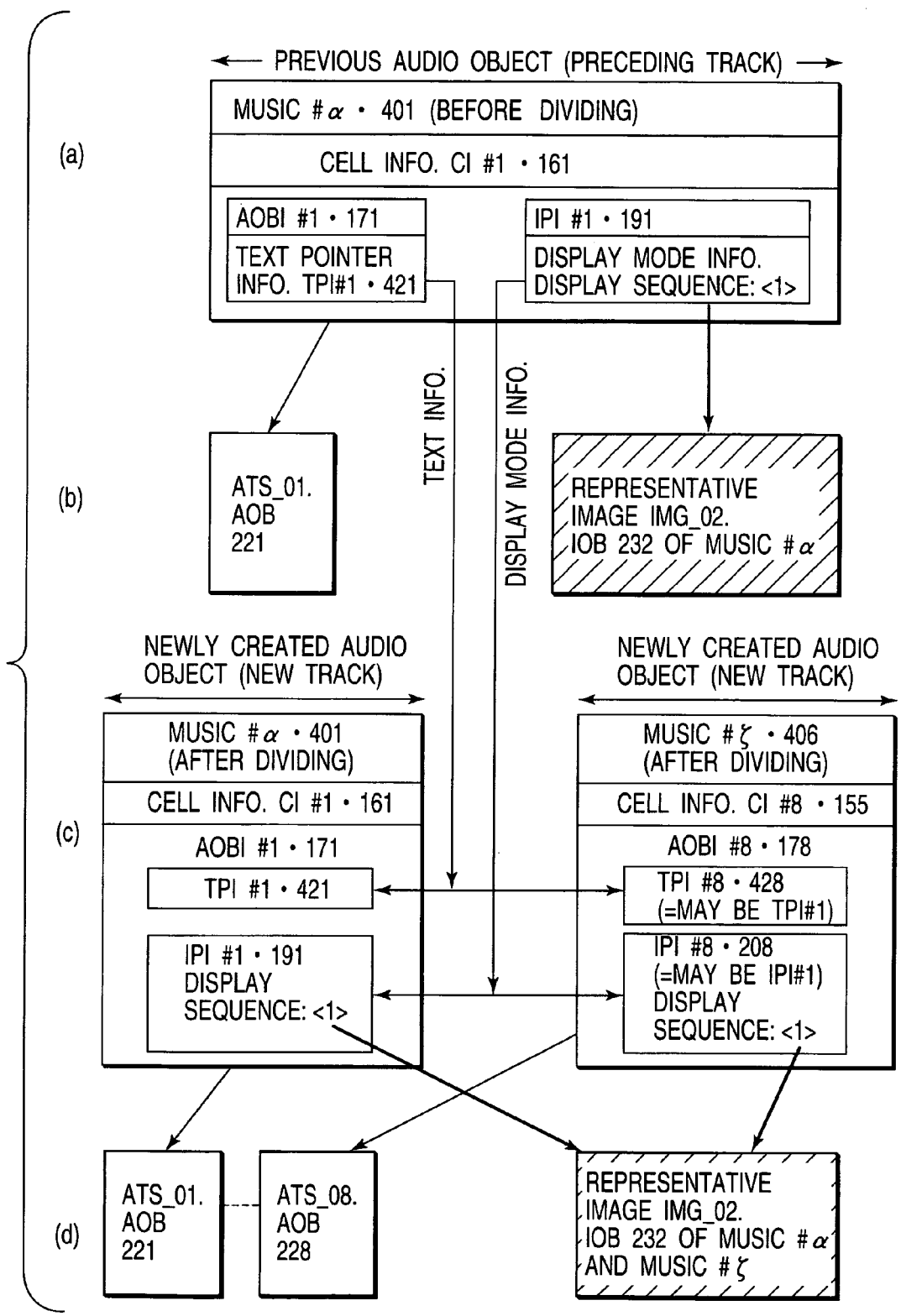
FIG. 4 shows views for explaining the way in which display mode information and text information of divided music numbers (or divided tunes) are handled when a music number (or tune) with still images recorded on the information storage medium (memory card or disc shown) is divided by editing.

FIG. 4 shows views for explaining the way in which display mode information, text information, and the like of divided music numbers are handled when a music number with still images recorded on the information storage medium (a card shown in FIG. 5 or a disc shown in FIG. 6) is divided by editing.

A method of setting a jacket image in units of music numbers (in units of tunes) or setting a representative image of that music number (tune) upon a "dividing music number (dividing tune)" process will be explained below using FIG. 4.

Assume that one still image IMG_02.IOB is displayed upon playing back music #α ((a) of FIG. 4) before the dividing process, and IMG_02.IOB is set as a representative image (or jacket image) indicating the contents of this music #α.

When music #α in (a) of FIG. 4 is divided into music #α and music #ζ by the music number dividing process, as shown in (c) of FIG. 4, original audio object information (AOBI#1 in (a) of FIG. 4 is divided into AOBI#1 and AOBI#8 ((c) of FIG. 4). Also, as shown in (d) of FIG. 4, the audio information file is divided into ATS_01.AOB and ATS_08.AOB in accordance with the dividing situation.

At this time, the contents of text pointer information TPI#1 and image pointer information IPI#1 in AOBI#1 before the dividing process are directly copied to TPI#1 and IPI#1 in AOBI#1 and TPI#8 and IPI#8 in AOBI#8 after the dividing process.

As a result, IMG_02.IOB ((d) of FIG. 4) is designated as the representative images or jacket images (or word cards including word text) for both music #α and music #ζ.

The aforementioned text pointer information TPI forms a part of all kinds of information that pertain to text.

FIG. 5 shows views for explaining the data structure (recording format) of information recorded in audio card (memory card) 100 as an information storage medium according to an embodiment of the present invention.

The information storage medium (audio card/memory card) shown in FIG. 5 has a card shape as large as the size of a name card, a stick of gum, or a stamp, and comprises electrodes (not shown in FIG. 5) for connecting an external apparatus (not shown in FIG. 5) at a predetermined position on the outer side of card 100. As will be described later, information is input/output from/to an information playback apparatus or information recording/playback apparatus (see FIG. 23) using card 100 in FIG. 5 via these electrodes.

The main body of this audio card/memory 100 comprises a semiconductor IC prepared by assembling a microcomputer and its peripheral devices in a 64 MB flash memory (EEPROM).

As shown in (a) of FIG. 5, audio card 100 has a copy protection function, and can prevent illicit copy or use of information recorded in audio card 100.

That is, with respect to an external apparatus (information playback apparatus or information recording/playback apparatus), audio card 100 itself (A) makes mutual authentication and cipher key (encryption key) exchange, (B) inputs and outputs encrypted information, and (C) allows only a partner (information playback apparatus or information recording/playback apparatus) authenticated by audio card 100 to use correct (decrypted) information.

Such mutual authentication, cipher key (encryption key) exchange, encryption/decryption (decipher) of information, and information I/O interface process are executed by control CPU (MPU) 101 in the audio card.

A program executed by control CPU 101 in the audio card is stored in authentication/key exchange & I/O process related control program recording ROM 102.

In the information playback apparatus or information recording/playback apparatus (see FIG. 23), authentication/identification is done for each audio card 100 to manage security of information transferred and input to each card 100.

As a security means for information management in units of cards done by the information recording/playback apparatus, audio card 100 has a unique ID, and can set a unique cipher key.

That is, the unique ID (the manufacturer name, product name, lot number, serial number, or the like) assigned to each audio card 100 and unique cipher key (encryption key) information are recorded in card unique ID information & key information recording region (RAM) 103.

Audio card 100 with the copy protection function also has application data recording region (RAM) 104, which can record audio information (audio object AOB), still image information (image object IOB), text information (text object TOB), management information (AOBSI.IFO, IOBSI.IFO, and TOBSI.IFO in FIG. 7) that manages those information, and the like.

As shown in (b) of FIG. 5, application data recording region (RAM) 104 is made up of boot information recording region 110, file allocation table (FAT) recording region 111, root directory information recording region 112, and data region 113.

That is, the file format of data recorded in application data recording region (RAM) 104 adopts the FAT format.

When audio card 100 with the copy protection function shown in FIG. 5 is inserted into the information recording/playback apparatus (see FIG. 23), the information recording/playback apparatus reads information recorded in boot information recording region 110, and automatically boots (activates) itself.

After that, when the information recording/playback apparatus plays back desired information (music, still images, and the like) from card 100, it reads file allocation information in FAT recording region 111 to detect the storage address of desired information to be played back, and accesses application data recording region (RAM) 104 based on the detected address.

In data region 113, audio related information recording region 121 and one or more general computer information recording regions 120 can be arbitrarily set together, as shown in (c) of FIG. 5.

As shown in (d) of FIG. 5, audio related information recording region 121 is comprised of management information recording region 130, audio object (AOB) recording region 131, image object (IOB) recording region 132, and text object (TOB) recording region 133.

Audio information recorded in audio card 100 is stored in AOB recording region 131, still image information recorded in audio card 100 is stored in IOB recording region 132, and text information recorded in audio card 100 is stored in TOB recording region 133.

On the other hand, management information (map information or the like) that pertains to these audio information, still image information, and text information, and management information (search pointers or the like) indicating links among information are stored in management information recording region 130.

This management information recording region 130 is divided into four recording regions, as shown in (e) of FIG. 5.

That is, management information recording region 130 is made up of program chain set information (PGCSI) recording region 140, audio object set information (AOBSI) recording region 141, image object set information (IOBSI) recording region 142, and text object set information (TOBSI) recording region 143.

PGCSI recording region 140 is formed of original PGC (ORG_PGC) information recording region 150 for storing information of an original program chain, and one or more user-defined PGC (UD_PGC) recording regions 151, 152, . . . , for storing information of new program chains defined by the user in use of card 100, as shown in (f) of FIG. 5.

ORG_PGC information recording region 150 is comprised of recording region 160 of information indicating the total number of cells (information units that form a PGC) present in the original PGC, and one or more cell information (CI) recording regions 161, 162, . . . , as shown in (g) of FIG. 5.

In audio card (memory card) 100 with the aforementioned data structure, the recorded contents such as music information, and the like are stored at corresponding locations in recording regions 131 to 133 in (d) of FIG. 5.

Also, management information (a method of playing back an edited music number (edited tune) and corresponding images/text, and the like) after the user has edited the stored recorded contents (e.g., processes for combining music number, dividing music number, erasing music number, moving music number. and so on) is stored at a corresponding location in recording region 130 in (d) of FIG. 5.

In the embodiment of the present invention, as memory card 100 with the copy protection function shown in FIG. 5, an audio card that records audio information/image information/text information protected from illicit copy/illicit use is assumed.

However, memory card 100 shown in FIG. 5 can be used to record not only such audio information but also application files (or PC data) such as a wordprocessor, spreadsheet, and the like used in general personal computer PC (a recording region for such data is denoted by 120 in (c) of FIG. 5).

In this case, using the authentication/key exchange & I/O related control program stored in ROM 102 and card unique ID and key information stored in RAM 103 in (a) of FIG. 5 as needed, application files (or PC data) such as a wordprocessor, spreadsheet, game, and the like can be prevented from being illicitly copied/used.

That is, memory card 100 shown in FIG. 5 can be used as package media that distribute computer programs (application programs, game programs, and the like) to be protected from illicit copy/use (for pay or free).

Figure 6:
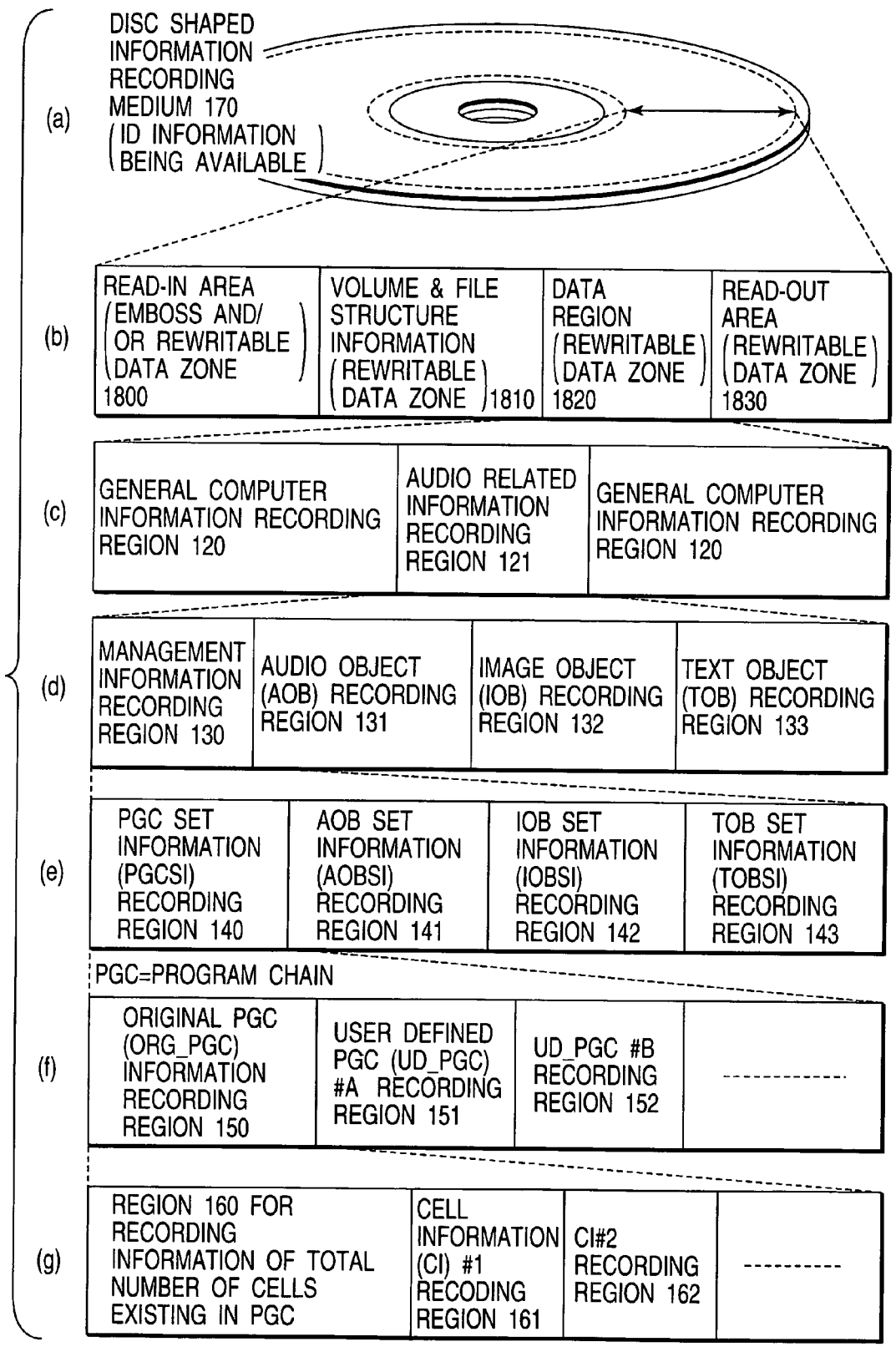
FIG. 6 shows views for explaining the recording format of an optical disc as an information storage medium according to another embodiment of the present invention.

FIG. 6 shows views for explaining the recording format of an optical disc as an information storage medium according to another embodiment of the present invention.

Audio card (memory card) 100 shown in (a) of FIG. 5 is a card-shaped medium which does not move itself in use, but disc-shaped medium 170 shown in (a) of FIG. 6 itself rotates in use.

As an example of recordable/reproducible disc-shaped medium 170, a hard disc drive HDD (especially, HDD using a removable recording medium), large-capacity floppy disc drive FDD (recently, FD with a capacity of 100 MB or more is commercially available), magnetooptical MO, DVD-RAM, DVD-R, DVD-RW, and the like are known.

The file format of the HDD or MO adopts the FAT format that has been explained with reference to (b) of FIG. 5, but the DVD-RAM, DVD-R, DVD-RW, and the like adopt the universal disc format (UDF).

Rewritable data region 1820 in (b) of FIG. 6 has a hierarchical data structure shown in (c) to (g) of FIG. 6. This data structure is the same as that which has already been explained with reference to (c) to (g) of FIG. 5.

Upon accessing information (for example, files in the directory structure shown in FIG. 7 to be described later) recorded on disc-shaped medium 170, volume & file structure information 1810 is played back first. This volume & file structure information 1810 includes UDF information used to access data files shown in FIG. 7.

Figure 7:
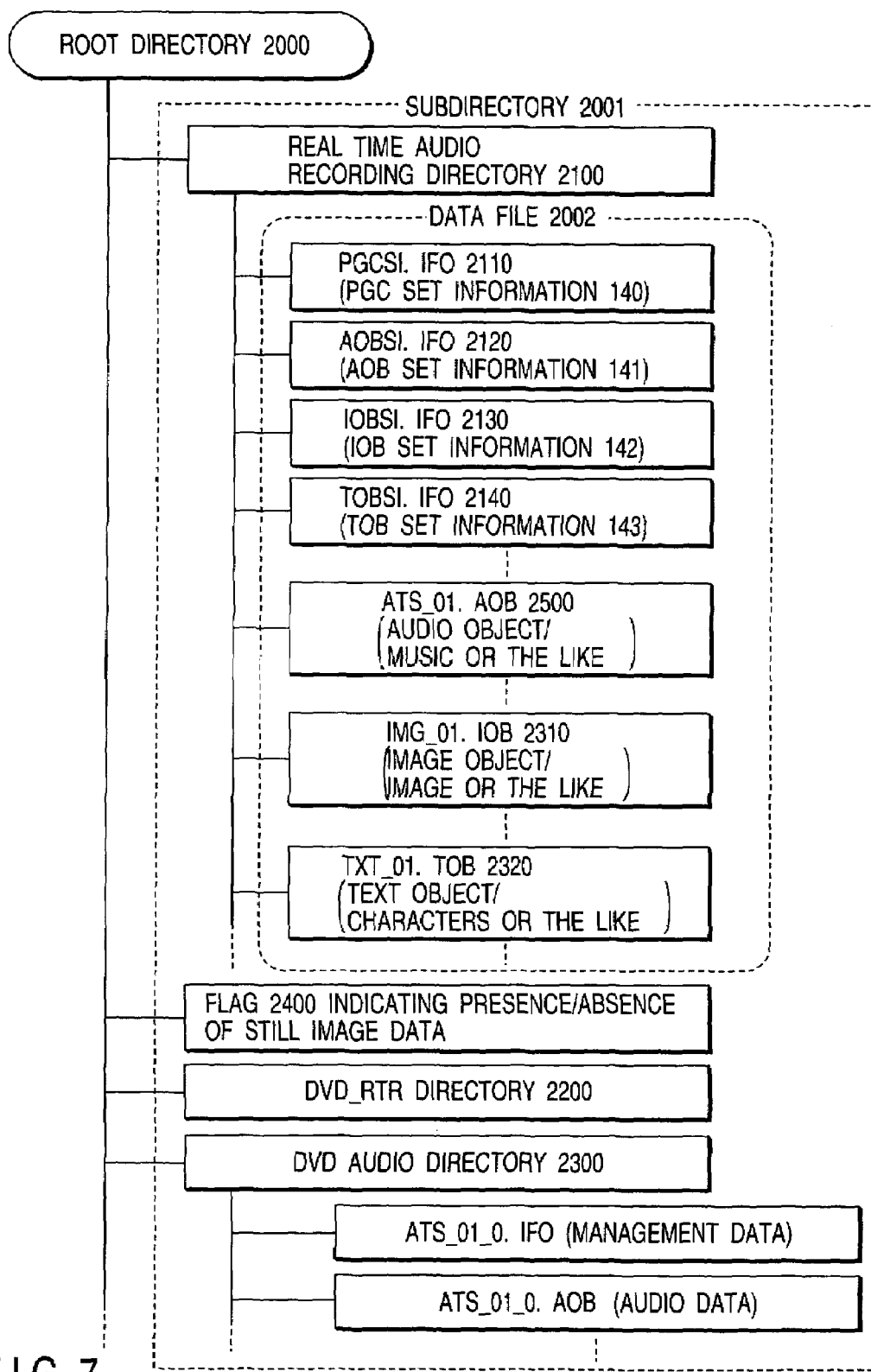
FIG. 7 shows a view for explaining the directory configuration (hierarchical structure of recorded files) of various kinds of information stored in the information storage medium shown in FIG. 5 or FIG. 6.

FIG. 7 is a view for explaining the directory configuration (hierarchical structure of recorded files) of various kinds of information stored in memory card 100 in FIG. 5 that adopts FAT or disc-shaped medium 170 in FIG. 6 that adopts UDF.

Information recorded in application data recording region (RAM) 104 in (a) of FIG. 5 has a hierarchical directory structure as shown in FIG. 5, and information in root directory 2000 in FIG. 7 is recorded in root directory information recording region 112 in (b) of FIG. 5.

Alternatively, information recorded in data region 1820 in (b) of FIG. 6 has a hierarchical directory structure shown in FIG. 7, and information in root directory 2000 in FIG. 7 is recorded in volume & file structure information 1810 in (b) of FIG. 6.

Even when either audio card 100 with the copy protection function that adopts the FAT format, as shown in FIG. 5, or disc-shaped information storage medium 170 that adopts the UDF format, as shown in FIG. 6 is used as the information storage medium, information recorded in the information storage medium is recorded in units of files, as shown in FIG. 7.

Audio information (AOB) with still images (IOB) described with reference to FIGS. 1 and 2 is recorded together in subdirectory 2001 named real-time audio recording directory 2100, as shown in FIG. 7.

This real-time audio recording directory 2100 has data file 2002 including files 2110 to 2140, 2310, 2320, 2500, . . . to be described below as subdirectories.

Audio information (audio object AOB) recorded in the information storage medium shown in FIG. 5 or FIG. 6 is recorded in units of files such as ATS_01.AOB 2500, and the like, as shown in FIG. 7. Details of audio object file (audio information file) 2500 will be explained later with reference to FIG. 22.

These audio information files (ATS_01.AOB 2500, . . . ) are recorded and saved in audio object recording region 131 in (d) of FIG. 5 or 6.

Image information (image object IOB) recorded in the information storage medium shown in FIG. 5 or FIG. 6 is recorded as independent files like IMG_01.IOB 2310, etc., in units of images (still images), as shown in FIG. 7.

These image information files (IMG_01.IOB 2310, . . . ) are recorded and saved in image object recording region 132 in (d) of FIG. 5 or 6.

Furthermore, the information storage medium shown in FIG. 5 or FIG. 6 can record text information (text object TOB) such as words, comments for played music numbers (tunes), profiles of a player, and the like in units of files like TXT_01.TOB 2320, . . . , as shown in FIG. 7.

These text information files (TXT_01.TOB 2320, . . . ) are recorded and saved in text object recording region 133 in (d) of FIG. 5 or 6.

All pieces of management information that pertain to audio information (audio object AOB) recorded in audio object recording region 131 are recorded together in single file 2120 named AOBSI.IFO, as shown in FIG. 7. The recording location of this AOBSI.IFO file is audio object set information AOBI recording region 141 in (e) of FIG. 5 or 6.

All pieces of management information that pertain to still image information (image object IOB) recorded in image object recording region 132 are recorded together in file 2130 named IOBSI.IFO. The recording location of this IOBSI.IFO file 2130 is image object set information recording region 142 in (e) of FIG. 5 or 6.

Likewise, all pieces of management information that pertain to text information (text object TOB) recorded in text object recording region 133 are recorded together in file 2140 named TOBSI.IFO. The recording location of this TOBSI.IFO file 2140 is text object set information recording region 143 in (e) of FIG. 5 or 6.

Even when the information storage medium has a shape of either audio card 100 with the copy protection function or disc-shaped information storage medium 170, all pieces of management information that indicate the playback order of all pieces of audio information (all AOBS) recorded in the information storage medium are recorded together in single file 2110 named PGCSI.IFO, as shown in FIG. 7. The recording location of this PGCSI.IFO file 2110 is program chain set information recording region 140 in (e) of FIG. 5 or 6.

Note that a program chain (PGC) is made up of one or more cells C, as will be described later, and has a structure that can define the playback sequence (or playback order) of music numbers (tunes) in the PGC by means of the layout order (or arrangement) of cells C, as shown in (b) of FIG. 8, or in (g) of FIG. 5 or 6.

When data of recordable/reproducible DVD video (DVD_RTR) is recorded in the data region of the medium shown in FIG. 5 or FIG. 6, DVD_RTR directory 2200 including DVD_RTR data files is assured as a subdirectory of root directory 2000 in FIG. 7.

When data of DVD audio is recorded in the data region of the medium shown in FIG. 5 or FIG. 6, DVD audio directory 2300 including data files (ATS_01_0.IFO; ATS_01_0.AOB, and the like) of DVD audio is assured as a subdirectory of root directory 2000 shown in FIG. 7.

Furthermore, subdirectory 2400 that manages flags indicating the presence/absence of still image data (indicating whether still image data are recorded/unrecorded) is assured under root directory 2000 in FIG. 7.

For example, system controller 3020 in FIG. 23 accesses hierarchical file information in FIG. 7 from card 100 in FIG. 5 or disc 170 in FIG. 6, and can read the contents (still image data flags; see FIGS. 16 to 19) of subdirectory 2400 before playback of a music number (or tune).

Figure 17:
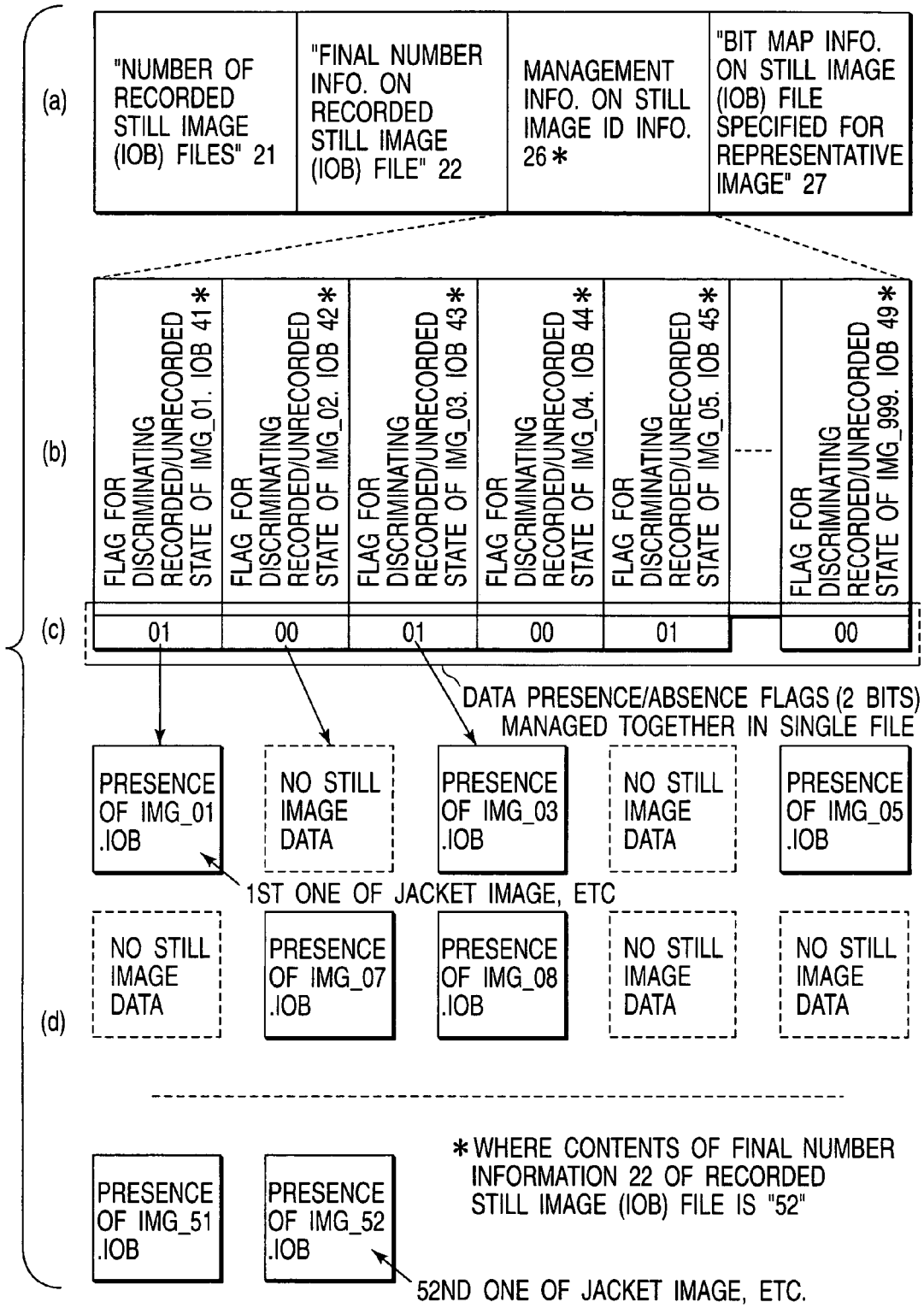
FIG. 17 shows views for explaining the data structure of management information (26*) of still image ID information in the image object set information (IOBSI.IFO) file shown in FIG. 16.

Then, upon accessing the contents (audio objects, image objects, text objects, and the like) in real-time audio recording directory 2100 in FIG. 7 upon playing back a music number (or tune), image objects with "unrecorded" flags ("00" in (c) of FIG. 17) can be skipped (that is, unwanted access can be avoided from being generated).

Since no unwanted access is generated, and still images can be smoothly read (i.e., only required still image objects can be quickly accessed), desired images (word card images, and the like) can be played back at just timings without being delayed from the flow of music number (tune) even when still image data are not stored in advance in a buffer memory of the playback apparatus. Here, in the example shown in FIG. 1, a maximum of 20 images in unit of music number (or unit of tune) forms the above still image data.

Figure 8:
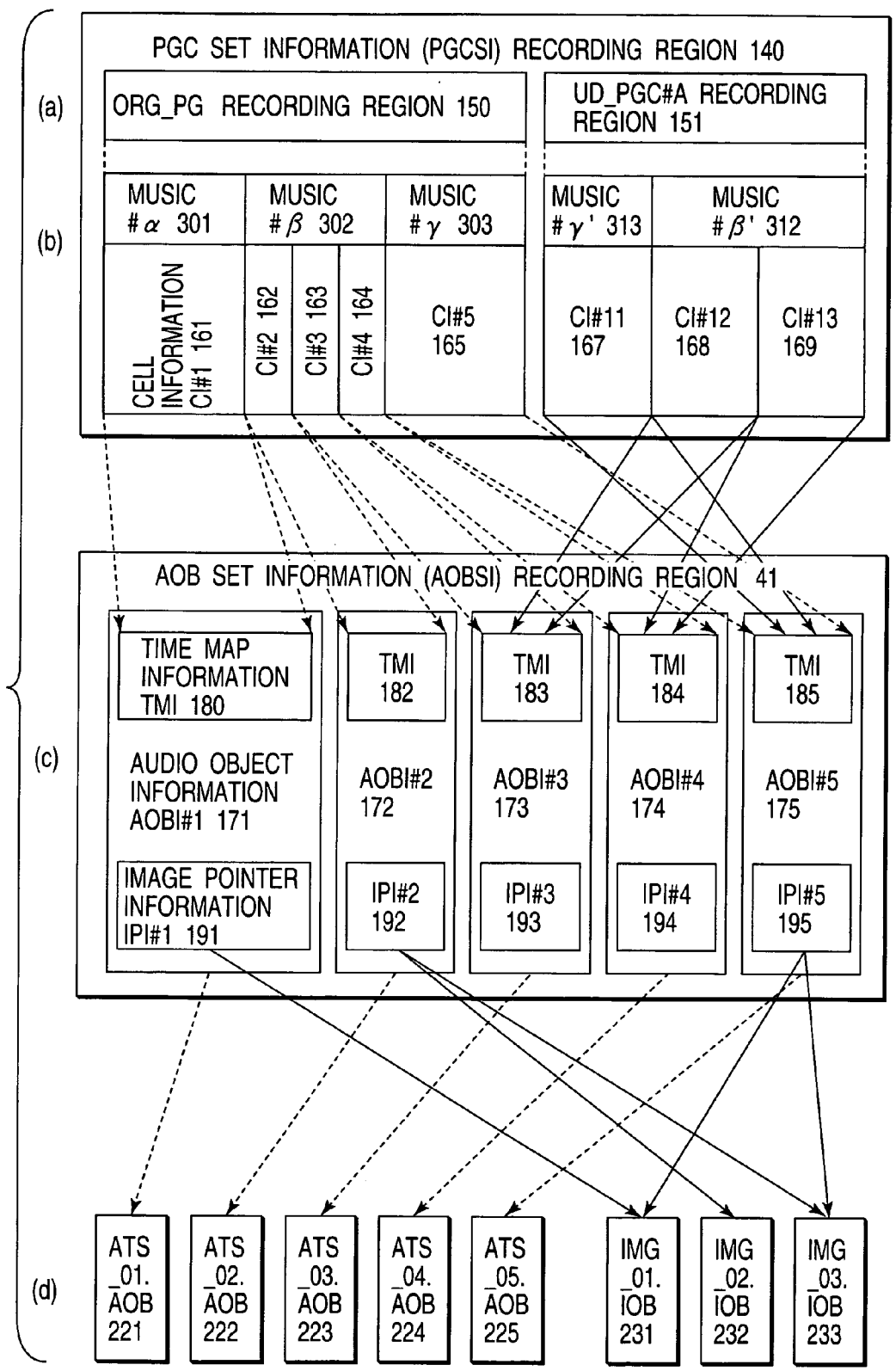
FIG. 8 shows views for explaining an example of the playback relationships (arrows in FIG. 8) between a plurality of music numbers (or tunes) and still images appended to these music numbers, which are stored in the information storage medium shown in FIG. 5 or FIG. 6.

FIG. 8 shows views for explaining an example of the playback relationships (arrows in FIG. 8) between a plurality of music numbers (tunes) and still images appended to these music numbers, which are stored in the information storage medium shown in FIG. 5 or FIG. 6. The relationship among respective kinds of management information will be explained below using FIG. 8.

In the embodiment of the present invention, all pieces of audio information (all AOBS) recorded on the information storage medium are managed using units called "music numbers (tunes)".

Furthermore, music numbers or tunes recorded on the information storage medium have information of the sequence for successively playing back all music numbers (tunes) in turn, and a region where the sequence information (program chain PGC) which is created first is recorded is called original PGC (ORG_PGC) information recording region 150 (see (f) of FIG. 5, (f) of FIG. 6(f), or (a) of FIG. 8).

Management information (AOBSI) that pertains to audio information (AOB) has an independent management information unit (AOBI#1 to AOBI#5) for each audio information file (AOB file) like ATS_01.AOB to ATS_05.AOB (each corresponding to ATS_01.AOB 2500 in FIG. 7) shown in (d) of FIG. 8. As such management information units, pieces of audio object information AOBI#1, AOBI#2, AOBI#3, AOBI#4, and AOBI#5 are set, as shown in (c) of FIG. 8.

Pieces of audio object information AOBI#1 to AOBI#5 respectively have pieces of time map information (TMI) 181 to 185 each including information that indicates the relationship between the playback time and recording location (address) in the medium to allow special playback such as time search, fastforwarding (FF), fastrewinding (FR), and the like.

In the embodiment shown in FIG. 8, pieces of audio object information AOBI#1 to AOBI#5 include information of pieces of image pointer information IPI#1 to IPI#5, which can directly designate still image information files IMG_01.IOB to IMG_03.IOB.

As shown in (b) and (c) of FIG. 8, a size designated by pieces of cell information CI#1 to CI#5 defined in original PGC information recording region 150 has one-to-one correspondence with the total playback range indicated by pieces of corresponding audio object information AOBI#1 to AOBI#5.

As shown in (b) of FIG. 8, one or more pieces of cell information CI form each of music #α, music #β, and music #γ. Information indicating the relationship between each cell information CI and a music number (tune) is described in pieces of cell information CI#1 to CI#5.

As described above, the playback order of the original PGC is defined by the layout order of corresponding cell information CI. but the playback sequences in units of music numbers (in units of tunes) are described in original PGC information recording region 150 in terms of the relationship with music numbers (tunes) shown in (b) of FIG. 8.

In addition to the playback sequence indicated by the original PGC, unique playback sequence information set by the user is recorded in user-defined PGC recording region 151. Pieces of cell information CI#11 to CI#13 defined in user-defined PGC recording region 151 have a structure capable of setting corresponding audio object information AOBI (AOBI#3 to AOBI#5 in (c) of FIG. 8) and the playback start and end times in time map information (TMI) 183 to TMI 185 in (c) of FIG. 8) defined in the AOBI.

Therefore, by setting cell information CI in (b) of FIG. 8 in turn, an arbitrary playback sequence for audio information (audio object AOB) can be defined in user-defined PGC recording region 151.

In the example shown in (b) of FIG. 8, since cell information CI#11 designates a portion in time map information TMI 185, the playback range of music #γ' that cell information CI#11 defined in the user-defined PGC plays back can play back only a range narrower than that of music #γ defined in the original PGC.

As described above, according to the embodiment of the present invention, an arbitrary range can be played back without being limited by the playback range of a music number (tune) defined in the original PGC.

The user can set a plurality of arbitrary playback sequences in user-defined PGC recording region 151. A plurality of user-defined PGC recording regions #A·151, #B·152, . . . can be defined in units of playback sequences designated by the user, as shown in (f) of FIG. 5 or 6.

In the embodiment shown in FIG. 8, image pointer information IPI#2 is set to display two still images IMG_02.IOB and IMG_03.IOB during playback of music #β.

In the embodiment of the present invention, still image file information to be displayed for each music number (each tune) is described in image pointer information IPI#2 (corresponding to 192 in FIG. 8 or 197 in FIG. 9) in audio object information (for example, corresponding to cell information CI#2 in AOBI#2 in music #β) to be played back first in that music number.

FIG. 9 shows views for explaining another example of the playback relationships (arrows in FIG. 9) between a plurality of music numbers (tunes) and still images appended to these music numbers, which are stored in the information storage medium shown in FIG. 5 or FIG. 6. The differences from FIG. 8 will be explained below.

The embodiment shown in FIG. 9 has pieces of image object information IOBI#1 and IOBI#2 as individual management information for still image information files IMG_01.IOB and IMG_02.IOB.

When one of pieces of image pointer information IPI#1 to IPI#3, IPI#13, and IPI#14 points to pieces of image object information IOBI#1 and IOBI#2, still image information files IMG_01.IOB and IMG_02.IOB to be simultaneously displayed upon playing back audio information are designated.

Unlike in the embodiment shown in FIG. 8, pieces of image pointer information IPI#1 to IPI#3, IPI#13, and IPI#14 are respectively set in pieces of cell information CI#1 to CI#3, CI#13, and CI#14.

In the embodiment shown in FIG. 8, still image information files to be displayed upon playing back music #γ' and music #β defined in user-defined PGC recording region 151 match those to be displayed upon playing back music #γ and music #β defined in original PGC recording region 150, and still image information files to be displayed upon playback cannot be arbitrarily set (changed).

By contrast, in the embodiment shown in FIG. 9, since image pointer information IPI# is set in each cell information CI#, still image information files to be displayed upon playback can be arbitrarily set in units of cells.

Figure 10:
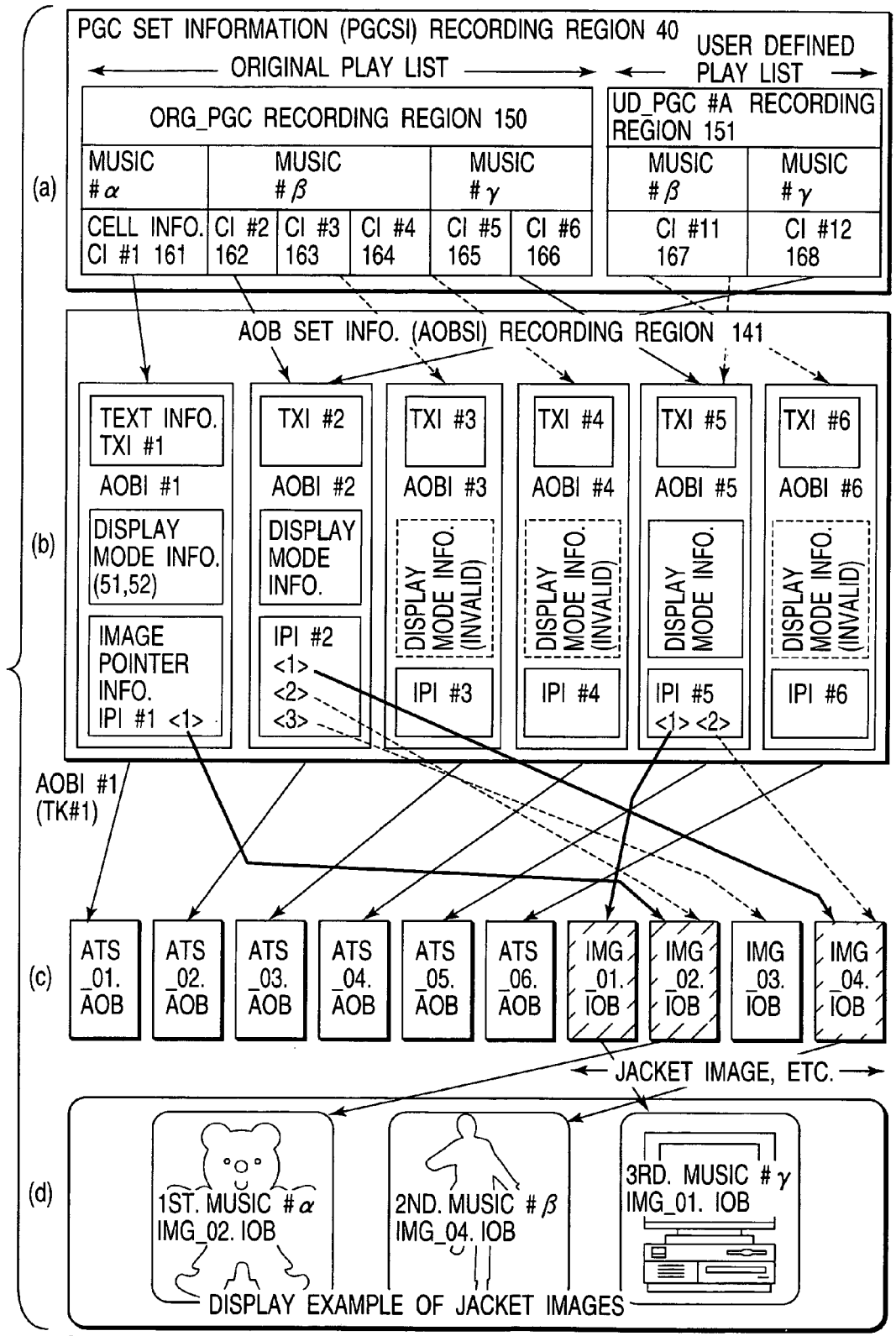
FIG. 10 shows views for explaining an example of the way in which a jacket image or the like of each music number (or each tune) is displayed when audio information with still images recorded on the medium according to an embodiment of the present invention is played back in units of music numbers (in units of tunes) or in units of play lists.

FIG. 10 are views for explaining an example of the way in which a jacket image or the like of each music number is displayed when audio information with still images recorded on the medium according to an embodiment of the present invention is played back in units of music numbers or in units of play lists.

In the embodiment of the present invention, all pieces of audio information (audio objects AOB) recorded on the information storage medium are managed using units called "music numbers or tunes".

Music numbers (tunes) recorded on the information storage medium have sequence information for successively playing back all music numbers in turn, and a region where this information is recorded is called original PGC (original program chain) information recording region 150.

Management information that pertains to audio information (AOB) has an independent management information unit for each audio information file (AOB file) like ATS_xx-.AOB (xx is an integer starting from 01), and pieces of audio object information (AOBI) #1, #2, #3, . . . are set.

Each audio object information AOBI# has time map information having relationship information between the playback time and recording location (address) to allow special playback such as time search, fastforwarding (FF), fastrewinding (FR), and the like.

Also, audio object information AOBI# can include image pointer information IPI#. From this IPI, still image information file IMG_xx.IOB (xx is an integer starting from 01) is directly designated.

A size designated by each cell information CI# defined in original PGC information recording region 150 has one-to-one correspondence with the total playback range indicated by corresponding audio object information AOBI#1.

Each of music #α, music #β, and music #γ is made up of one or more pieces of cell information CI#. Information indicating correspondence between each CI# and a music number (tune) is described in each CI#.

In this embodiment, the playback order of the original PGC is defined by the layout order of corresponding CI#. but the playback sequences in units of music numbers (in units of tunes) are described in original PGC information recording region 150 in terms of the relationship with corresponding music numbers (tunes).

In addition to the playback sequence indicated by the original PGC, unique playback sequence information set by the user is recorded in user-defined PGC recording region 151.

Cell information CI# defined in user-defined PGC recording region 151 has a structure capable of setting corresponding audio object information AOBI and the playback start and end times in time map information defined in the AOBI.

Hence, by setting CI# in turn, an arbitrary playback sequence for audio information (AOB) can be defined in user-defined PGC recording region 151.

Since cell information CI# designates a portion in time map information, the playback range of music # that CI# plays back can play back a range narrower than that of corresponding music #γ defined in the original PGC.

In this way, an arbitrary range can be played back without being limited by the playback range of a music number (tune) defined in the original PGC.

The user can set a plurality of arbitrary playback sequences in user-defined PGC recording region 151, and a plurality of user-defined PGC (program chain) recording regions #A, #B, . . . can be defined in units of playback sequences designated by the user.

As shown in (a) of FIG. 10, recording region 140 (see FIG. 5) of program chain set information (PGCSI) has recording region 150 of the original PGC (ORG_PGC) and recording region 151 of one or more user-defined PGCs (UD_PGC#A).

In this case, music #α, music #β, and music #γ are recorded in ORG_PGC recording region 150, and music #β and music #γ are recorded in UD_PGC#A recording region 151.

A PGC (program chain) is made up of one or more cells C, and the playback sequence (playback order) of music numbers (tunes) in the PGC can be defined by the layout order of these cells.

Music #α in ORG_PGC recording region 150 has cell information CI#1 including text information TXI#1 (text information including text pointer information TPI# shown in FIG. 4 or FIGS. 13 to 15) and image pointer information IPI#1. This IPI#1 designates management information of still image IMG_02.IOB included in recording region 142 of image object set information (IOBSI).

When this still image IMG_02.IOB is played back simultaneously with the beginning of playback of music #α, an image of "bruin" shown in (d) of FIG. 10 is displayed as an image that represents the first music #α in the original PGC (or a jacket image) (on, e.g., image display 3710 in FIG. 23 to be described later) simultaneously with the beginning of playback of music #α.

Note that audio information (audio data) of music #α corresponds to ATS_01.AOB designated via AOBI#1.

Music #β in ORG_PGC recording region 150 has CI#2 including TXI#2 and IPI#2, CI#3 including TXI#3 and IPI#3, and CI#4 including TXI#4 and IPI#4.

IPI#2 in CI#2 that designates audio information ATS_02.AOB (via AOBI#2) to be played back first in this music #β has three image pointers <1>, <2>, and <3>. Of these pointers, first pointer IPI#2 <1> designates management information of still image IMG_04.IOB included in IOBSI recording region 142.

When this still image IMG_04.IOB is played back simultaneously with the beginning of playback of music #β, an image of "running businessman" shown in (d) of FIG. 10 is displayed as an image that represents the second music #β in the original PGC (or a jacket image) simultaneously with the beginning of playback of music #β.

Note that second pointer IPI#2 <2> in music #β designates still image IMG_02.IOB ("bruin"), which is displayed as the second image of music #β, as, e.g., a second jacket image. Also, third pointer IPI#2 <3> of music #β designates still image IMG_03.IOB, which is displayed as the third image of music #β, as, e.g., a third jacket image (not shown).

"Bruin" of IMG_02.IOB in (d) of FIG. 10 is a representative image for music #α of the original PGC but is not a representative image for music #β of the original PGC. However, this "bruin" can be jacket images of both music #α and music #β.

Music #γ of ORG_PGC recording region 150 has CI#5 including TXI#5 and IPI#5, and CI#6 including TXI#6 and IPI#6.

IPI#5 in CI#5 that designates audio information to be played back first in this music #γ has two image pointers <1> and <2>. Of these pointers, first pointer IPI#5 <1> designates management information of still image IMG_01.IOB included in IOBSI recording region 142.

When still image IMG_01.IOB is played back simultaneously with the beginning of playback of music #γ, an image of "personal computer" shown in (d) of FIG. 10 is displayed as an image that represents the third music #γ in the original PGC (or a jacket image) simultaneously with the beginning of playback of music #γ.

Note that second pointer IPI#5 <2> of music #γ designates still image IMG_04.IOB ("running businessman") which is displayed as the second image of music #γ.

"Running businessman" of IMG_04.IOB in (d) of FIG. 10 is a representative image for music #β of the original PGC (original play list), but is not a representative image for music #γ of the original PGC. However, this "running businessman" can be jacket images for both music #γ and music #β of the original PGC.

On the other hand, in

UD_PGC (user-defined play list) #A in which the user re-arranges music numbers (tunes) to have #β as the first music number (first tune) and #γ as the second one, IPI#11 of the first music #β designates management information of still image IMG_03.IOB, and IPI#12 of the second music #γ designates management information of still image IMG_01.IOB (image of "personal computer").

Although not shown in (d) of FIG. 10, the contents of text information designated by corresponding text information TXI# (or its text pointer information TPI#) can be superimposed as needed on the representative image (or jacket image) to be displayed.

As alternative names of terms used in this specification, for example, the original PGC may be called a default play list (original play list), the user-defined PGC may be called a play list, a cell may be called a default play list track search pointer/play list track search pointer, audio object information may be called track information, and image pointer information IPI may be called an image object search pointer.

In the data structure shown in FIG. 10, the user-defined PGC can only designate a playback sequence as a sequence of "music number units" or "tune units" prescribed in the original PGC.

Each of CI#11 and CI#12 set in the user-defined PGC designates only audio information to be played back first in "music number" or in "tune" defined in the original PGC.

In order to change setups to play back in the order of "music #γ→music #β" in user-defined PGC#A recording region 151, CI#11 can designate AOBI#5 as management information of ATS_05.AOB to be played back first in music #γ, and the next CI#12 can designate AOBI#2 as management information of ATS_02.AOB to be played back first in music #β.

In the embodiment shown in FIG. 10, since only one still image IMG_02.IOB is displayed upon playing back music #α, IPI#1 in AOBI#1 that describes management information of audio information corresponding to music #α designates only IMG_02.IOB.

Since this still image alone is designated in music #α, still image IMG_02.IOB is automatically set as a representative image (or jacket image) for music #α.

In the embodiment shown in FIG. 10, a still image to be displayed first for each music number (each tune) is automatically set as a representative image (or jacket image) for that music number.

For example, when still images are displayed in the order of IMG_04.IOB, IMG_02.IOB, and IMG_03.IOB during playback of music #β, IMG_04.IOB to be played back first upon playback of music #β is set as a representative image (which can also be used as a jacket image) indicating the contents of music #β. Also, still images IMG_04.IOB, IMG_02.IOB, and IMG_03.IOB can be used as jacket images.

In the embodiment shown in FIG. 10, music #β is made up of three audio information files ATS_02.AOB, ATS_03.AOB, and ATS_04.AOB.

Still image information and text information associated with this music #β are recorded in management information AOBI#2 that pertains to audio information file ATS_02.AOB to be played back first in this music #β. That is, text information such as a song name, singer name, and the like of music #β is recorded in text information #2.

Also, still image information associated with music #β is recorded in the display order of IMG_04.IOB, IMG_02.IOB, and IMG_03.IOB in IPI#2.

Since still images are displayed in the order of IMG_01.IOB and IMG_04.IOB during playback of music #γ, information that designates these still images is recorded in IPI#5 in management information AOBI#5 of audio information which is played back first in music #γ.

The embodiment shown in FIG. 10 does not have any special information for setting representative images in units of music numbers (in units of tunes), and a still image which is displayed first in a given music number (given tune) is automatically handled as a representative image.

In the embodiment shown in FIG. 10, a display mode (see display order setting mode information 51 and display timing setting mode information 52 in FIG. 20) can be set for each management information (AOBI) # of an audio object. However, only the display mode set by the display mode information (51, 52) in the first AOBI in a given music number (given tune) is valid.

When a play list (original play list or user-defined play list) is selected, or when specific audio information (AOB/TK) is selected, image objects (IMG_xx.IOB) corresponding to the selected play list or audio information can be displayed as jacket images.

For example, when the user-defined play list shown in (a) of FIG. 10 is selected, IMG_01.IOB (personal computer) and IMG_04.IOB (running businessman) can be displayed as jacket images on the basis of image pointer information IPI#5 of AOBI#5 of music #β.

On the other hand, when music #α of the original play list is selected, IMG_02.IOB (bruin) can be displayed as a jacket image on the basis of image pointer information IPI#1 of AOBI#1 of music #α.

Figure 11:
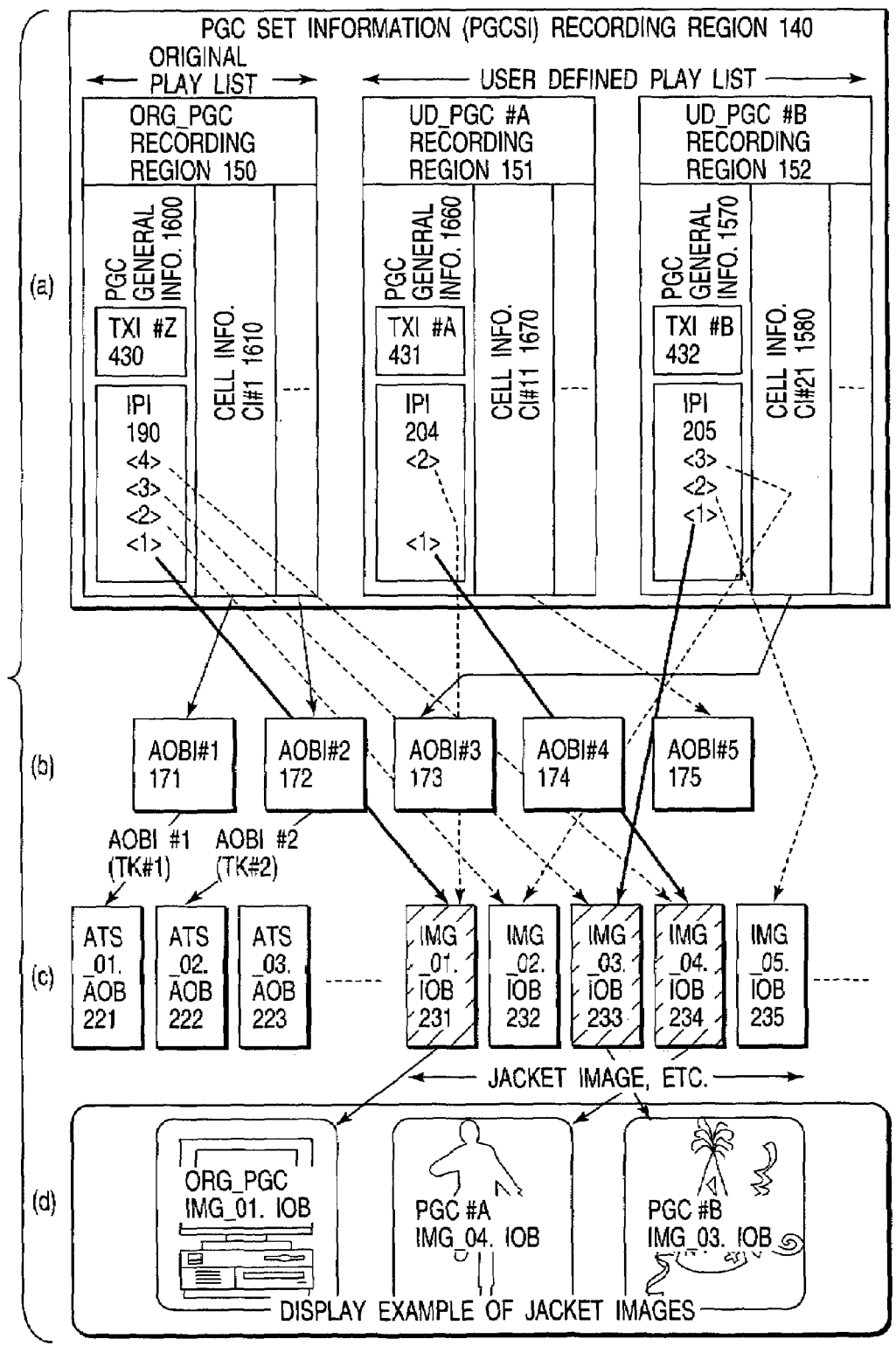
FIG. 11 shows views for explaining an example of the way in which jacket images of respective PGCs are displayed when audio information with still images recorded on the medium according to an embodiment of the present invention is played back in units of program chains (PGCs) or in units of play lists.

FIG. 11 shows views for explaining an example of the way in which jacket images of respective PGCs are displayed when audio information with still images recorded on the medium according to an embodiment of the present invention is played back in units of program chains (PGCs) or in units of play lists.

In the embodiment shown in FIG. 11, not only representative images (or jacket images) in units of music numbers (in units of tunes) but also those in units of playback sequences (PGCs) can be set.

AS shown in FIG. 11, both original and user-defined PGCs have pieces of PGC general information 1600, 1660, and 1570 that record general information which pertains to each PGC, and pieces of text information TXI#Z 430, TXI#A 431, and TXI#B 432, and IPI 190, IPI 204, and IPI 205 are recorded in each PGC general information.

When playback is made in units of playback sequences (PGCs), a still image displayed first is automatically set as a representative image (or jacket image) of each playback sequence (PGC).

When the user selects a playback sequence (PGC) to be played back, the contents of PGCSI recording region 140 in (e) of FIG. 5 or 6 are played back to play back a still image file indicating a representative image of each PGC, and text information TXI#Z 430, TXI#A 431 or TXI#B 152 shown in (a) of FIG. 11 is superimposed on the played-back image and is displayed on the screen, as shown in (d) of FIG. 11.

Figure 12:
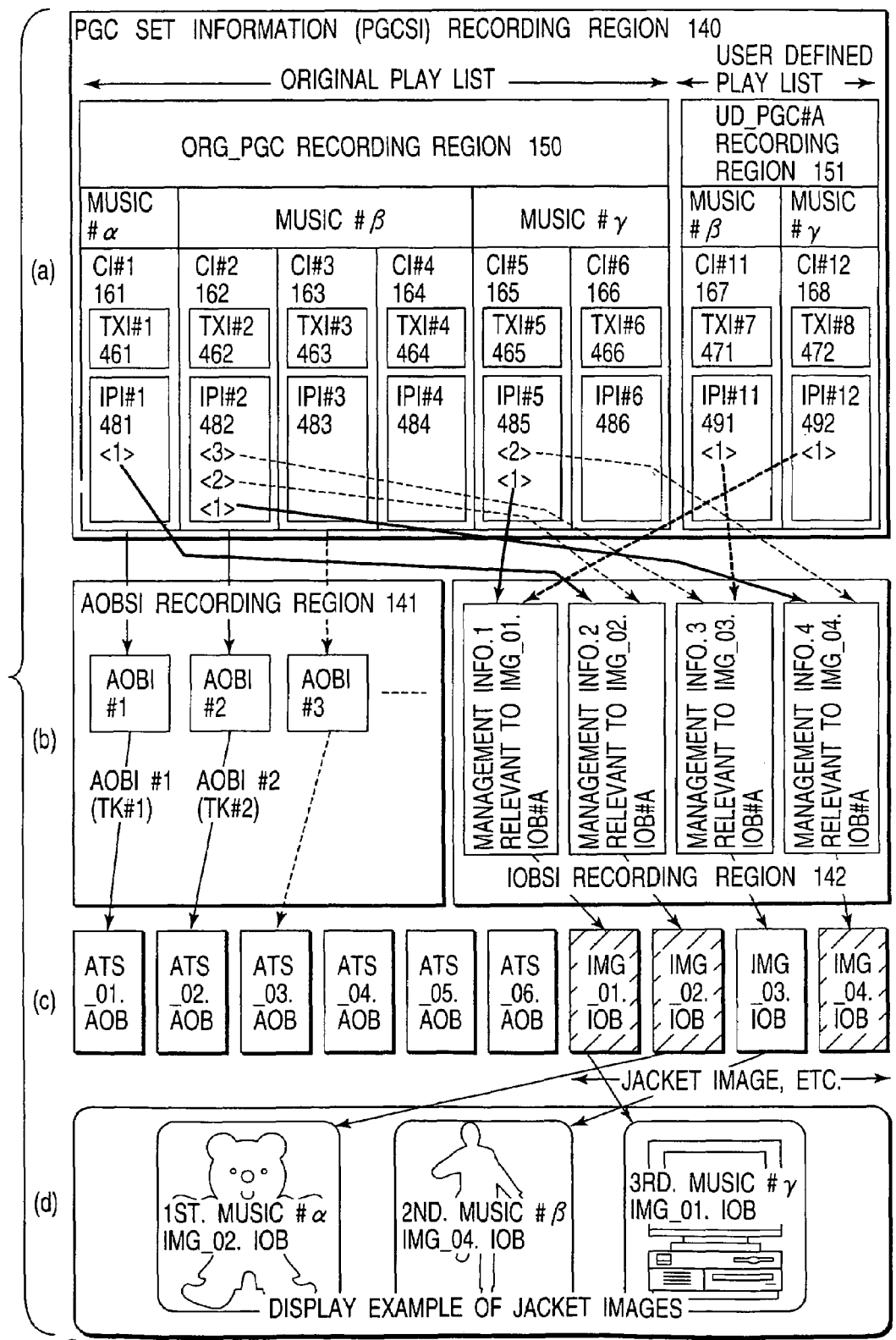
FIG. 12 shows views for explaining another example of the way in which jacket images of respective music numbers (or tunes) are displayed when audio information with still images recorded on the medium according to an embodiment of the present invention is played back in units of music numbers (in units of tunes) or in units of play lists.

In the embodiment shown in FIG. 11, still image file information to be displayed for each music number (each tune) is described in IPI#2 in the AOBI (AOBI#2 in (b) of FIG. 10) to be played back first in a music number (e.g., #β in FIG. 10) (it is described in IPI#2 in CI#2 in the embodiment shown in FIG. 12).

In the example shown in FIG. 11 as well, by selecting a play list (original or user-defined one) or audio information (AOB/TK), corresponding image information (IMG_xx-.IOB) can be displayed as a jacket image.

FIG. 12 shows views for explaining another example of the way in which jacket images of respective music numbers (tunes) are displayed when audio information with still images recorded on the medium according to an embodiment of the present invention is played back in units of music numbers (tunes) or in units of play lists.

A method of setting a jacket image will be explained first.

In a method of setting jacket images using pieces of image pointer information IPI#1 to IPI#12 (a method of setting a still image to be displayed first in each music number (each tune) as a jacket image, or a method of setting a still image set by representative image/jacket image designation flag 71 in units of music numbers (tunes) or PGCs, as shown in (d) of FIG. 20 to be described later), a still image file number is directly designated.

By contrast, in an application example to be described below, the numbers of pieces of management information 1 to 4 corresponding to still image information files in IOBSI recording region 142 are designated, as shown in (b) of FIG. 12.

That is, in the data structure shown in FIG. 10, still image information displayed upon playing back a music number (tune) designated in user-defined PGC (UD_PGC#A) recording region 151 matches that to be displayed upon playing back a music number (tune) designated by original PGC (ORG_PGC) information recording region 150.

By contrast, in the data structure shown in FIG. 12, IPI#11 and IPI#12 in pieces of cell information CI#11 and CI#12 defined in UD_PGC#A recording region 151 can designate arbitrary still images, which are not restricted by those to be displayed in units of music numbers (tunes) designated in ORG_PGC information recording region 150.

That is, "pieces of management information 1 to 4 corresponding to IMG_xx.IOB" in (b) of FIG. 12 serve as conversion files for pointer information (IPI#) that designates a still image (IMG_xx.IOB).

Figure 19:
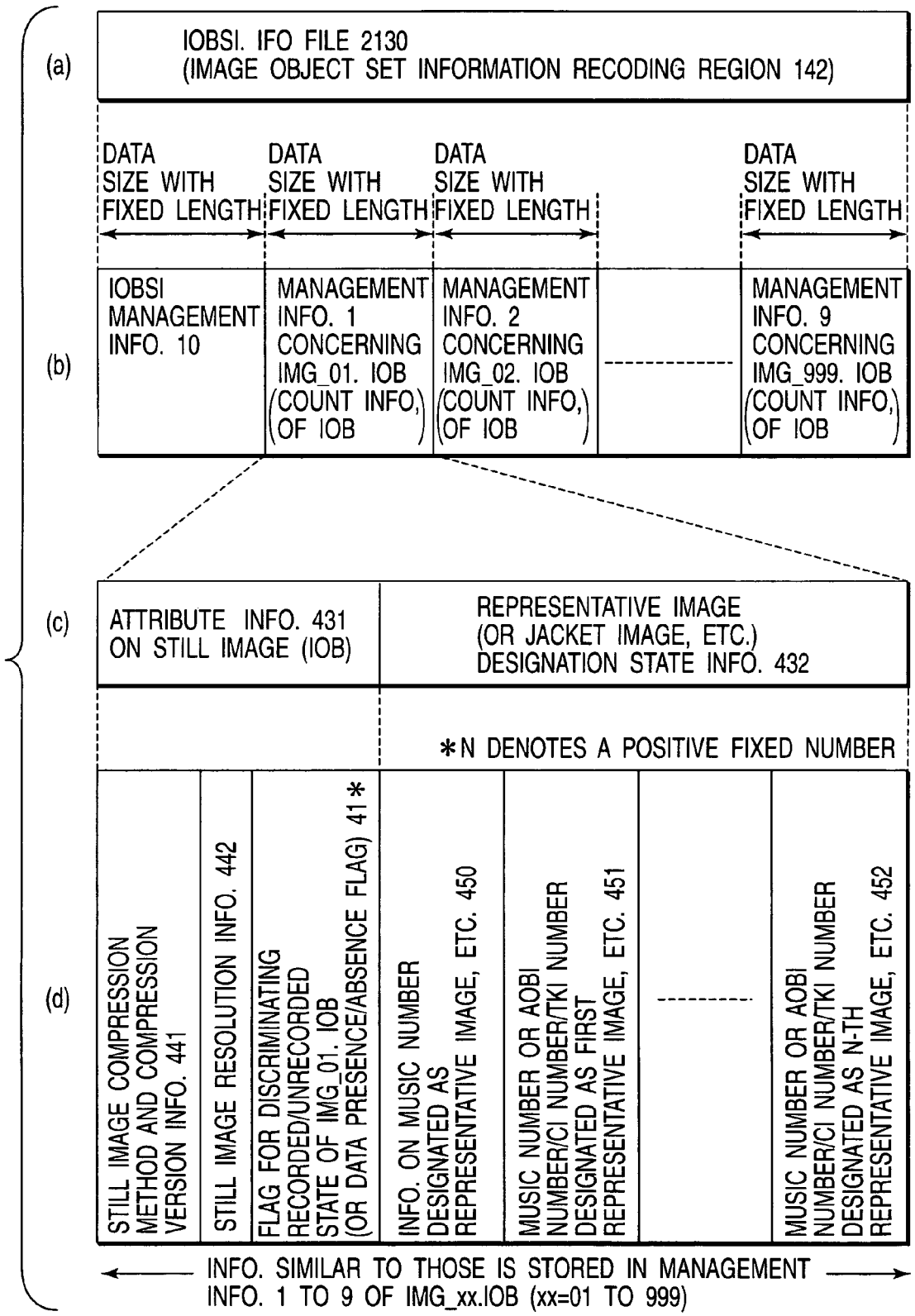
FIG. 19 shows views for explaining the data structure of management information that pertains to each image object (IMG_xx.IOB) in the image object set information (IOBSI-.IFO) in FIG. 16.

In the embodiment shown in FIG. 12, number information of each of pieces of management information 1 to 9 that pertain to respective IMG_xx.IOB in (b) of FIG. 19 is recorded in place of "still image file number 72 of the M-th still image to be displayed in a music number (tune), PGC, or play list" in (d) of FIG. 20.

In the embodiment shown in FIG. 10, still image information files ("personal computer" of IMG_01.IOB and "running businessman" of IMG_04.IOB) to be displayed upon playing back music #β and music #γ defined in user-defined PGC#A match those ("personal computer" of IMG_01.IOB and "running businessman" of IMG_04.IOB) to be displayed upon playing back music #γ and music #β defined in the original PGC, and cannot be arbitrarily changed.

By contrast, in the embodiment shown in FIG. 12, since each cell information CI# has individual image pointer information IPI#, still image files to be displayed can be set for each CI.

In the example shown in FIG. 12 as well, by selecting a play list (original or user-defined one) or audio information (AOB/TK), corresponding image information (IMG_xx-.IOB) can be displayed as a jacket image.

Figure 13:
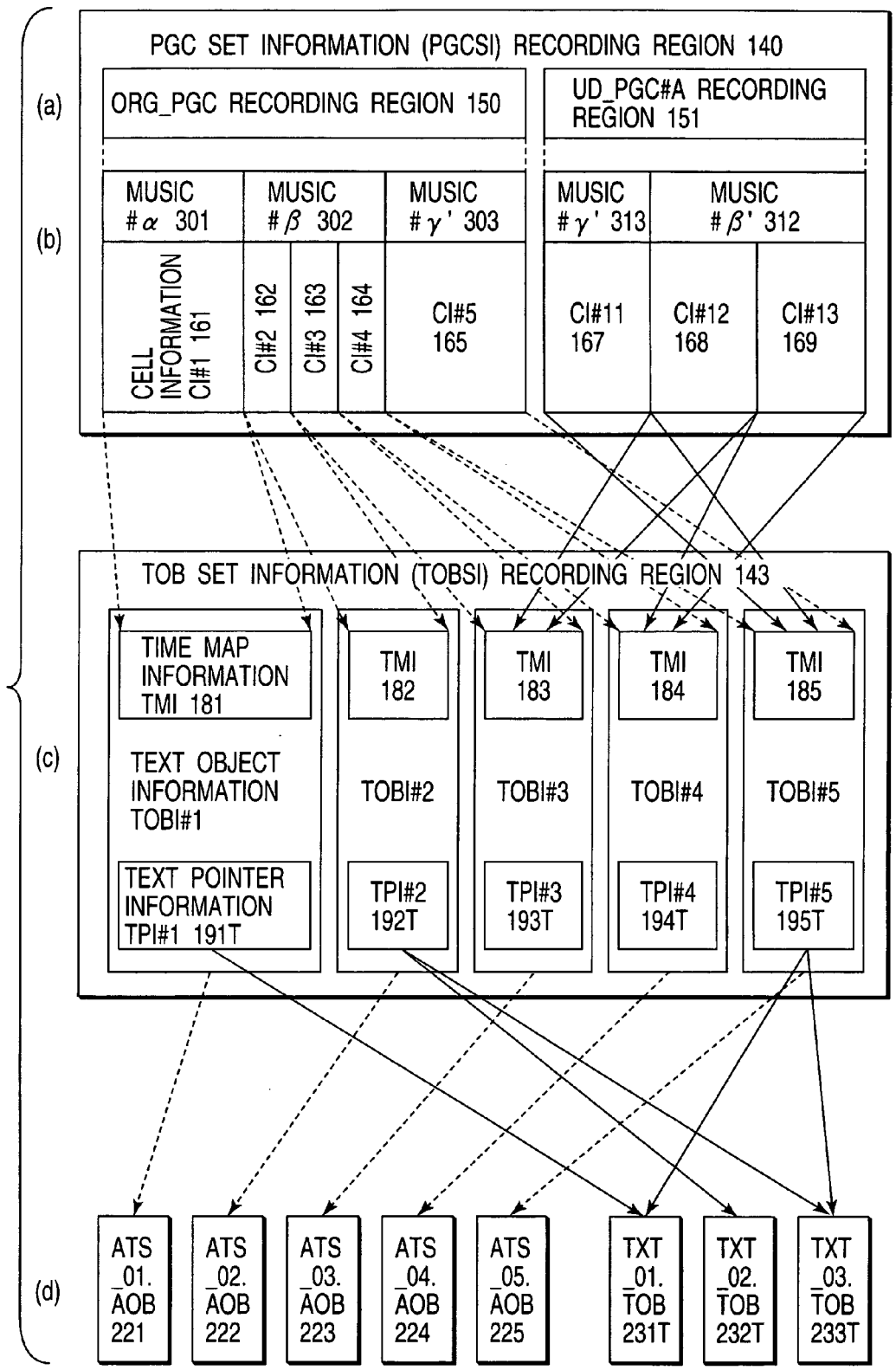
FIG. 13 shows are views for explaining an example of the playback relationship (arrows in FIG. 13) between a plurality of music numbers (or tunes) stored in the information storage medium of FIG. 5 or FIG. 6, and text (characters, symbols, figures, and/or marks) appended to these music numbers.

FIG. 13 shows views for explaining an example of the playback relationship (arrows in FIG. 13) between a plurality of music numbers (tunes) stored in the information storage medium of FIG. 5 or FIG. 6, and text (characters, symbols, figures, and/or marks) appended to these music numbers.

In (a) to (d) of FIG. 13, audio object information AOBI# and image pointer information IPI# in (c) of FIG. 8 are replaced by text object information TOBI# and text pointer information TPI#, and there is shown an example of the way in which text information to be simultaneously displayed during playback of a music number is managed.

Figure 14:
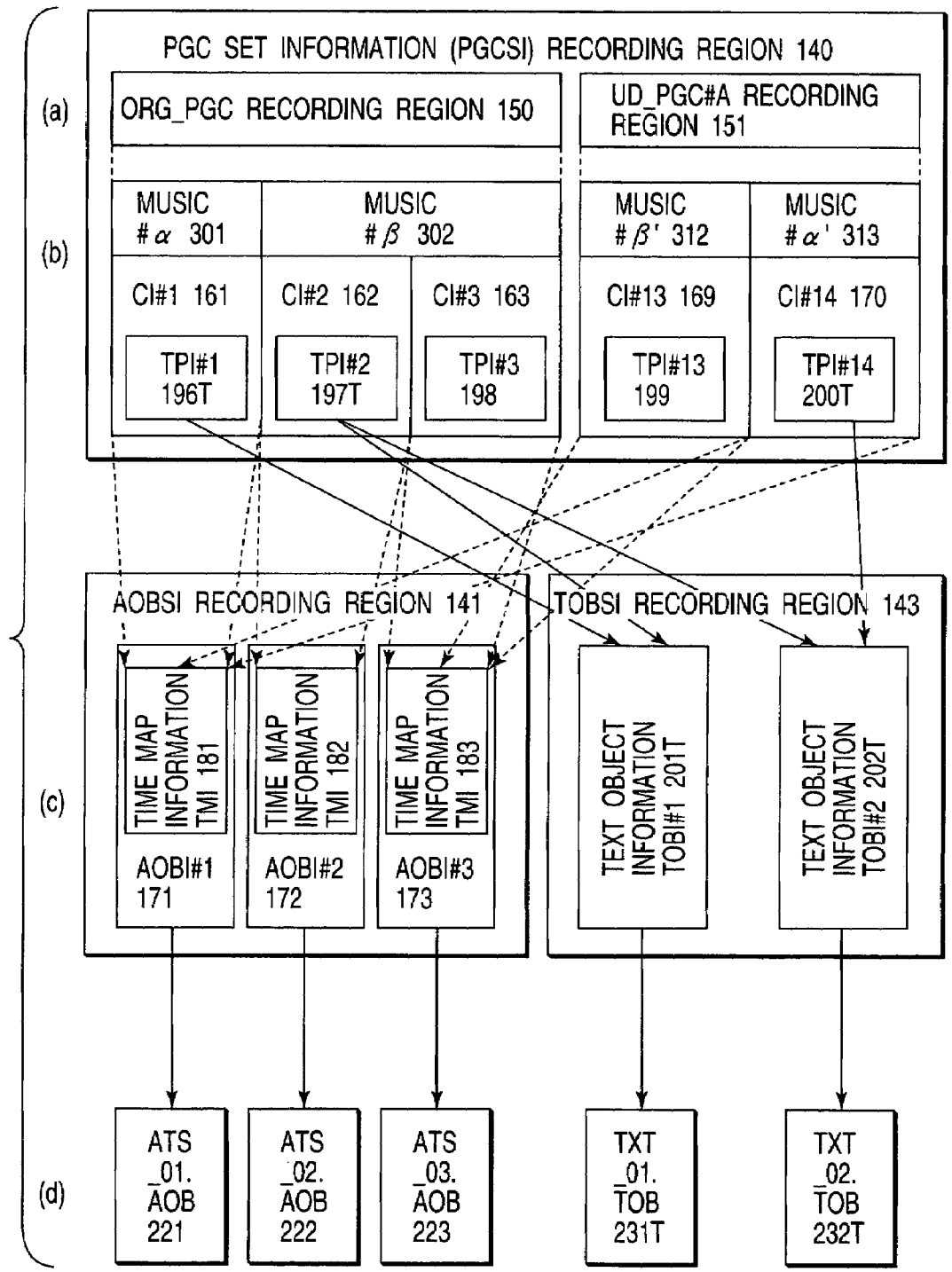
FIG. 14 shows views for explaining another example of the playback relationship (arrows in FIG. 14) between a plurality of music numbers (or tunes) stored in the information storage medium of FIG. 5 or FIG. 6, and text (characters, symbols, figures, and/or marks) appended to these music numbers.

FIG. 14 shows views for explaining another example of the playback relationship (arrows in FIG. 14) between a plurality of music numbers (tunes) stored in the information storage medium of FIG. 5 or FIG. 6, and text (characters, symbols, figures, and/or marks) appended to these music numbers.

In (a) to (d) of FIG. 14, image object information IOBI# in (c) of FIG. 9 is replaced by text object information TOBI#, and there is shown another example of the way in which text information to be simultaneously displayed during playback of a music number is managed.

Figure 15:
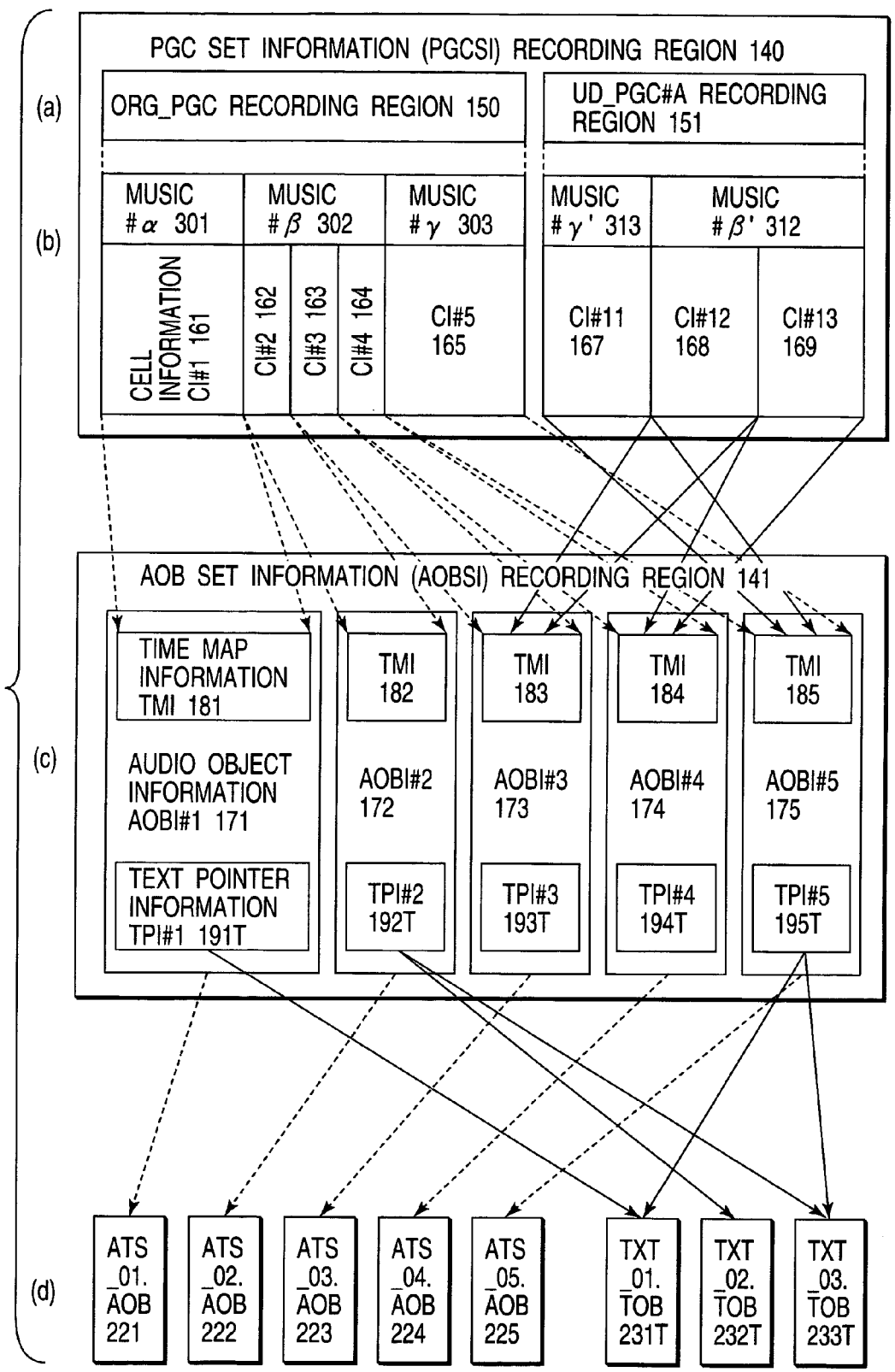
FIG. 15 shows views for explaining still another example of the playback relationship (arrows in FIG. 15) between a plurality of music numbers (or tunes) stored in the information storage medium of FIG. 5 or FIG. 6, and text (characters, symbols, figures, and/or marks) appended to these music numbers.

FIG. 15 shows views for explaining still another example of the playback relationship (arrows in FIG. 15) between a plurality of music numbers (tunes) stored in the information storage medium of FIG. 5 or FIG. 6, and text (characters, symbols, figures, and/or marks) appended to these music numbers.

In FIG. 15, image pointer information IPI# in FIG. 8 is replaced by text pointer information TPI#, and there is shown still another example of the way in which text information to be simultaneously displayed during playback of a music number is managed.

Figure 16:
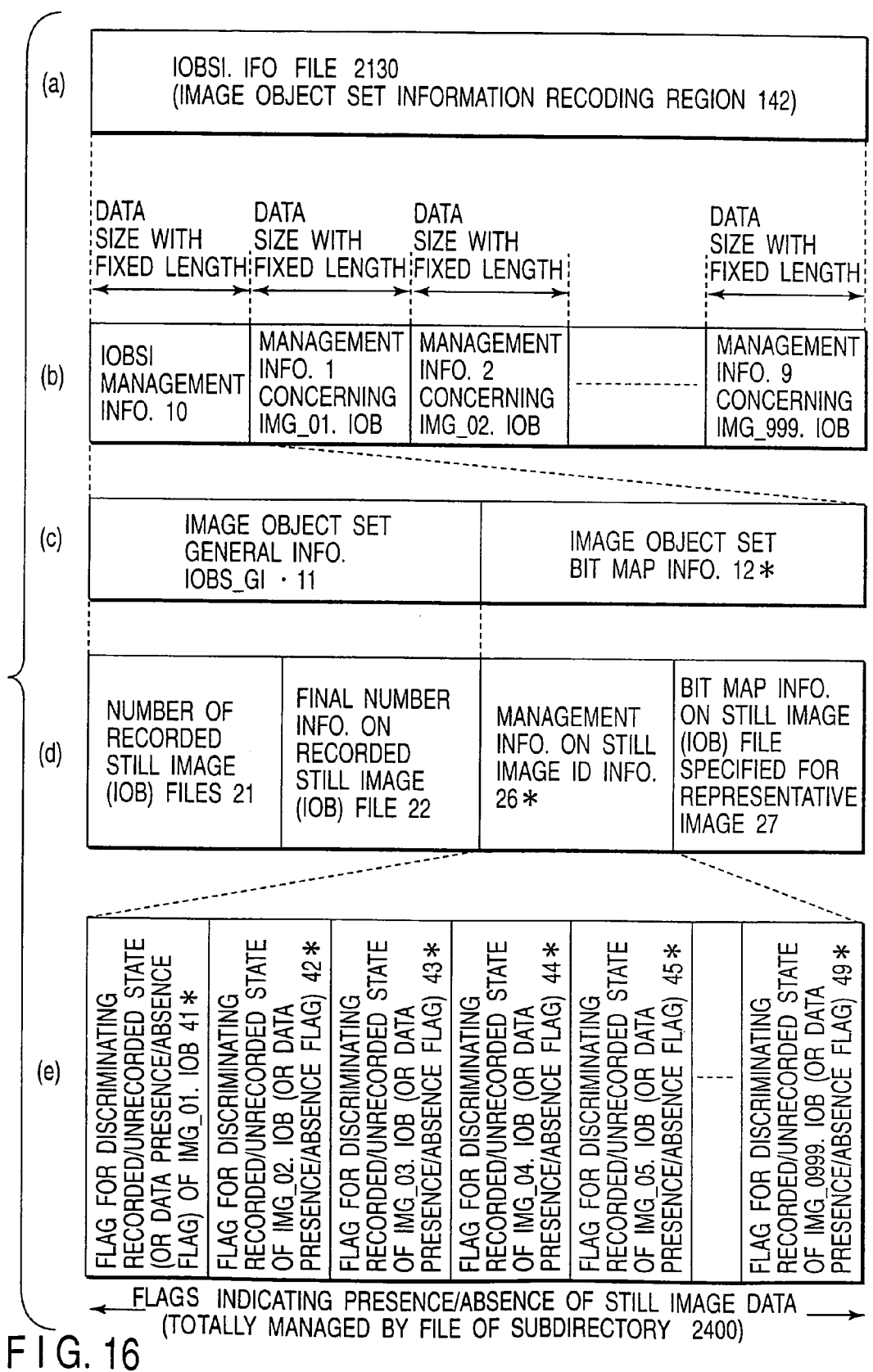
FIG. 16 shows views for explaining the data structure of an image object set information (IOBSI.IFO) file recorded on the information storage medium according to an embodiment of the present invention.

FIG. 16 shows views for explaining the data structure of an image object set information (IOBSI.IFO) file recorded on the information storage medium according to an embodiment of the present invention.

FIG. 17 shows views for explaining the data structure of management information (26*) of still image ID information in the image object set information (IOBSI.IFO) file shown in FIG. 16.

In the embodiment of the present invention, ID information (xx of IMG_xx.IOB; xx=01 to 52 in the example shown in FIG. 17) is appended to each still image information (IMG_01.IOB to IMG_52.IOB), as shown in (d) of FIG. 17, and management information 26* (2-bit flag) indicating if given ID information (IMG_xx.IOB) is used ("01") or unused ("00") is provided, as shown in (e) of FIG. 16 and (b), (c) of FIG. 17.

Since this flag consists of 2 bits, four different states can be discriminated. For example, if flag=00b, it indicates "unrecorded" (absence of still image data); if flag=01b, it indicates "recorded No. 1" (presence of still image data); if flag=10b, it indicates "recorded No. 2" (presence of image data with text such as words or the like); and if flag=11b, it indicates "recorded No. 3" (presence of motion JPEG data obtained by, e.g., continuous shots (a maximum of 20 images per music number or per tune) or the like of a digital camera), thus allowing four different ways of flag identification.

In the embodiment of the present invention, each still image information (IOB) is recorded as an independent file. As a file extension of such still image information (IOB), "IOB" is used.

In the embodiment of the present invention, an independent file name (xx of IMG_xx.IOB) is set for each still image information (IOB) as ID information used to identify each still image information (IOB). To allow easy ID information management, a number such as "IMG_xx" or the like is assigned as an independent file name, and a number (xx) assigned to this file name is managed as ID Information used to identify each still image information (IOB).

Management information as to whether or not unique ID information is assigned is recorded as "management information 26* of still image ID information" in IOB bitmap information 12 as configuration information of IOBSI management information 10 in IOBSI.IFO file 2130, as shown in FIG. 16.

IOBSI.IFO file 2130 that contains management information as to whether or not unique ID Information is assigned is allocated under real-time audio recording directory 2100, as shown in FIG. 7, and is physically recorded in IOBSI recording region 142 in (e) of FIG. 5.

In the embodiment of the present invention, a maximum of 999 still image files as still image information (IOB) can be recorded in the information storage medium such as audio card 100 with the copy protection function shown in (a) of FIG. 5.

A major characteristic feature of the embodiment of the present invention lies in that fields for recording still image information (IOB) for a maximum of 999 images are set in advance, and the information description field size (data size) for each still image information (IOB) is a fixed length, as shown in (b) or (e) of FIG. 16.

With this data structure, the start address of each information in IOBSI.IFO file 2130 (for example, the start address of management information 2 that pertains to IMG_02.IOB, and the address of recorded/unrecorded flag 45 for IMG_05.IOB) remains unchanged even by new recording/a change in information contents/deletion of each still image information (IOB).

As a result, since the start address of each information is predetermined even by repeating new recording/a change in information contents/deletion of each still image information (IOB), system controller 3020 of the information recording/playback apparatus shown in FIG. 23 need only read only required information in IOBSI.IFO file 2130. That is, since a buffer memory (not shown) of system controller 3020 need only temporarily save minimum required information, the buffer memory size can be saved.

For this reason, the buffer memory size in system controller 3020 can be small, and the information recording/playback apparatus shown in FIG. 23 can be manufactured with relatively low cost.

Also, according to the embodiment of the present invention, since the start address of each information is predetermined, system controller 3020 in the information recording/playback apparatus in FIG. 23 can directly access the required position (address) in IOBSI.IFO file 2130. Hence, simple, high-speed access can be attained.

Recorded/unrecorded flags 41* to 49* for IMG_xx.IOB are set to have 2 bits each.

A "01" flag is set for "ID number IMG_xx" assigned to a still image file recorded in IOB recording region 132 in the information storage medium shown in (d) of FIG. 5, and a "00" flag is set for "ID number IMG_xx" which is not assigned to a recorded still image file yet.

A practical setting method of the flags will be explained below using FIG. 17.

When still image files IMG_01.IOB, IMG_03.IOB, IMG_05.IOB, IMG_07.IOB, IMG_08.IOB, . . . , IMG_51.IOB, and IMG_52.IOB are recorded in the information storage medium, as shown in (d) of FIG. 17, the contents of recorded/unrecorded flags 41* to 49* corresponding to these IMG_xx.IOB are as shown in (c) of FIG. 17.

In (d) of FIG. 17, since still image files IMG_02.IOB and IMG_04.IOB are unrecorded, flags 42* and 44* corresponding to these files assume a value "00", as shown in (c) of FIG. 17.

Also, in (d) of FIG. 17, since still image files are recorded up to IMG_52.IOB, the contents of "final number information 22 of recorded still image (IOB) files" in (a) of FIG. 17 are "52".

A sequence for recording new still image information (IOB) in the information storage medium using the apparatus shown in FIG. 23 is as follows.

<01> The number of pieces of still image information to be recorded and attribute information (see (c) and (d) of FIG. 19) such as a resolution, compression method, and the like are input at data input PC 3640 in FIG. 23 via inter-PC data I/F processor 3540.

<02> System controller 3020 issues an instruction to information recorder/player 3000 to play back IOBSI.IFO file 2130 (FIG. 7) recorded in IOBSI recording region 142 in (e) of FIG. 5 and to temporarily save it in its internal buffer memory (not shown).

<03> System controller 3020 plays back final number information 22 of still image (IOB) files recorded in IOBSI.IFO file 2130 temporarily saved in the buffer memory.

<04> System controller 3020 plays back information of "recorded/unrecorded flags 41\* to 49\*" for IMG_xx.IOB in (b) of FIG. 17 recorded in IOBSI.IFO file 2130 temporarily saved in the buffer memory from the first number to the number ("52" in the example in (d) of FIG. 17) set by "final number information 22" read in <03> above. System controller 3020 then searches for unrecorded ID numbers with flags="00" in (c) of FIG. 17 from the read number range (from IMG_01 to IMG_52).

In the embodiment of the present invention, since the start address of each information is predetermined, the unrecorded ID number search process need only play back required information.

<05> System controller 3020 records each still image information (IOB) input via inter-PC data I/F processor 3540 in the information storage medium (memory card 100) while setting the number of a still image file name in accordance with the ID number (IMG_xx with flag "00") extracted in <04> above.

At this time, the operation of information recorder/player 3000 is controlled by system controller 3020.

<06> Upon completion of recording of still image information (IOB), system controller 3020 changes the contents of IOBSI management information 10 ((b) of FIG. 16) in IOBSI.IFO file 2130 temporarily saved in the buffer memory.

<07> System controller 3020 records information such as a resolution, compression method, and the like of still image information input in <01> above in still image attribute information 431 ((c) of FIG. 19) temporarily saved in the buffer memory.

In the embodiment of the present invention, since the start address of each information is predetermined, pieces of management information 1 to 9 associated with IMG_xx.IOB to be recorded can be directly accessed and recorded. For this reason, a recording process is very easy, and can be executed at high speed.

<08> When the number item of music number (or a tune number) for displaying each still image information recorded in the information storage medium is designated at data input PC 3640, system controller 3020 issues an instruction to information recorder/player 3000 to read out information of image pointer information IPI# (IPI#1 to IPI#5 and the like in (c) of FIG. 8) in AOBI# corresponding to the designated music number, change the contents of readout IPI#, and then record IPI# on the information storage medium again.

<09> At this time, when a new representative image is set, system controller 3020 changes information of "bitmap information 27 of a still image (IOB) file designated as a representative image" ((d) of FIG. 16) in IOBSI.IFO file 2130 temporarily saved in the buffer memory.

<10> Upon completion of changes in data of IOBSI.IFO file 2130 temporarily saved in the buffer memory of system controller 3020, system controller 3020 issues an instruction to information recorder/player 3000 to write back IOBSI.IFO file 2130 in the buffer memory to the information storage medium.

A method of generating a list of still image files recorded on the information storage medium in the embodiment of the present invention will be explained below.

For example, when a music number (tune) to which still image information recorded on the information storage medium is attached is set using a PC, information of this "still image file list" is required.

In the conventional method, after all IMG_xx.IOB files shown in FIG. 16 are collected using file system drive software such as FAT, UDF, or the like, their file names are read, and the relationship between these file names and IOBSI.IFO file 2130 must be checked, resulting in complicated, much time-consuming list generation.

By contrast, in the embodiment of the present invention, since only a simple process to be described below is required, the still image file list can be generated at high speed.

<21> The user issues a generation instruction of the still image file list recorded on the information storage medium.

<22> System controller 3020 issues an instruction to information recorder/player 3000 to play back IOBSI.IFO file 2130 (FIG. 16, FIG. 7) recorded in IOBSI recording region 142 in (e) of FIG. 5 and temporarily save played back information in its internal buffer memory (not shown).

<23> System controller 3020 reads "management information 26\* of still image ID information" ((d) of FIG. 16) in the buffer memory, and displays a list of already recorded still image file numbers on image display 3710 in FIG. 23.

Since the already recorded still image file numbers are known, it is easy to display each still image.

When attributes of each still image must be displayed at the same time, <24> system controller 3020 directly accesses required "attribute information 431 of a still image" ((c) of FIG. 19) in the buffer memory, and displays it simultaneously.

In the embodiment of the present invention, since the start address of each information is predetermined, pieces of management information 1 to 9 associated with IMG_xx.IOB to be recorded can be directly accessed and recorded. For this reason, a recording process is very easy, and can be executed at high speed.

Figure 18:
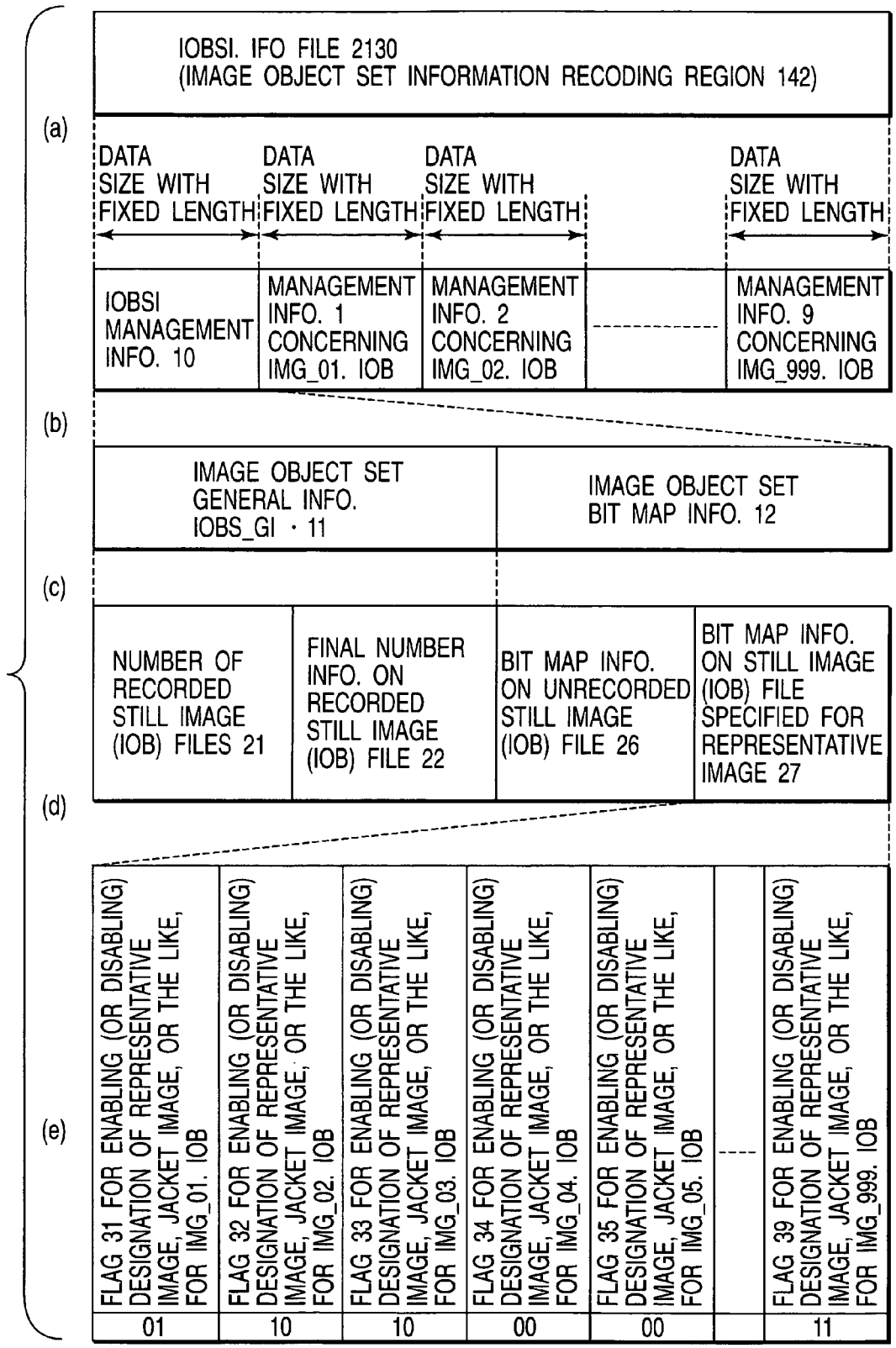
FIG. 18 shows views for explaining the data structure of bitmap information (27) of a still image file designated as a representative image, jacket image, or the like in image object set information (IOBSI.IFO) in FIG. 16.

FIG. 18 shows views for explaining the data structure of bitmap information (27) of a still image file designated as a representative image or jacket image in image object set information (IOBSI.IFO) in FIG. 16.

FIG. 19 shows views for explaining the data structure of management information that pertains to each image object (IMG_xx.IOB) in the image object set information (IOBSI.IFO) in FIG. 16.

The data structure in IOBSI.IFO file 2130 will be explained below with reference to FIGS. 18 and 19.

As shown in (b) of FIG. 18 or 19, IOBSI.IFO file 2130 is made up of IOBSI management information 10 that records general information which pertains to all pieces of still image information, and pieces of management information 1 to 9 that pertain to IMG_01.IOB to IMG_999.IOB.

Note that the data size of IOBSI management information 10 and that of each of pieces of management information 1 to 9 that pertain to IMG_01.IOB to IMG_999.IOB are fixed sizes. Since the fixed data size is used, an access destination upon recording/playback of management information that pertains to each still image can be detected in advance.

For example, when management information that pertains to IMG_02.IOB is played back, an address obtained by adding the data sizes of IOBSI management information 10 and management information 1 that pertains to IMG_01.IOB, which are predetermined, can be accessed.

IOBSI management information 10 has image object set general information IOBS_GI·11 that records general information of still images, and information 11 records the total number 21 of still image files (that matches the number of still images) recorded in IOB recording region 132 in the information storage medium (audio card 100 with the copy protection function or disc-shaped information storage medium 170), and final number information 22 of the recorded still image (IOB) files.

Also, IOBSI management information 10 includes IOBS bitmap information 12 that records bitmap information pertaining to all still images.

As an example of contents of bitmap information 27 of a still image (IOB) file designated as a representative image (or jacket image), representative image designation flags 31 to 39 are stored.

These flags are assigned to IMG_01.IOB file by 2 bits, IMG_02.IOB file by 2 bits, . . . , i.e., a 2-bit flag is assigned to each file, and a flag other than "00" is set in a still image file that stores a still image designated as a representative image (or jacket image) of the still image files ("00", is set in a still image file which stores a still image which is not designated as a representative or jacket image).

Since this flag consists of 2 bits, four different states can be discriminated. For example, if flag 00b, it indicates "no designation" (normal still image); if flag=01b, it indicates "representative image designation"; if flag=10b, it indicates "jacket image designation"; and if flag=11b, it indicates "other image designation", thus allowing four different ways of flag identification. As an example of other image designation, simultaneous designation of both the representative and jacket images can be made.

Note that IMG_xx.IOB in (e) of FIG. 18 can contain text information (in, e.g., a bitmap format) that describes the words, profiles of an artist, recording data, and the like of the music number (tune) of interest, as needed.

Each of pieces of management information 1 to 9 that pertain to respective still image files is made up of still image attribute information 431 and designation state information 432 of a representative image (or jacket image), as shown in (d) of FIG. 19.

Still image attribute information 431 includes compression method/compression version information 441 of a still image, resolution information 422 of a still image, and recorded/unrecorded flag 41* for the corresponding image data.

Compression method/compression version information 441 records a compression method such as JPEG, MPEG (I-picture), or the like and its version information. Resolution information 442 records resolution information of the corresponding image data. Recorded/unrecorded flag 41* records recorded/unrecorded flag (2-bit flag indicating the presence/absence of still image data) 41* for corresponding image data (IMG_01.IOB in this case). An information file that pertains to this recorded/unrecorded flag 41* can be recorded together in subdirectory 2400 in FIG. 7.

On the other hand, representative image designation state information 432 records information 450 of the number of music numbers (the number of tunes) that designate the still image of interest as a representative image (or jacket image), and N "music number/tune number, AOBI number, or CI number that designates the still image of interest as the first representative image (or jacket image)" 451, . . . , 452 (N is a positive fixed value).

Note that the upper limit value of the number item of music numbers (number of tunes) or the number of audio information files that can set for given still image information as a representative image (or jacket image) is N. N is equal to or smaller than a maximum of 999, and is preferably 10 or less in practice (to reduce the load of management).

As shown in (d) of FIG. 19, representative image designation state information 432 has description fields up to music number/tune number or AOBI number/CI number 452 that designates the still image of interest as the N-th representative image (or jacket image). Numbers are filled in turn from music number/tune number or AOBI number/CI number 451 that designates the still image of interest as the first representative image (or jacket image) in accordance with information 450 indicating the number item of music numbers (number of tunes) that designate the still image of interest as a representative image (or jacket image), and the remaining fields are set at "0".

Note that the data structure in the IOBSI.IFO file 2130 shown in FIG. 18 or FIG. 19 can be applied not only to that shown in FIG. 10 or FIG. 11, but also to the data structure shown in FIG. 12.

FIG. 20 shows views for explaining the data structure of image pointer information (IPI) shown in FIGS. 1 to 4, and FIGS. 10 to 12, and the like.

Image pointer information 40 (corresponding to IPI in FIGS. 1 to 4 and FIGS. 8 to 12) in (a) of FIG. 20 records still image display mode information 43 (51, 52) and still image designation information 47 in units of music numbers (tunes), in units of PGCs, or in units of play lists.

As shown in (c) of FIG. 20, display mode information 43 includes mode information 51 for setting the display order of still images, and mode information 52 for setting the display timings of still images.

The still image display order setting mode information 51 has contents for designating a "sequential mode" for displaying images in turn in accordance with the designated playback order, a "random/shuffle mode" for randomly displaying designated still images, a "browse mode" for switching a still image to be displayed at the input timing of the user (to allow the user to review a plurality of still images).

Still image display timing setting mode information 52 has contents for setting the display timings of one or more still images set in a music number (tune) in synchronism with divisions of audio frames of an AOB managed by, e.g., AOBI (TKI).

In this embodiment, a maximum of M still images can be displayed in units of music numbers (tunes) or in units of PGCs. M is a fixed value, which is selected from a range from 5 to 100 images, and is preferably around 20.

The data size of image pointer information (IPI) 40 is always fixed, and fields are initially set from the description field of still image 61 to be displayed first to that of information 69 of a still image to be displayed as the M-th image, as shown in (c) of FIG. 20.

In the description field of still image 61 to that of information 69 to be displayed as the M-th image, file numbers (e.g., "02" in case of IMG_02.IOB) 72 of still image files designated by IPI 40 are recorded in the display order.

When the number of designated still image files is small, "0" is recorded in the remaining fields. For example, in case of IPI 40 that does not designate any still image files at all, "0" is recorded from the description field of still image 61 to be displayed first to that of information 69 of a still image to be displayed as the M-th image.

Information indicating the number of still images designated for each IPI 40 is recorded in the number 60 of still images to be displayed in units of music numbers (tunes), PGCs, or play lists shown in (c) of FIG. 20.

By playing back this information, description fields from the description field of still image 61 to be displayed first to that of information 69 of a still image to be displayed as the M-th image, which record "designated still image file number information" can be detected.

In this embodiment, a still image stored in a still image file corresponding to still image file number 72 designated in "information 61 of a still image to be displayed first" shown in (c) of FIG. 20 serves as a representative image (or jacket image).

However, the present invention is not limited to this. For example, the first 1 or 2 bits of pieces of information 61 to 69 of still images to be displayed in turn are assigned to designation flag 71 of a representative image (or jacket image) in units of music numbers (tunes), PGCs, or play lists, as shown in (d) of FIG. 20. Then, a still image stored in a still image file number with this 1- or 2-bit flag="1" or "01" can be set as a representative image (or jacket image).

With this method, a still image other than a "still image to be displayed first" in units of music numbers (tunes), PGCs, or play lists can be set as a representative image (or jacket image).

Figure 21:
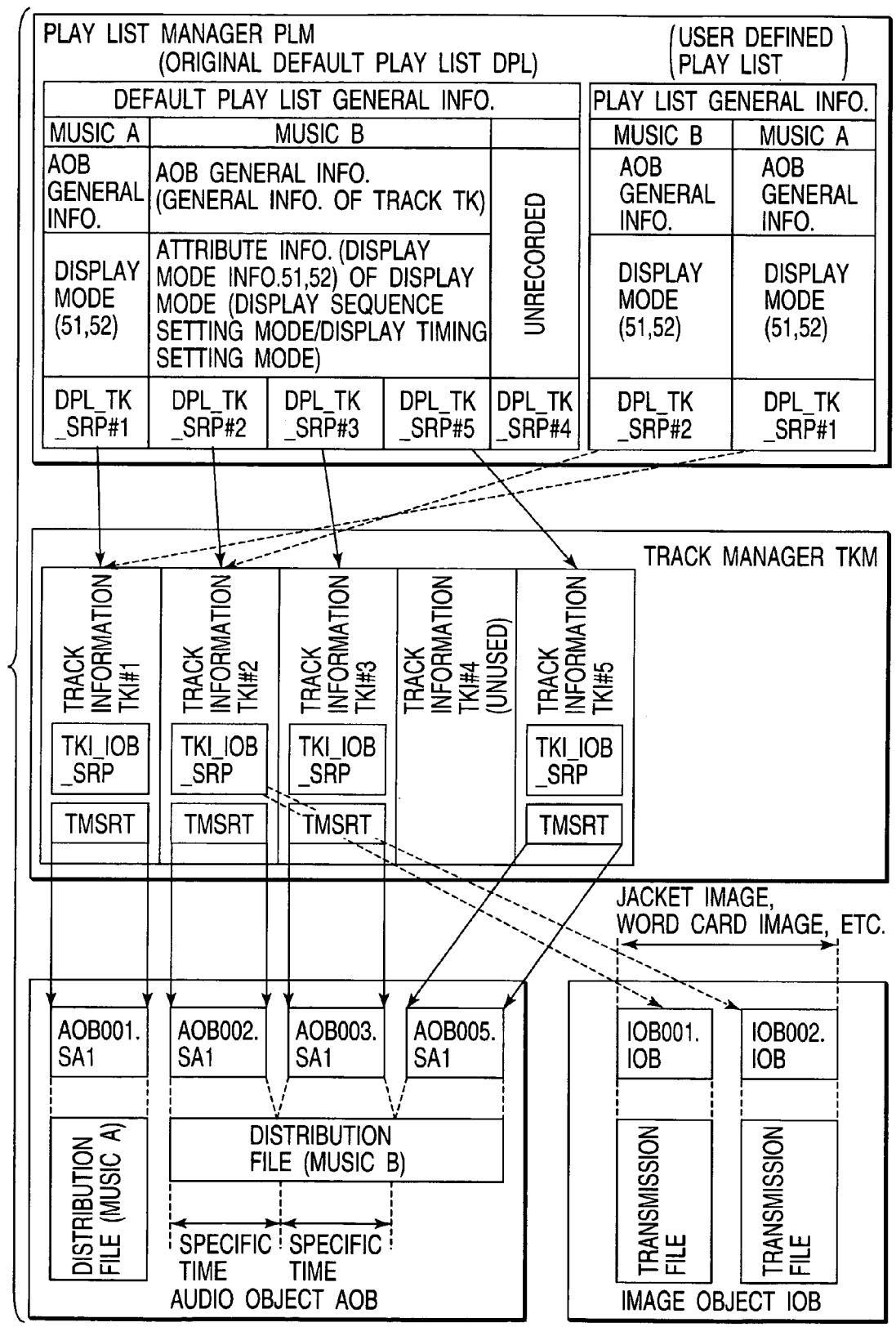
FIG. 21 shows a view for explaining the playback relationship (broken arrows in FIG. 21) between a plurality of music numbers (or tunes) and still images appended to these music numbers when cell information (CI#) in FIG. 10 and the like is changed to read a track search pointer (DPL_TK-_SRP#), audio object information (AOBI#) in FIG. 10 and the like is changed to read track information (TKI#), and image pointer information (IPI#) in FIG. 10 and the like is changed to read a track information search pointer (TKI-_IOB_SRP) for an image object.

FIG. 21 is a view for explaining the playback relationship (broken arrows in FIG. 21) between a plurality of music numbers (tunes) and still images (that can include jacket images, word card images, and the like) appended to these music numbers when cell information (CI#) in FIG. 10, etc. is changed to read a track search pointer (DPL_TK_SRP#), audio object information (AOBI#) in FIG. 10, etc. is changed to read track information (TKI#), and image pointer information (IPI#) in FIG. 10, etc. is changed to read a track information search pointer (TKI_IOB_SRP) for an image object.

By changing certain terms as follows (changes of terms), the playback relationship mentioned above with reference to FIGS. 8 to 10, etc. can be applied to FIG. 21:

PGC set information→play list manager PLM;
original PGC→default play list DPL;
individual user-defined PGC→individual play list PL;
cell information CI→track search pointer DPL_TK_SRP of default play list;
audio object information AOBI→track information TKI;
cell information CI→track information TKI;
image pointer information IPI→track information image object search pointer TKI_IOB_SRP; and
time map information TMI→time search table TMSRT.

In the structure shown in FIG. 21, when music #β is a long one, an AOB file of music #β may be automatically segmented in units of specific times, and track information TKI (corresponding to AOBI or CI) may be appended to the segmented AOB files.

In this case, AOB file numbers after segmentation are assigned in correspondence with the numbers of assigned TKIs.

Only the first TKI of each music number (each tune) is designated by each user-defined play list PL in place of default play list DPL. In this case, still images displayed in units of music numbers (tunes) are designated by the first TKI of each music number.

In the example shown in FIG. 21, an unrecorded region or unused region is assured in correspondence with the contents of default play list DPL or track manager TKM (management information).

Since an unrecorded region (unused region) can be set in management information in this manner, even when a portion of the management information is deleted by, e.g.,
editing, other portions of the management information need not be modified, thus allowing simple handling of the management information.

Furthermore, the size of each TKM (management information) including an unused region is fixed (e.g., at 1,536 bytes), management of the recording location (address) of each TKM (management information) can also be simplified.

In this way, the buffer memory size of the playback apparatus required for the management information (the size of the internal buffer (not shown) of, e.g., information recorder/player 3000 in the apparatus shown in FIG. 23) can be greatly reduced.

In the aforementioned structure, display mode information 43 (51, 52) in FIG. 20 is provided to each music number (each tune). If a music number includes a plurality of pieces of TKI (AOBI), only the display mode information included in image pointer information (IPI 40 in FIG. 20) of the first TKI (AOBI) of that music number is handled as a valid one that can designate the display order (display sequence) and/or display timings of still images of that music number.

FIG. 22 shows views for explaining an example of the format (data structure) when encrypted audio information is recorded on the audio card with the copy protection function shown in FIG. 5.

The data structure in audio object file 2500 ((a) of FIG. 22) in the embodiment of the present invention will be explained below.

Audio information (audio object AOB) is made up of audio object units AOBU 2510 to AOBU 2530 ((b) of FIG. 22).

Each of these AOBU 2510 to AOBU 2530 is formed by:
(01) segmenting information into units each having a specific data size (32-kbyte unit, 16-kbyte unit, 512-kbyte unit, or the like);
(02) segmenting information into units at specific audio frame counts; or
(03) segmenting information into units at playback time units (0.2-sec unit, 1-sec unit, 2-sec unit, 5-sec unit, 10-sec unit, or the like).

In the embodiment of the present invention, compression of audio information uses AAC (advanced audio coding) of MPEG.

As shown in (c) of FIG. 22, audio object file 2500 is formed of a set of a plurality of audio frames 2610 to 2630.

Since the number of audio frames included in each audio object file 2500 is described in audio object information AOBI in (c) of FIG. 8, the "total number of frames of each music number (each tune)" can be obtained using relationship information with music numbers (tunes) described in cell information CI.

The information of the "total number of frames of each music number (each tune)" is recorded in audio object information (e.g., AOBI#2 in music #β) corresponding to an audio information file to be played back first in the music number.

In AAC, each of audio frames (AOB frames) 2610 to 2630 ((C) of FIG. 22) is formed of ADTS (advanced audio coding transport stream, or audio data transport stream) header 2710, and audio information recording region 2740 ((d) of FIG. 22).

ADTS header 2710 includes fixed header 2720 including a sync word of an AOB, and variable header 2730 ((d) of FIG. 22).

In an encryption method of audio information (AOB), as shown in (e) of FIG. 22, ADTS header 2710 is set as non-encrypted region 2810 (a plane state without encryption), and compressed audio information recording region 2740 is encrypted every encryption unit (#a to #f) in turn from its head position.

For example, data in each encryption unit (#a to #f) undergoes an arithmetic process in accordance with a cipher key (encryption key) generated based on a random number, and that arithmetic operation result is recorded as encrypted information.

Encryption is done within each encryption unit (#a to #f), and the arithmetic process based on the cipher key (encryption key) repeats itself every encryption unit (#a to #f).

In the embodiment of the present invention, each encryption unit (#a to #f) has a 64- or 56-bit unit. The size of compressed audio information recording region 2740 does not always match an integer multiple of 64 bits. Hence, only region "g" as the remainder (fraction part) obtained by dividing compressed audio information recording region 2740 by an integer multiple of the encryption unit is held in a non-encrypted, plane state.

That is, non-encrypted region "g" is assured as a kind of padding region to match the size of compressed audio information recording region 2740 with an integer multiple of 64 bits.

FIG. 23 is a block diagram for explaining an example of the arrangement for recording information or playing back information on or from the audio card with the copy protection function shown in FIG. 5.

Figure 24:
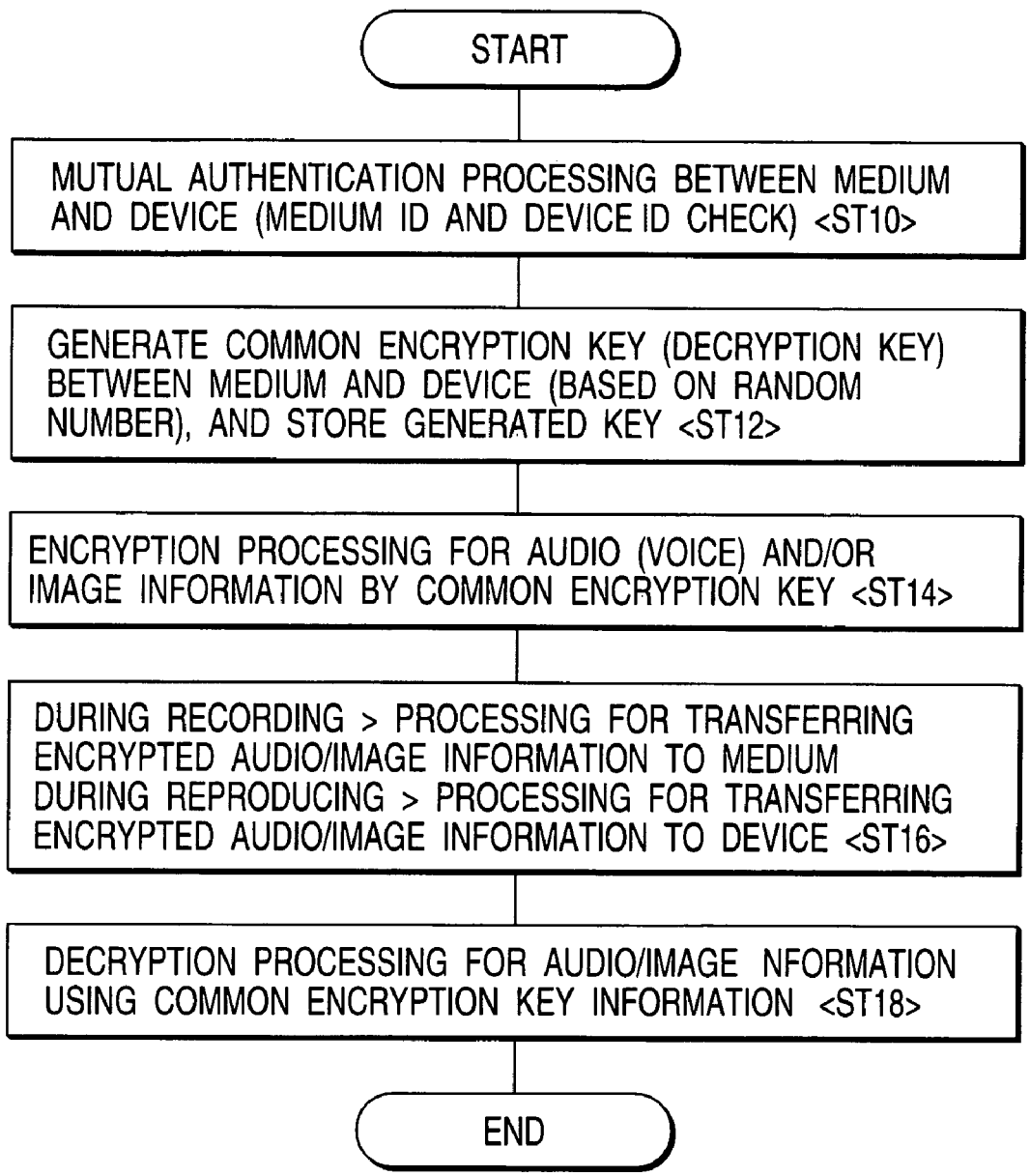
FIG. 24 shows a flow chart for explaining the sequence of a mutual authentication process and cipher key (encryption key) exchange process done between the audio card in FIG.

FIG. 24 is a flow chart for explaining the sequence of a mutual authentication process and cipher key (encryption key) exchange process done between the audio card in FIG. 5 (or optical disc shown in FIG. 6), and the recording/playback apparatus shown in FIG. 23.

The arrangement of a recording system capable of writing information (audio information and/or still image information) to be copy-protected in audio card (memory card) 100 will be explained first.

As a popular device that digitally records still image information which can be handled by the apparatus in FIG. 23, a digital camera is known. Still image information to be digitally recorded is also used as a menu image in DVD video that digitally records/plays back moving picture information (I-picture of MPEG can be considered as still image information) in addition to the digital camera.

As means for inputting such still image information to the apparatus shown in FIG. 23,

(11) video capture unit 3510 captures a video signal from CCD camera 3610 or TV tuner 3620 to convert it into a still image, and an A/D converter (not shown) built in video capture unit 3510 converts the captured still image into a digital signal and inputs the digital signal to input data transfer destination switching unit (data bus line) 3210;

(12) still image information sensed by digital camera 3630 is sent to I/F processor 3520 of the digital camera using a serial transmission line such as RS-232C or the like, and is input to input data transfer destination switching unit 3210;

(13) still image information created using personal computer (PC) 3640 or still image information scanned by an image scanner connected to this PC is input to input data transfer destination switching unit 3210 via inter-PC data I/F processor 3540; and so forth.

As means for inputting text information to the apparatus shown in FIG. 23,

(14) key input data from a keyboard is input to input data transfer destination switching unit 3210;

(15) character selection/designation is made using dial rotation/dial in used in, e.g., a digital camcorder to input character codes of JIS, ASCII, or the like to input data transfer destination switching unit 3210; and so forth.

Furthermore, as means for inputting audio information to the apparatus shown in FIG. 23,

(16) an analog audio signal (e.g., an analog playback output of a CD player) externally input via analog input terminal 3570 is converted into a digital signal by DAC 3350, the digital signal undergoes, e.g., MPEG2/AAC compression coding by audio encoder 3310, and the compressed digital signal is input to input data transfer destination switching unit 3210 (whether or not compression is done by audio encoder 3310, the compression method to be used if compression is done, and so forth can be determined in accordance with an instruction from system controller 3020);

(17) an analog audio signal input from audio input microphone 3650 via microphone input terminal 3560 is converted into a digital signal by DAC 3350, the digital signal undergoes MPEG2/AAC compression coding by audio encoder 3310, and the compressed digital signal is input to input data transfer destination switching unit 3210;

(18) a digital audio signal (e.g., a linear PCM digital output from a CD player) externally input via digital input terminal 3580 undergoes MPEG2/AAC compression coding by audio encoder 3310, and the compressed digital signal is input to input data transfer destination switching unit 3210;

(19) already compressed digital audio information is directly fetched by data input PC 3640 from a WWW (World Wide Web), the Internet, and the like via a modem (not shown). The digital audio information is input to input data transfer destination switching unit 3210 via inter-PC data I/F processor 3540; and so forth.

Desired ones (e.g., JPEG-compressed still image information from digital camera 3630 and MPEG-compressed audio information from audio encoder 3310) of various kinds of digital information input by the aforementioned methods are selected under the control of system controller 3020. The selected information (JPEG-compressed still image information and MPEG-compressed audio information) is transferred to information recorder/player 3000 via input data transfer destination switching unit (data bus line) 3210.

Note that audio input information or still image information transferred to information recorder/player 3000 is sometimes appended with information of analog copy generation management system CGMS-A when it is an analog input signal or information of digital copy generation management system CGMS-D when it is a digital input signal.

When "copy freely" information (2-bit flag) is described as the information of copy generation management system CGMS, since no encryption is required, non-encrypted, plane input information is transferred from input data transfer destination switching unit 3210 to information recorder/player 3000.

On the other hand, when CGMS-A or CGMS-D designates copy restriction, copy-restricted information is transferred from input data transfer destination switching unit 3210 to encryption processor 3110.

Encryption processor 3110 encrypts the copy-restricted information on the basis of a cipher key (encryption key) randomly generated by cipher key (encryption key) generation/saving unit 3140 (see (e) of FIG. 22 for the encryption method).

Audio information and/or still image information encrypted by encryption processor 3110 are/is sent to mutual authentication/key exchange & encrypted information I/F controller 3120.

Mutual authentication/key exchange & encrypted information I/F controller 3120 transfers the encrypted audio information and/or still image information to information recorder/player 3000. The information to be transferred to information recorder/player 3000 is appended with copy restriction information (2-bit flag) of CGMS-A or CGMS-D as needed.

When "copy once" information is described as CGMS information, the encrypted audio input information is transferred from mutual authentication/key exchange & encrypted information I/F controller 3120 to information recorder/player 3000 together with this CGMS information while being appended with a decryption key.

When "copy never" information is described as CGMS information, the encrypted audio input information is transferred from mutual authentication/key exchange & encrypted information I/F controller 3120 to information recorder/player 3000 together with this CGMS information without any decryption key.

Alternatively, when "copy never" information is described as CGMS information, only a warning message "this program is copyrighted and cannot be recorded" may be transferred from mutual authentication/key exchange & encrypted information I/F controller 3120 to information recorder/player 3000, so as to inhibit recording other than this warning.

The CGMS information (a 2-bit flag indicating the type of copy restriction or a warning message of copyright protection) can be written in, e.g., card unique ID & key information recording region (RAM) 103 in audio card (memory card) 100 shown in (a) of FIG. 5.

Alternatively, the CGMS information (a 2-bit flag indicating the type of copy restriction or a warning message of copyright protection) can be written in a rewritable data zone of lead-in area 1800 or management information recording region 130 in (d) of FIG. 6 in optical disc 170 shown in (a) of FIG. 6.

The operations of the aforementioned encryption related units (3110 to 3140) (selective encryption depending on the contents of CGMS information) are controlled by system controller 3020.

More specifically, information recorder/player 3000 includes:

(21) a contact electrode section when the information storage medium is audio card (memory card) 100;

(22) a magnetic head in an HDD and HDD rotation control circuit when the information storage medium is a removable hard disk;

(23) an optical head and disc rotation control circuit when the information storage medium is a recordable/reproducible optical disc; and the like (FIG. 23 exemplifies a case wherein memory card 100 is used).

A description of the arrangement in FIG. 23 will continue assuming that audio information and/or still image information, which are/is copy-managed by CGMS, are/is recorded/played back on/from audio card (memory card) 100.

At the same time, a mutual authentication & key exchange process between audio card (memory card) 100 and the apparatus in FIG. 23 will be parallel explained with reference to FIG. 24.

When audio card (memory card) 100 is loaded into information recorder/player 3000 in FIG. 23 (by the user), card 100 is powered from the information recorder/player 3000 side via electrodes (not shown) of the card. Control CPU/MPU 101 in card 100 then launches an authentication/key exchange & I/O process related program stored in ROM 102 in (a) of FIG. 5.

With this program, mutual authentication and key exchange are executed between encryption processing unit 3010 and audio card 100.

That is, in the authentication/key exchange process, cipher key (encryption key) generation/saving unit 3140 generates a challenge key, which is encrypted by encryption processor 3110, and the encrypted key is sent to audio card 100 via mutual authentication/key exchange & encrypted information I/F controller 3120. Then, audio card 100 decrypts the encrypted challenge key to execute authentication.

Furthermore, a response key saved in card unique ID information & key information recording region (RAM) 103 is encrypted and is sent to encryption processing unit 3010, which decrypts the encrypted response key to execute authentication.

In these authentication processes, each other's IDs are checked.

For example, CPU/MPU 101 in card 100 in (a) of FIG. 5 reads the unique ID (this ID is written in, e.g., a ROM (not shown) in information recorder/player 3000) of the apparatus in FIG. 23 via information recorder/player 3000, and can check if that apparatus is an authentic one which matches itself (card 100).

Likewise, system controller 3020 in FIG. 23 reads the unique ID of card 100 in (a) of FIG. 5 via information recorder/player 3000, and can check if that apparatus is an authentic one which matches itself (apparatus in FIG. 23).

In this manner, mutual authentication is done between card 100 and the apparatus shown in FIG. 23 (step ST10).

If mutual authentication has failed, the subsequent processes are canceled (not shown in FIG. 24), and information recording/playback on/from card 100 is inhibited.

If mutual authentication has succeeded, a common cipher key (encryption key) is generated based on a random number or the like between audio card 100 and encryption processing unit 3010, and the common cipher key (encryption key) information is temporarily saved in both card unique ID information & key information recording region (RAM) 103 and cipher key (encryption key) generation/saving unit 3140 (step ST12).

In this way, both card 100 and the apparatus in FIG. 23 have common key information required for decryption.

Upon completion of a series of mutual authentication/key exchange processes, encryption processor 3110 encrypts digital information (audio information or image information) sent from input data transfer destination switching unit 3210 using the common cipher key (encryption key) generated by the aforementioned processes (step ST14).

In this encryption, encryption conversion (for randomly shuffling data in encryption units) is done every encryption unit (64 bits) for compressed audio information recording region 2740 shown in (d) and (e) of FIG. 22, thus rewriting data.

In this case, ADTS header 2710 and fraction region "g" do not undergo encryption conversion, and are transferred to information recorder/player 3000 in a non-encrypted, plane state.

The encrypted digital information is transferred to card 100, and is recorded at a predetermined location of data region 113 of card 100 (upon recording in step ST16).

When information to be copyright-protected is recorded on card 100, information of CGMS-D is transferred and recorded at the same time.

On the other hand, upon playback of encrypted information, data (audio information or image information) that has undergone encryption conversion in encryption units, and non-encrypted ADTS header 2710 and region "g" are transferred from card 100 to encryption processing unit 3010 via information recorder/player 3000 (upon playback in step ST16).

The transferred encryption-converted data is decrypted by decryption processor 3130 (step ST18), and decrypted data is output to output data/control information transfer destination switching unit (data/command bus line) 3220.

Note that the encryption-converted data includes CGMS-D information if it is copyright-protected.

An example of the process upon playback will be explained in more detail below.

When information recorded on audio card 100 with the copy protection function is to be played back, information recorder/player 3000 reads information in program chain set information recording region 140 shown in (e) of FIG. 5, stores at least a portion of the read information in the internal memory (RAM) of system controller 3020, and searches for an audio information file to be played back using the information temporarily saved in the memory.

Before playback of an audio information file, system controller 3020 reads CGMS-D information which pertains to that information, and determines whether the information is transferred to output data/control information transfer destination switching unit 3220 directly or via encryption processing unit 3010, thus selecting one of these transfer routes.

When encrypted information is transferred from information recorder/player 3000, the mutual authentication/key exchange processes in steps ST10 to ST12 in FIG. 24 are executed, and a common cipher key (encryption key) is held between encryption processing unit 3010 and audio card 100.

The encrypted information input to decryption (decipher) processor 3130 via mutual authentication/key exchange & encrypted information I/F controller 3120 has a structure shown in (e) of FIG. 22.

The encrypted information is decrypted (deciphered) every encryption unit, and encryption units of decrypted, plane information are re-arranged to an original data sequence.

Digital information (plane digital information after decryption) transferred from output data/control information transfer destination switching unit (data/command bus line) 3220 is processed as follows:

(31) the digital information is decoded by audio decoder 3220 to obtain a linear PCM signal, which is temporarily saved in audio buffer 3410, when it is audio information;

(32) the digital information undergoes "code→character conversion" by character generator 3340, and is then temporarily saved in text line buffer 3420 as image information when it is text information;

(33) the digital information is converted into bitmap information in image decoder 3330, and is temporarily saved in page buffer 3430 when it is still image information compressed by JPEG or MPEG (I-picture); and

(34) video processor 3370 composites the still image information in the bitmap format, temporarily saved in page buffer 3430 and the text information image temporarily saved in line buffer 3420 to generate a single composite image, as needed.

The composite image obtained in this way is displayed on image display 3710 such as a color liquid crystal display panel or the like.

On the other hand, the audio information temporarily saved in audio buffer 3410 is transferred to D/A converter (DAC) 3360 in units of frames, and is converted into an analog signal, which is output to external output terminal 3720 connected to a loudspeaker or the like.

Note that the display timing of text or still image information on image display 3710 upon playing back audio information is controlled in synchronism with the audio frame number to be played back.

System controller 3020 shown in FIG. 23 sets a value obtained by dividing the "total number of frames" of music #β shown in, e.g., (b) of FIG. 8 by the "number of still images to be displayed during playback" of music #β as the "number of audio frames to be played back per still image".

System controller 3020 always monitors the audio frame numbers in playback (the accumulated number of audio frames), and switches still image information in page buffer 3430, which is to be sent to image display (color liquid crystal display) 3710, when the played-back audio frame number has reached a predetermined value.

Note that system controller 3020 in FIG. 23 mainly executes both the "music number combining (tune combining)" and "music number dividing (tune dividing)" processes described earlier with reference to FIG. 2, and sends changed management information (CI# or AOBI#) to information recorder/player 3000 via output data/control information transfer destination switching unit (data/command bus line) 3220.

As a result, information in management information recording region 130 in (d) of FIG. 5 is rewritten. In the "music number dividing (tune dividing)" process, information (audio data corresponding to AOBI#3, AOBI#5, and AOBI#6 in the example shown in (c) and (d) of FIG. 2) in audio object recording region 131 is also changed (the process for dividing audio information file AOBI#3 into AOBI#5 and AOBI#6).

FIG. 25 is a flow chart for explaining the method of making only an image pointer (IPI) of the first AOBI (TKI) in a music number/tune (track) valid as a pointer of a still image to be displayed when the music number/tune (track) is made up of a plurality of pieces of AOBI (TKI).

The number of pieces of AOBI (TKI in FIG. 21) (three pieces of AOBI in music #β in FIG. 8; three pieces of TKI in music B in FIG. 21) is detected from PGCSI/AOBSI or the like shown in FIG. 5 or FIG. 8 (step ST1000).

If the detected number of pieces of AOBI (TKI) is 1 (YES in step ST1002), image pointer information IPI (TKI_IOB_SRP) of one AOBI (AKI) which forms that music number/tune (track) is used (step ST1004).

On the other hand, if a plurality of pieces of AOBI (AKI) are detected (NO in step ST1002), only image pointer information IPI (TKI_IOB_SRP) of the first AOBI (TKI) in the music number/tune (track) of two or more pieces of AOBI (TKI) which form that music number/tune (track) is used (step ST1006).

Then, the recorded/unrecorded flag (2 bits) in (e) of FIG. 16 or (d) of FIG. 19 is read (step ST1008).

For example, if this 2-bit flag is 00b, it indicates the absence of corresponding still image data (IMG_xx.IOB) (i.e., no still image data is recorded). If this 2-bit flag is 01b, it indicates the presence of corresponding still image data (IMG_xx.IOB) (i.e., still image data is already recorded).

If this 2-bit flag is 10b, it indicates the presence (recorded) of, e.g., still image data with text; if this 2-bit flag is 11b, it indicates, for example, the presence (recorded) of data (text data alone, motion JPEG file, etc.) other than a still image.

Such recorded/unrecorded flag is managed together in independent directory 2400 on the file system shown in FIG. 7.

If the recorded/unrecorded flag indicates the presence of corresponding still image data (IMG_xx.IOB) (YES in step ST1010), the recorded, corresponding still image data (IMG__01.IOB designated by IPI#1 in, e.g., music #α in FIG. 8) is accessed using image pointer information IPI (TKI_IOB_SRP) of the AOBI (TKI), use of which is determined in step ST1004 or ST1006 upon playing back the music number/tune (track) of interest (step ST1012).

If the recorded/unrecorded flag indicates the presence of corresponding text data (TXT_xx.TOB) (YES in step ST1014), the recorded, corresponding text data (TXT__02.TOB and TXT__03.TOB designated by TPI#2 in, e.g., music #β in FIG. 13) is accessed using text pointer information TPI (see FIGS. 13 and 14) of the AOBI (TKI), use of which is determined in step ST1004 or ST1006 upon playing back the music number/tune (track) of interest (step ST1012).

The accessed still image data and/or text data are/is played back upon playback of the music number/tune of interest, and are/is displayed on, e.g., image display 3710 in FIG. 23 (step ST1018).

FIG. 26 is a flow chart for explaining the method of matching the display order mode/still image display timing mode of divided music numbers (divided tunes) with those before the dividing process, matching text information associated with the divided music numbers (divided tunes) with that before the dividing process, and copying all kinds of still image information and text information in newly created AOBI (TKI) from the same kinds of information of AOBI (TKI) older than the new AOBI (TKI).

Music/tune (track) #α having AOBI (TKI) #1 in FIG. 4 is divided to generate new music number/new tune (track) #α having AOBI (TKI) #1, and new music number/new tune (track) #ζ having AOBI (TKI) #8 (step ST2000).

It is then checked if image pointer information IPI#1 included in music #α before the dividing process includes a description of display mode information (51, 52) shown in FIGS. 10, 20, etc. (step ST2002).

If image pointer information IPI#1 includes the description of display mode information (51, 52) (YES in step ST2002), the display mode information (51, 52) of image pointer information IPI#1 included in music #αbefore the dividing process is transplanted (copied) to new music #α and new music #ζ generated by the dividing process (step ST2004).

The display mode information (51, 52) transplanted (copied) to new music #α and new music #ζ is stored in the internal RAM of system controller 3020 in FIG. 23, and/or is recorded in RAM 104 in (a) of FIG. 5 (or data region 1820 in (b) of FIG. 6).

It is checked if music #α before the dividing process includes a description of text pointer information TPI (step ST2006).

If music #α includes the description of text pointer information TPI (YES in step ST2006), the contents of text pointer information TPI#1 included in music #α before the dividing process are transplanted (copied) to new music #α and music #ζ generated by the dividing process (step ST2008).

The text pointer information transplanted (copied) to new music #α and new music #ζ is stored in the internal RAM of system controller 3020 in FIG. 23, and/or is recorded in RAM 104 in (a) of FIG. 5 (or data region 1820 in (b) of FIG. 6).

The transplanted (copied) display mode information (51, 52) and/or text pointer information are/is set in each AOBI (TKI) of new music #α and new music #ζ (step ST2010).

In this case, the transplanted (copied) display mode information (51, 52) and/or text pointer information may be set not only in AOBI having valid image pointer information IPI but also in each AOBI having invalid IPI.

Still images and/or text (that can include jacket images, word cards, and the like) are played back and displayed while being switched as needed on the basis of all pieces of transplanted (copied) information (including display mode information and/or text information) (step ST2012).

FIG. 27 is a flow chart for explaining the method of matching the display order mode/still image display timing mode of the combined music number (combined tune) with those to be played back first by merging still image information in a succeeding music number (succeeding tune) with that in a preceding music number (preceding tune) when two music numbers/two tunes (tracks) are combined to generate a new music number/new tune (track).

Music/tune (track) #α having AOBI (TKI) #1 and music/tune (track) #β having AOBI (TKI) #2 are combined to generate music #γ (step ST3000).

In this case, in the example shown in FIG. 1, pieces of still image information IMG__03.IOB and IMG__04.IOB of music #β are merged with pieces of still image information IMG__01.IOB and IMG__02.IOB of preceding music #α, so that music #γ has pieces of image information IMG__01.IOB to IMG__04.IOB.

Of combined music number/combined tune (track) #γ, display mode information (51, 52 in FIG. 20) in image pointer information IPI of AOBI#1 of music #α to be played back first is used as that of combined music #γ (step ST3002).

If the display mode information used includes a description of display order setting mode information (51 in FIG. 20) (YES in step ST3004), the display method of still images (IMG_xx.IOB) of music #γ is determined in accordance with the contents of the display order setting mode information (step ST3006).

Examples of the display method determined in this step include sequential display, random display, sequential display after shuffling, display while browsing images, and the like.

If the display mode information used includes a description of display timing setting mode information (52 in FIG. 20) (YES in step ST3008), the display timings of still images (IMG_xx.IOB) of music #γ are determined in accordance with the contents of the display timing setting mode information (step ST3010).

Examples of the display timing determined in this step include the still image display switching timings synchronized with divisions of audio frames (see (c) of FIG. 22 of music #γ to be played back, the still image display switching timings set at given time intervals using a timer, and the like.

Upon playback of music #γ, still images (that can include text information such as words and the like as needed) are played back and displayed while being switched based on the determined display method (display order) and/or at the determined display timings (step ST3012).

FIG. 28 is a flow chart for explaining the method of displaying jacket images using still image information of a music number/tune (track) included in a selected play list or a selected music number/selected tune (track) when a play list or music number/tune (track) is selected.

It is checked if a play list (default play list or user-defined play list) is selected (step ST4000).

This checking is done by system controller 3020 in FIG. 23 in response to depression of a play list select button on a remote controller (not shown) by the user.

If the play list is selected (YES in step ST4000), the first music number/first tune (music #α in the default play list or music #β in the user-defined play list in FIG. 10) is specified (step ST4002).

On the other hand, if the play list is not selected (NO in step ST4000) but if a specific music number/specific tune (track) is directly selected (YES in step ST4004), the selected music number/selected tune (the music number/tune of user's choice), e.g., music #β in FIG. 10, is specified (step ST4006).

Such direct selection of a music number/tune (direct music number designation or direct tune designation) is done by system controller 3020 in FIG. 23 in response to depression of a music number/tune (track) select button on the remote controller (not shown) by the user.

Some or all pieces of image information (IMG_02.IOB to IMG_04.IOB for music #β in the example shown in FIG. 10) designated by image pointer information IPI of the specified music number/specified tune are allowed to be used in display of jacket images and/or word cards (text images based on text pointer information TPI) on the basis of the contents of recorded/unrecorded flags (see FIG. 16, FIG. 17, or FIG. 19) and the contents of designation presence/absence flags (see FIG. 18) of jacket images and the like (step ST4008).

Some or all pieces of image information (IMG_02.IOB to IMG_04.IOB for music #β in the example shown in FIG. 10) which are allowed to be used are displayed in accordance with the display method (e.g., sequential) designated by display order setting mode information 51 included in display mode information (see FIG. 10 or FIG. 20) and the display timings (e.g., in units of a predetermined number of audio frames) designated by display timing setting mode information 52 included in the display mode information, upon playback of the selected music number/selected tune (music #β in the example in FIG. 10) (step ST4010).

The advantages or effects obtained according to the embodiment of the present invention described above may be summarized as follows.

1. According to the embodiment of the present invention, audio information with still images (audio information that can simultaneously play back still images) can easily undergo an edit process such as a music number combining process (tune combining process), dividing process, or the like within a short period of time without largely changing management information.

2. In the edit process such as a music number combining process (tune combining process), music number dividing process (tune dividing process), or the like, still images to be displayed upon playback of audio information can be easily set in units of music numbers (in units of tunes).

3. Even after music numbers (tunes) are combined, the playback range of a music number (tune) before the combining process is left or remained as a "management unit (cell/AOB/track)" indicating the playback range in audio information (AOB), and management information (CI/AOBI/TKI) that pertains to the management unit is recorded on the information storage medium as management information. Hence, the contents of management information need only be changed slightly before and after the music number combining process (tune combining process), and control upon editing can be facilitated.

4. When one music number (tune) is made up of a plurality of "management units (cells/AOBs/tracks)" (as a result of, e.g., the music number combining process/tune combining process), since designation information that pertains to still image information described within management information (CI/AOBI/TKI) which pertains to the management unit to be played back first in that music number (tune) indicates still image information to be displayed upon playing back the music number (tune) of interest, the memory size of the playback apparatus can be reduced.

In this case, when management information that pertains to a management unit to be played back in the latter half of the music number (tune) records designation information of still image information to be played back in units of music numbers (in units of tunes), the management information that pertains to all management units which form the music number (tune) of interest need only be temporarily saved in the memory of the playback apparatus before playback of the music number.

5. Since information which designates still image information (IOB) rejected from the display target range after the music number combining process (tune combining process) is recorded in management information which pertains to management units (cells/AOBs/tracks) to be played back as the second and subsequent units in that music number (tune), the user can re-select still image information (IOB) to be displayed in units of music numbers (in units of tunes), using an apparatus with advanced function, for example.

6. Since designation information to still image information (IOB) before the dividing process is directly copied and saved after the music number dividing process (tune dividing process), the user can be given a sense of security that "still image information to be displayed is saved even after the dividing process".

7. Still images (that can include jacket images and word card images) to be played back in a given music number (given tune) can be displayed while being switched along with the progress of the music number (tune) in a predetermined order and/or at predetermined timings in accordance with display mode information included in IPI in the first AOBI/TKI of that music number (tune).

As described above, the information storage medium (audio card or the like) according to the present invention can have information (attribute information such as display order mode/display timing mode, and the like, flags indicating the presence/absence of still image information, and the like) that pertains to handling of various kinds of information (still image information such as jacket images and the like, and text information such as words and the like) associated with audio information (music number or tune).

According to the information playback method of the present invention, corresponding jacket images, word text, and the like can be displayed while being automatically switched upon playback of a music number (tune), using the information (attribute information such as display order mode/display timing mode, and the like, flags indicating the presence/absence of still image information, and the like) that pertains to handling, which information is recorded on the information storage medium (audio card or the like).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-readable information storage medium storing program instructions to cause a processor to execute a method for playing audio information and image information, the medium comprising:
   a data area configured to store the audio information and the image information; and
   a management area configured to store management information of the audio information and the image information, the management information including sub-management information containing first sub-management information and second sub-management information, wherein
   the first sub-management information includes sequence information regarding a display sequence of still images of the image information and timing information regarding a display timing of the still images, and
   the second sub-management information includes numeral information describing a number status of the still images.

2. An apparatus for playing back information from a computer-readable information storage medium storing program instructions to cause a processor to execute a method for playing audio information and image information, wherein the medium comprises a data area configured to store the audio information and the image information, and a management area configured to store management information of the audio information and the image information, the management information including sub-management information including first sub-management information and second sub-management information; wherein the first sub-management information includes sequence information regarding a display sequence of still images of the image information and timing information regarding a display timing of the still images, and the second sub-management information includes numeral information describing a number status of the still images, the apparatus comprising:
   a management reproducer configured to reproduce the management information;
   an audio reproducer configured to reproduce the audio information; and
   an image reproducer configured to reproduce the image information.

3. A method of recording information on a computer-readable information storage medium storing program instructions to cause a processor to execute a method for playing audio information and image information, wherein the computer-readable information storage medium comprises a data area configured to store the audio information and the image information, and a management area configured to store management information of the audio information and the image information, the management information including sub-management information containing first sub-management information and second sub-management information, wherein
   the first sub-management information includes sequence information regarding a display sequence of still images of the image information and timing information regarding a display timing of the still images, and
   the second sub-management information includes numeral information describing a number status of the still images, the method comprising:
   recording the audio information and the image information on the data area; and
   recording the management information on the management area.

4. A method of reproducing information from a computer-readable information storage medium storing program instructions to cause a processor to execute a method for playing audio information and image information, wherein the computer-readable information storage medium comprises a data area configured to store the audio information and the image information, and a management area configured to store management information of the audio information and the image information, the management information including sub-management information containing first sub-management information and second sub-management information, wherein
   the first sub-management information includes sequence information regarding a display sequence of still images of the image information and timing information regarding a display timing of the still images, and
   the second sub-management information includes numeral information describing a number status of the still images, the method comprising:
   reproducing the management information from the management area; and
   reproducing the audio information and the image information from the data area.

5. An apparatus for recording information on a computer-readable information storage medium storing program instructions to cause a processor to execute a method for playing audio information and image information, wherein the computer-readable information storage medium comprises a data area configured to store the audio information and the image information, and a management area configured to store management information of the audio information and the image information, the management information including sub-management information containing first sub-management information and second sub-management information, wherein
   the first sub-management information includes sequence information regarding a display sequence of still images of the image information and timing information regarding a display timing of the still images, and
   the second sub-management information includes numeral information describing a number status of the still images, the apparatus comprising:
   a first recorder configured to record the audio information and the image information on the data area; and
   a second recorder configured to record the management information on the management area.

6. An apparatus for playing back information from a computer-readable information storage medium storing program instructions to cause a processor to execute a method for playing audio information and image information, wherein the computer-readable information storage medium comprises a data area configured to store the audio information and the image information, and a management area configured to store management information of the audio information and the image information, the management information including sub-management information containing first sub-management information and second sub-management information, wherein
   the first sub-management information includes sequence information regarding a display sequence of still images of the image information and timing information regarding a display timing of the still images, and
   the second sub-management information includes numeral information describing a number status of the still images, the apparatus comprising:
   a management reproducer configured to reproduce the management information;
   an audio reproducer configured to reproduce the audio information;

an image reproducer configured to reproduce the image information; and an image display configured to display an image of the image information reproduced by the image reproducer.

7. An apparatus for playing back information from a computer-readable information storage medium storing program instructions to cause a processor to execute a method for playing audio information and image information, wherein the computer-readable information storage medium comprises a data area configured to store the audio information and the image information, and a management area configured to store management information of the audio information and the image information, the management information including sub-management information containing first sub-management information and second sub-management information, wherein the first sub-management information includes sequence information regarding a display sequence of still images of the image information and timing information regarding a display timing of the still images, and the second sub-management information includes numeral information describing a number status of the still images, the apparatus comprising:

a management reproducer configured to reproduce the management information;

an audio reproducer configured to reproduce the audio information; and an image reproducer configured to reproduce the image information, wherein said computer-readable information storage medium is a memory card.

* * * * *